(12) United States Patent
Mckibben et al.

(10) Patent No.: US 12,337,821 B2
(45) Date of Patent: Jun. 24, 2025

(54) ELECTRIC VEHICLE POWER DISTRIBUTION AND DRIVE CONTROL MODULES

(71) Applicant: Hexagon Purus North America Holdings Inc., Lincoln, NE (US)

(72) Inventors: Ethan J. Mckibben, Kelowna (CA); Aaron Heffelfinger, Kelowna (CA); Todd F. Sloan, Kelowna (CA); Eric M. Coupal-Sikes, Kelowna (CA); Jordan Foster, Kelowna (CA); Benjamin Parker, Kelowna (CA)

(73) Assignee: Hexagon Purus North America Holdings Inc., Lincoln, NE (US)

( * ) Notice: Subject to any disclaimer, the term of this patent is extended or adjusted under 35 U.S.C. 154(b) by 616 days.

(21) Appl. No.: 17/664,617

(22) Filed: May 23, 2022

(65) Prior Publication Data

US 2022/0274494 A1 Sep. 1, 2022

Related U.S. Application Data

(63) Continuation of application No. PCT/US2020/062054, filed on Nov. 24, 2020.
(Continued)

(51) Int. Cl.
*B60L 58/30* (2019.01)
*B60K 6/28* (2007.10)
(Continued)

(52) U.S. Cl.
CPC ............ *B60W 20/20* (2013.01); *B60K 6/28* (2013.01); *B60K 15/03* (2013.01); *B60L 15/007* (2013.01);
(Continued)

(58) Field of Classification Search
CPC .... B60K 6/28; B60K 2001/0438; B60K 1/00; B60L 15/007; B60L 50/75; B60L 53/24;
(Continued)

(56) References Cited

U.S. PATENT DOCUMENTS

| | | |
|---|---|---|
| 1,551,594 A | 9/1925 | Maurice |
| 1,678,033 A | 7/1928 | Brumbaugh |

(Continued)

FOREIGN PATENT DOCUMENTS

| | | |
|---|---|---|
| AU | 2018232986 | 4/2019 |
| CN | 2647706 | 10/2004 |

(Continued)

OTHER PUBLICATIONS

Kenworth, "K270E, Zero Emissions", 2020, in 2 pages.
(Continued)

*Primary Examiner* — Erez Gurari
(74) *Attorney, Agent, or Firm* — Knobbe, Martens, Olson & Bear, LLP

(57) ABSTRACT

A heavy duty power distribution system is provided that includes an electric vehicle control module and a cable interface coupled with the electric vehicle control module. The electric vehicle control module includes an electric vehicle frame assembly and a power distribution component coupled with the electric vehicle control module frame assembly. The electric vehicle control module frame assembly is configured to support components of the electric vehicle control module on a vehicle frame rail, e.g., behind a cab thereof. A cowling is disposed around the power distribution component. The cable interface has a first junction and a second junction which are configured to connect the power distribution component with a power source and a load respectively.

20 Claims, 35 Drawing Sheets

Related U.S. Application Data

(60) Provisional application No. 63/089,672, filed on Oct. 9, 2020, provisional application No. 62/940,687, filed on Nov. 26, 2019.

(51) Int. Cl.
| | |
|---|---|
| *B60K 15/03* | (2006.01) |
| *B60L 15/00* | (2006.01) |
| *B60L 50/75* | (2019.01) |
| *B60L 53/24* | (2019.01) |
| *B60L 58/40* | (2019.01) |
| *B60W 20/10* | (2016.01) |
| *B60W 20/20* | (2016.01) |
| *B62D 63/04* | (2006.01) |
| *B60W 20/40* | (2016.01) |

(52) U.S. Cl.
CPC .............. *B60L 50/75* (2019.02); *B60L 53/24* (2019.02); *B60L 58/40* (2019.02); *B60W 20/10* (2013.01); *B62D 63/04* (2013.01); *B60K 2015/03309* (2013.01); *B60L 58/30* (2019.02); *B60L 2200/36* (2013.01); *B60L 2210/44* (2013.01); *B60W 20/40* (2013.01)

(58) Field of Classification Search
CPC ...... B60L 58/40; B60L 58/30; B60L 2200/36; B60L 1/02
See application file for complete search history.

(56) References Cited

U.S. PATENT DOCUMENTS

| | | | |
|---|---|---|---|
| 3,760,134 | A | 9/1973 | McCray |
| 3,883,794 | A | 3/1975 | Sivley |
| 4,248,323 | A | 2/1981 | Gaffney |
| 4,317,497 | A | 3/1982 | Alt et al. |
| 4,365,681 | A | 12/1982 | Singh |
| 4,435,990 | A | 3/1984 | Chalmers |
| 5,421,600 | A | 6/1995 | Jones et al. |
| 5,460,234 | A | 10/1995 | Matsuura et al. |
| 5,558,949 | A | 9/1996 | Iwatsuki et al. |
| 5,585,205 | A | 12/1996 | Kohchi |
| 5,854,517 | A | 12/1998 | Hines |
| 6,148,928 | A | 11/2000 | Spears |
| 6,188,574 | B1 | 2/2001 | Anazawa |
| 6,443,253 | B1 | 9/2002 | Whitehead et al. |
| 6,547,020 | B2 | 4/2003 | Maus et al. |
| 6,575,258 | B1 | 6/2003 | Clemmer |
| 6,624,610 | B1 | 9/2003 | Ono et al. |
| 6,668,957 | B2 | 12/2003 | King |
| 6,926,027 | B1 | 8/2005 | Sorensen |
| 6,971,657 | B2 | 12/2005 | King et al. |
| 7,051,825 | B2 | 5/2006 | Masui et al. |
| 7,144,039 | B2 | 12/2006 | Kawasaki et al. |
| 7,174,967 | B2 | 2/2007 | Raimondo et al. |
| 7,237,644 | B2 | 7/2007 | Matsumoto et al. |
| 7,398,849 | B2 | 7/2008 | Yoshida |
| 7,507,499 | B2 | 3/2009 | Zhou et al. |
| 7,543,454 | B2 | 6/2009 | Harris |
| 7,686,720 | B2 | 3/2010 | Nikolai |
| 7,854,443 | B2 | 12/2010 | Alguera |
| 7,931,105 | B2 | 4/2011 | Sato et al. |
| 8,037,960 | B2 | 10/2011 | Kiya |
| 8,051,934 | B2 | 11/2011 | Kiya et al. |
| 8,096,708 | B2 | 1/2012 | Harrington |
| 8,122,989 | B2 | 2/2012 | Burchett |
| 8,127,876 | B2 | 3/2012 | Phillips |
| 8,276,697 | B2 | 10/2012 | Takasaki |
| 8,342,279 | B1 | 1/2013 | Florus et al. |
| 8,397,853 | B2 | 3/2013 | Stefani et al. |
| 8,464,817 | B2 | 6/2013 | Usami et al. |
| 8,474,559 | B2 | 7/2013 | Sogabe |
| 8,505,950 | B2 | 8/2013 | Kolda |
| 8,517,126 | B2 | 8/2013 | Atarashi |
| 8,596,685 | B2 | 12/2013 | Mauduit et al. |
| 8,616,319 | B2 | 12/2013 | Yokoyama et al. |
| 8,672,354 | B2 | 3/2014 | Kim et al. |
| 8,701,842 | B2 | 4/2014 | Anderson |
| 8,764,469 | B2 | 7/2014 | Lamb |
| 8,776,927 | B2 | 7/2014 | Akazawa et al. |
| 8,778,527 | B2 | 7/2014 | Lee |
| 8,783,396 | B2 | 7/2014 | Bowman |
| 8,789,635 | B2 | 7/2014 | Franzen et al. |
| 8,794,361 | B2 | 8/2014 | Lim et al. |
| 8,839,901 | B1 | 9/2014 | Bradshaw |
| 8,905,170 | B2 | 12/2014 | Kyoden et al. |
| 9,033,078 | B2 | 5/2015 | Fillion et al. |
| 9,033,085 | B1 | 5/2015 | Rawlinson |
| 9,056,557 | B2 | 6/2015 | Kedzierski |
| 9,061,712 | B2 | 6/2015 | Patberg et al. |
| 9,077,019 | B2 | 7/2015 | Kosaki et al. |
| 9,085,226 | B2 | 7/2015 | Matsuda et al. |
| 9,103,092 | B2 | 8/2015 | Ueda |
| 9,108,497 | B2 | 8/2015 | Harrison, III et al. |
| 9,108,691 | B2 | 8/2015 | Fanourakis et al. |
| 9,205,749 | B2 | 12/2015 | Sakamoto |
| 9,227,582 | B2 | 1/2016 | Katayama et al. |
| 9,283,838 | B2 | 3/2016 | Ohashi |
| 9,315,173 | B1 | 4/2016 | Gray et al. |
| 9,321,352 | B2 | 4/2016 | Pierce et al. |
| 9,409,495 | B2 | 8/2016 | Kobayashi |
| 9,457,652 | B2 | 10/2016 | Sloan et al. |
| 9,586,490 | B2 | 3/2017 | Yamamaru et al. |
| 9,636,984 | B1 | 5/2017 | Baccouche et al. |
| 9,682,618 | B2 * | 6/2017 | Baik ..................... F16K 31/06 |
| 9,776,665 | B2 | 10/2017 | Garay et al. |
| 9,812,685 | B2 | 11/2017 | Nozaki et al. |
| 9,879,802 | B2 | 1/2018 | Getts |
| 9,884,545 | B1 | 2/2018 | Addanki et al. |
| 9,884,552 | B2 | 2/2018 | Sloan et al. |
| 9,887,570 | B2 | 2/2018 | Johnsen et al. |
| 9,902,348 | B2 | 2/2018 | Takeda |
| 9,914,355 | B2 | 3/2018 | Sloan et al. |
| 10,000,908 | B2 | 6/2018 | Ota et al. |
| 10,017,037 | B2 | 7/2018 | Newman et al. |
| 10,121,609 | B2 | 11/2018 | Coursol |
| 10,160,344 | B2 | 12/2018 | Newman |
| 10,166,883 | B2 | 1/2019 | Brendecke et al. |
| 10,177,356 | B1 | 1/2019 | Yang et al. |
| 10,183,698 | B2 | 1/2019 | Ta et al. |
| 10,193,112 | B2 | 1/2019 | Zimbru, Jr. et al. |
| 10,199,781 | B2 | 2/2019 | Deatherage |
| 10,201,913 | B2 | 2/2019 | McNeilus et al. |
| 10,236,496 | B2 | 3/2019 | Nakayama et al. |
| 10,245,972 | B2 | 4/2019 | Healy et al. |
| 10,259,329 | B2 | 4/2019 | Hosaka et al. |
| 10,308,132 | B2 | 6/2019 | Milton et al. |
| 10,358,023 | B2 | 7/2019 | Hegewald et al. |
| 10,358,024 | B2 | 7/2019 | Yugami et al. |
| 10,414,351 | B2 | 9/2019 | Katano |
| 10,421,345 | B2 | 9/2019 | Kerspe et al. |
| 10,427,627 | B2 | 10/2019 | Fukazu et al. |
| 10,457,156 | B2 | 10/2019 | Takizawa et al. |
| 10,464,613 | B2 | 11/2019 | Okura |
| 10,486,515 | B2 | 11/2019 | Saeki |
| 10,493,837 | B1 * | 12/2019 | Angelo ................... B60L 50/66 |
| 10,516,146 | B2 | 12/2019 | Fees et al. |
| 10,543,796 | B2 | 1/2020 | Isafushi et al. |
| 10,559,858 | B2 | 2/2020 | Goitsuka et al. |
| 10,569,634 | B2 | 2/2020 | Dawley |
| 10,583,746 | B2 | 3/2020 | Ogaki et al. |
| 10,589,788 | B1 | 3/2020 | Milton et al. |
| 10,589,797 | B2 | 3/2020 | Milton et al. |
| 10,604,188 | B2 | 3/2020 | Yoshii |
| 10,611,408 | B2 | 4/2020 | Fritz et al. |
| 10,641,431 | B2 | 5/2020 | Mallick et al. |
| 10,654,530 | B2 | 5/2020 | Milton et al. |
| 10,661,680 | B2 | 5/2020 | Milton et al. |
| 10,661,844 | B2 | 5/2020 | Milton et al. |
| 10,668,807 | B2 | 6/2020 | Milton et al. |
| 10,670,191 | B2 | 6/2020 | Yeggy |
| 10,688,856 | B2 | 6/2020 | Kasai et al. |
| 10,688,857 | B2 | 6/2020 | Tsuyuzaki et al. |

(56) References Cited

U.S. PATENT DOCUMENTS

| | | |
|---|---|---|
| 10,696,155 B2 | 6/2020 | Sloan et al. |
| 10,696,251 B2 | 6/2020 | Muramatsu et al. |
| 10,703,416 B2 | 7/2020 | Okura et al. |
| 10,752,102 B2 | 8/2020 | Lampsa et al. |
| 10,823,333 B2 | 11/2020 | Criel et al. |
| 10,843,677 B1 | 11/2020 | Paradis |
| 10,899,214 B2 | 1/2021 | Sloan et al. |
| 11,040,610 B2 | 6/2021 | Sloan et al. |
| 11,043,707 B2 | 6/2021 | Sloan et al. |
| 11,043,714 B2 | 6/2021 | Sloan et al. |
| 11,046,192 B2 | 6/2021 | Aufdencamp |
| 11,110,786 B2 * | 9/2021 | Loacker ............... H01M 50/20 |
| 11,124,076 B1 | 9/2021 | Borghi |
| 11,155,148 B2 | 10/2021 | Chung et al. |
| 11,312,221 B2 | 4/2022 | Sloan et al. |
| 11,345,331 B2 | 5/2022 | McKibben et al. |
| 11,465,482 B2 | 10/2022 | Menon et al. |
| 11,498,435 B2 | 11/2022 | Herbert et al. |
| 11,652,250 B2 | 5/2023 | Sloan et al. |
| 11,685,268 B2 | 6/2023 | Sjohom |
| 11,712,937 B1 | 8/2023 | Daugherty |
| 11,718,194 B2 | 8/2023 | Miler |
| 11,772,474 B2 | 10/2023 | Sloan et al. |
| 11,776,335 B1 | 10/2023 | Schubert et al. |
| 11,780,337 B2 | 10/2023 | Sloan et al. |
| 11,904,676 B2 | 2/2024 | Blomstrand |
| 11,919,343 B2 | 3/2024 | McKibben et al. |
| 11,926,207 B2 | 3/2024 | McKibben et al. |
| 11,938,804 B2 | 3/2024 | Andersson |
| 12,054,040 B2 * | 8/2024 | Koti ...................... B60K 11/04 |
| 12,070,996 B2 | 8/2024 | Kvalden |
| 12,157,362 B2 | 12/2024 | Sloan et al. |
| 2004/0134699 A1 | 7/2004 | Shimizu |
| 2004/0178602 A1 | 9/2004 | King et al. |
| 2004/0231831 A1 | 11/2004 | Houck et al. |
| 2005/0162015 A1 | 7/2005 | Yamaguchi et al. |
| 2005/0218136 A1 | 10/2005 | Kotani et al. |
| 2006/0102398 A1 | 5/2006 | Mizuno |
| 2007/0092764 A1 | 4/2007 | Kobayashi |
| 2008/0169139 A1 | 7/2008 | Kramer |
| 2008/0169144 A1 | 7/2008 | DeGrave et al. |
| 2008/0225483 A1 | 9/2008 | Kahn et al. |
| 2008/0258682 A1 | 10/2008 | Li |
| 2009/0014224 A1 | 1/2009 | Rydberg |
| 2009/0136844 A1 | 5/2009 | Watanabe et al. |
| 2009/0201650 A1 | 8/2009 | Hauser et al. |
| 2010/0000816 A1 | 1/2010 | Okada |
| 2010/0062329 A1 | 3/2010 | Muis |
| 2010/0065344 A1 | 3/2010 | Collings, III |
| 2010/0112843 A1 | 5/2010 | Heichal et al. |
| 2010/0163326 A1 | 7/2010 | Takamura et al. |
| 2010/0175940 A1 | 7/2010 | Taneda et al. |
| 2010/0320012 A1 | 12/2010 | van der Stappen et al. |
| 2010/0320040 A1 | 12/2010 | Anderson |
| 2011/0068622 A1 | 3/2011 | Ikeno et al. |
| 2011/0114398 A1 * | 5/2011 | Bianco .................... B60K 1/04 |
| | | 320/109 |
| 2011/0260530 A1 | 10/2011 | Steffka et al. |
| 2011/0287287 A1 | 11/2011 | Kang |
| 2012/0055725 A1 | 3/2012 | Mizoguchi et al. |
| 2012/0090907 A1 | 4/2012 | Storc et al. |
| 2012/0103714 A1 | 5/2012 | Choi et al. |
| 2012/0160583 A1 | 6/2012 | Rawlinson |
| 2012/0175177 A1 | 7/2012 | Lee et al. |
| 2012/0255799 A1 | 10/2012 | Kohler et al. |
| 2012/0312612 A1 | 12/2012 | Harrison, III et al. |
| 2013/0001384 A1 | 1/2013 | Karlsson et al. |
| 2013/0065099 A1 | 3/2013 | Mishima |
| 2013/0108404 A1 | 5/2013 | Okumura et al. |
| 2013/0108897 A1 | 5/2013 | Christian et al. |
| 2013/0118456 A1 | 5/2013 | Gutscher et al. |
| 2013/0248268 A1 | 9/2013 | Matsuda et al. |
| 2014/0141288 A1 | 5/2014 | Kim et al. |
| 2014/0287284 A1 | 9/2014 | Shibata |
| 2014/0338999 A1 | 11/2014 | Fujii et al. |
| 2014/0367183 A1 | 12/2014 | Matsuda |
| 2015/0194712 A1 | 7/2015 | He et al. |
| 2015/0291056 A1 | 10/2015 | Nozaki |
| 2016/0079795 A1 | 3/2016 | Patterson et al. |
| 2016/0087256 A1 | 3/2016 | Wagner et al. |
| 2016/0190526 A1 | 6/2016 | Yamada et al. |
| 2016/0226041 A1 | 8/2016 | Jackson et al. |
| 2016/0297283 A1 | 10/2016 | Sakamoto et al. |
| 2017/0012506 A1 | 1/2017 | Naito et al. |
| 2017/0225558 A1 | 8/2017 | Newman et al. |
| 2017/0282709 A1 | 10/2017 | Sasaki et al. |
| 2017/0320382 A1 | 11/2017 | Milton et al. |
| 2018/0022389 A1 | 1/2018 | Kageyama et al. |
| 2018/0062125 A1 | 3/2018 | Kaneshige |
| 2018/0145382 A1 | 5/2018 | Harris et al. |
| 2018/0183118 A1 | 6/2018 | Harris et al. |
| 2018/0190960 A1 | 7/2018 | Harris et al. |
| 2018/0201110 A1 | 7/2018 | Yin et al. |
| 2018/0319263 A1 | 11/2018 | Hegewald et al. |
| 2018/0333905 A1 | 11/2018 | Tong et al. |
| 2018/0339594 A1 * | 11/2018 | Brown ................... B60L 50/40 |
| 2018/0370368 A1 | 12/2018 | Kronsteiner et al. |
| 2019/0036181 A1 | 1/2019 | Tokozakura et al. |
| 2019/0061505 A1 | 2/2019 | Cavus et al. |
| 2019/0074495 A1 | 3/2019 | Haeusler et al. |
| 2019/0074497 A1 | 3/2019 | Haeusler et al. |
| 2019/0081298 A1 | 3/2019 | Matecki et al. |
| 2019/0084397 A1 | 3/2019 | Yugami et al. |
| 2019/0181517 A1 | 3/2019 | Kellner et al. |
| 2019/0202312 A1 | 7/2019 | Aufdencamp |
| 2019/0202429 A1 | 7/2019 | Richter et al. |
| 2019/0229314 A1 | 7/2019 | Ribbentrop et al. |
| 2019/0263449 A1 | 8/2019 | Ta et al. |
| 2019/0291560 A1 | 9/2019 | Lampsa et al. |
| 2019/0296541 A1 | 9/2019 | Mensch et al. |
| 2019/0302764 A1 | 10/2019 | Smith et al. |
| 2019/0326573 A1 | 10/2019 | Ozawa et al. |
| 2019/0393571 A1 | 12/2019 | Weicker et al. |
| 2020/0002828 A1 | 1/2020 | Mills et al. |
| 2020/0083573 A1 | 3/2020 | Caliskan et al. |
| 2020/0088299 A1 | 3/2020 | Baumer et al. |
| 2020/0094669 A1 | 3/2020 | DeLizo et al. |
| 2020/0139808 A1 | 5/2020 | Rike |
| 2020/0152938 A1 | 5/2020 | Winger et al. |
| 2020/0156500 A1 | 5/2020 | Huff et al. |
| 2020/0157769 A1 | 5/2020 | Huff et al. |
| 2020/0180848 A1 | 6/2020 | Snyder et al. |
| 2020/0198458 A1 * | 6/2020 | Volkmer ................. F02D 41/22 |
| 2020/0247225 A1 | 8/2020 | Kochi et al. |
| 2020/0269642 A1 | 8/2020 | Alguera |
| 2020/0369228 A1 | 11/2020 | Kageyama et al. |
| 2020/0384854 A1 | 12/2020 | Sloan et al. |
| 2020/0406777 A1 | 12/2020 | Nguyen et al. |
| 2021/0036649 A1 | 2/2021 | Iwazaki |
| 2021/0094400 A1 | 4/2021 | Loacker et al. |
| 2021/0129688 A1 | 5/2021 | Sawada |
| 2021/0155224 A1 * | 5/2021 | McKibben ............. B60L 50/75 |
| 2021/0218101 A1 | 7/2021 | Menon et al. |
| 2021/0380001 A1 | 12/2021 | Horder |
| 2022/0021050 A1 | 1/2022 | Sloan et al. |
| 2022/0021056 A1 | 1/2022 | Sloan et al. |
| 2022/0029176 A1 * | 1/2022 | Rovik ................ H01M 8/04074 |
| 2022/0111716 A1 | 4/2022 | McKibben et al. |
| 2022/0348113 A1 * | 11/2022 | Delrieu .................. B60L 58/30 |
| 2022/0388392 A1 | 12/2022 | Abbott |
| 2023/0001986 A1 | 1/2023 | Hendriks |
| 2023/0066866 A1 | 3/2023 | Smith |
| 2023/0126938 A1 | 4/2023 | Takaguchi et al. |
| 2023/0158880 A1 | 5/2023 | Ragot |
| 2023/0311597 A1 * | 10/2023 | McKibben ............. B60L 50/75 |
| | | 280/432 |
| 2023/0318084 A1 | 10/2023 | Sloan et al. |
| 2023/0406086 A1 | 12/2023 | Sloan et al. |
| 2023/0415556 A1 | 12/2023 | Wolf |
| 2023/0415587 A1 | 12/2023 | Sloan et al. |
| 2024/0140154 A1 | 5/2024 | McKibben et al. |
| 2024/0149657 A1 | 5/2024 | Coupal-Sikes et al. |
| 2024/0166040 A1 * | 5/2024 | Coupal-Sikes ...... H01M 50/207 |
| 2024/0166060 A1 | 5/2024 | Tyerman et al. |

(56) References Cited

U.S. PATENT DOCUMENTS

| | | | |
|---|---|---|---|
| 2024/0166069 A1 | 5/2024 | McKibben et al. | |
| 2024/0186614 A1 | 6/2024 | Sloan et al. | |
| 2024/0253700 A1* | 8/2024 | Zarpelon | B62D 21/03 |
| 2024/0286480 A1* | 8/2024 | Kumagai | B60L 50/66 |
| 2024/0300324 A1 | 9/2024 | Oko | |
| 2024/0416764 A1 | 12/2024 | Sloan et al. | |

FOREIGN PATENT DOCUMENTS

| | | |
|---|---|---|
| CN | 103863080 | 6/2014 |
| CN | 104993151 | 10/2015 |
| CN | 105438262 | 3/2016 |
| CN | 107848386 | 3/2018 |
| CN | 110914585 | 3/2020 |
| CN | 217270085 | 8/2022 |
| DE | 3940843 A1 | 6/1991 |
| DE | 4132741 A1 | 4/1993 |
| DE | 101 08 713 A1 | 9/2002 |
| DE | 10 2006 009 189 | 7/2007 |
| DE | 10 2011 109 024 | 1/2013 |
| DE | 10 2012 109062 | 3/2014 |
| DE | 10 2013 000112 | 3/2014 |
| DE | 10 2017 005313 | 12/2018 |
| EP | 1 577 143 A1 | 9/2005 |
| EP | 2 008 917 | 12/2008 |
| EP | 2 554 420 | 5/2014 |
| EP | 2 712 748 B1 | 5/2017 |
| EP | 2 712 788 | 2/2020 |
| EP | 3 640 123 A1 | 4/2020 |
| ES | 1079022 | 4/2013 |
| GB | 491788 | 9/1938 |
| GB | 527052 | 10/1940 |
| GB | 744973 A | 2/1956 |
| GB | 2546535 A | 7/2017 |
| GB | 2555906 | 5/2018 |
| JP | 2004-142524 | 5/2004 |
| JP | 2008-265685 | 11/2008 |
| JP | 2010-100207 | 5/2010 |
| JP | 2014-069686 | 4/2014 |
| KR | 10-1998-0035495 | 8/1998 |
| KR | 10-2017-0000950 | 1/2017 |
| KR | 10-2549321 | 6/2023 |
| WO | WO 2008/010045 | 1/2008 |
| WO | WO 2014/044618 | 3/2014 |
| WO | WO 2016/086326 | 6/2016 |
| WO | WO 2016/210329 | 12/2016 |
| WO | WO 2018/123337 | 7/2018 |
| WO | WO 2020/041630 | 2/2020 |
| WO | WO 2020/215018 | 10/2020 |
| WO | WO 2020/215023 | 10/2020 |
| WO | WO 2021/108429 | 6/2021 |
| WO | WO 2022/092994 | 5/2022 |
| WO | WO 2022/125929 | 6/2022 |
| WO | WO 2023/027959 | 3/2023 |
| WO | WO 2023/027960 | 3/2023 |
| WO | WO 2023/027961 | 3/2023 |
| WO | WO 2023/027965 | 3/2023 |
| WO | WO 2024/025711 | 2/2024 |

OTHER PUBLICATIONS

International Search Report and Written Opinion issued in PCT Application No. PCT/US2019/047773, dated Nov. 18, 2019, in 16 pages.

International Search Report and Written Opinion issued in International Patent Application No. PCT/US2020/028859, mailed Sep. 4, 2020 in 15 pages.

International Search Report and Written Opinion issued in International Patent Application No. PCT/US2020/028866, mailed Aug. 14, 2020 in 18 pages.

International Search Report and Written Opinion issued in PCT Application No. PCT/US2020/062054, dated Mar. 23, 2021, in 12 pages.

Tuma, "How to store lithium ion battery cell pack in electric bus?", dated Jul. 3, 2019, in 7 pages.

Tuma, Sliding Rails for Ebus Lithium Battery Pack Tray Automatic Bus Door Opening Mechanism, dated Aug. 15, 2019, in 3 pages.

* cited by examiner

ELECTRIC VEHICLE POWER DISTRIBUTION AND DRIVE CONTROL MODULES

INCORPORATION BY REFERENCE TO ANY PRIORITY APPLICATIONS

This application is a continuation application of PCT Application No. PCT/US2020/062054, filed on Nov. 24, 2020, which claims priority to U.S. Provisional Patent Application No. 62/940,687, filed Nov. 26, 2019, and U.S. Provisional Application No. 63/089,672, filed Oct. 9, 2020, each of which is incorporated herein by reference in its entirety. Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

This application is directed to electric vehicle modules including power distribution, power generation, and drive control modules alone and in combination with other powertrain and auxiliary component systems to streamline assembly of such systems and assemblies to a vehicle.

Description of the Related Art

Electric vehicles have become more and more popular in recent years. This is particularly true among passenger vehicles. The use of electric motors and batteries to propel heavy duty vehicles has been much less prevalent.

SUMMARY OF THE INVENTION

There is a need for improved systems and strategies for equipping vehicles with electric power storage, auxiliary assemblies, propulsion, power distribution assemblies, power generation assemblies, propulsion assemblies, and overall power and propulsion systems. Such should enable more than one vehicle component to be mounted in an advantageous location such as behind a cab of a vehicle, below or partly below the vehicle frame rails, and/or in a front end compartment of the vehicle assembly. The components can be combined into modules that can enable the components to be mounted together at the same time. A shared frame to support multiple components is needed. A frame that can fit within a space between a cab and another functional part of a vehicle, at least partially below a chassis frame rail assembly, and/or within the front end compartment of a stock chassis. A shared frame can be configured to be conveniently mounted to the vehicle in a straight-forward manner and can support components configured to control and distribute current from one or more battery assemblies and/or to control the charging of batteries within battery assemblies is needed.

In one embodiment, a front end accessory component assembly is provided that includes a frame, a first vehicle accessory, and a second vehicle accessory. The frame is configured to support vehicle accessories. The first vehicle accessory is mounted to the frame. The second vehicle accessory is mounted to the frame. The frame is configured to couple the first vehicle accessory and the second vehicle accessory to a chassis of a vehicle such that the front end accessory component assembly can be functionally coupled to at least two other vehicle sub-systems. The front end accessory component assembly can be electrically connected to a power distribution system that can be in a current path between a battery assembly and the front end component assembly.

The front end accessory component assembly greatly simplifies assembly to a vehicle assembly. For example, in some cases a frame of the front end accessory component assembly enables simultaneous connection of the accessories mounted on the frame of the front end accessory component assembly to the vehicle assembly. A simplified connection between the front end accessory component assembly and a power distribution system can be provided by virtue of a cable interface disposed between the power distribution system and the front end accessory component assembly.

The frame of the front end accessory component assembly can have an electrical component and a thermal management component coupled thereto. The electrical component can be electrically connected to a controller in a pre-installed configuration. The thermal management component is connected to a fluid conduit in the pre-installed configuration. The pre-installed configuration can be a configuration prior to placing the frame in a front end compartment of a vehicle assembly. In some cases, the electrical component can be coupled with power distribution component of a power distribution system. In some cases, the thermal management component can be coupled with conduits providing a fluid path between the thermal management component and an inverter or another heat generating component of the power distribution control system.

The frame of the front end accessory component assembly can have an accessory power distribution unit coupled thereto. The accessory power distribution unit can be electrically coupled with a plurality of electrical components in a pre-installed configuration. The accessory power distribution unit can be electrically coupled with a plurality of electrical components of a front end accessory component assembly in a pre-installed configuration. The accessory power distribution unit can be electrically coupled with a power distribution unit separately mountable to a vehicle form the front end accessory component assembly. The accessory power distribution unit can be electrically coupled with a power distribution unit comprising a collection of power distribution and control components in a modular assembly. The accessory power distribution unit can be electrically coupled with a power distribution unit configured to be directly mounted to a chassis of a vehicle.

The frame of the front end accessory component assembly can have a heat exchanger coupled thereto. The heat exchanger can be fluidly coupled to a plurality of segments of one or more coolant loops in a pre-installed configuration. The heat exchanger can be fluidly coupled to a coolant loop segment configured to couple with a power distribution and control module that is separately mountable to a vehicle, e.g., to couple to a coolant flow conduit, manifold or valve disposed in or on a housing of a power distribution and control system module.

In another embodiment, a frame is provided for supporting vehicle accessory components. The frame includes a frame array, a first tray, and a second tray. The frame array is configured to provide a rigid three dimensional frame structure. The first tray is coupled with the frame array. The first tray is configured to support an electrical component of a front end accessory component assembly. The second tray is coupled with the frame array spaced apart from the first tray. The second tray is configured to support a thermal management component of a front end accessory component assembly. The frame includes a plurality of frame system mounts. The frame is configured to be connected to a chassis of a vehicle to simultaneously mount a thermal management component coupled with the second tray and an electrical component coupled with the first tray to the chassis of the vehicle.

In another embodiment, an accessory component assembly is provided that includes a frame, a first vehicle accessory, and a second vehicle accessory. The frame is configured to support vehicle accessories. The first vehicle accessory is mounted to the frame. The second vehicle accessory is mounted to the frame. The frame is configured to couple the first vehicle accessory and the second vehicle accessory to a chassis of a vehicle such that the accessory component assembly can be functionally coupled to at least two other vehicle sub-systems. The accessory component assembly can be configured for mounting in a front end compartment, e.g., the same as or similar to an engine compartment or a frunk. The functional coupling can be provided by extending an electrical conveyance and/or a fluid conduit between the accessory component assembly and a module mounted to a spaced apart portion of a vehicle. The other module can be located behind the cab, e.g., directly behind a back wall of an enclosure of the cab or one or more fairings of the vehicle. The other module can be mounted to a rearward portion of a chassis spaced apart from a back wall of an enclosure of a cab, e.g., near rear wheels or beneath an enclosed storage volume of the vehicle.

The accessory component assembly can be a front end accessory component assembly or a rear end electric component assembly. A front end configuration can include a pump to direct coolant rearward to a separately mounted module via one or more conduits. A front end configuration can be electrically connected to a power distribution and control module configured to direct current in an electrical conveyance forwardly to the accessory component assembly configured to be mounted in a forward position. A rear end configuration can include a pump to direct coolant forwardly to a separately mounted module via one or more conduits. A rear end configuration can be electrically connected to a power distribution and control module configured to direct current in an electrical conveyance rearward to the accessory component assembly configured to be mounted in a rearward position. The accessory component greatly simplifies assembly to a vehicle assembly. For example, in some cases the frame of the front end accessory component assembly enables simultaneous connection of the accessories mounted on the frame of the front end accessory component assembly to a front portion of a vehicle assembly. A frame of a rear accessory component assembly enables simultaneous connection of the accessories mounted on the frame of the rear accessory component assembly to a rear portion of a vehicle assembly.

The frame of the front end accessory component assembly can have an electrical component and a thermal management component coupled thereto. The electrical component can be electrically connected to a controller in a pre-installed configuration. The thermal management component is connected to a fluid conduit in the pre-installed configuration. The fluid conduit can route cooling fluid to components pre-assembled to the front end accessory component assembly or to other units or modules of a larger vehicle system, e.g., to a power distribution system of an electric vehicle drivetrain. The pre-installed configuration can be a configuration prior to placing the frame in a front end compartment of a vehicle assembly or to coupling a frame assembly with a rear portion of a vehicle assembly.

The frame of the front or rear accessory component assembly can have an accessory power distribution unit coupled thereto. The accessory power distribution unit can be electrically coupled with a plurality of electrical components in a pre-installed configuration. The accessory power distribution unit can receive current from a separate module of a vehicle system, e.g., from a power distribution system that is configured to be separately mounted to a vehicle.

The frame of the front or rear end accessory component assembly can have a coolant loop component coupled thereto. The coolant loop component can be a conduit fluidly coupled to a component in need of cooling or to a heat exchanger of the accessory component assembly in a pre-installed configuration. The coolant loop component can comprise or be coupled with a conduit configure to supply coolant to a separate module of a vehicle system, e.g., to a power distribution system that is configured to be separately mounted to a vehicle to cool an inverter or other heat generating device disposed therein.

In another embodiment, a heavy duty vehicle power distribution system is provided. The system includes an electric vehicle control module and a cable interface coupled with the electric vehicle control module. The electric vehicle control module includes a frame assembly, a power distribution unit, and a plurality of inverter. The frame assembly has an array of frame members configured to support components of the electric vehicle control module and a frame rail bracket. The frame rail bracket 1108 is for coupling the electric vehicle control module with a vehicle frame rail. The power distribution unit is coupled with the frame assembly. The inverters are coupled with the frame assembly. The inverters are configured to transform DC current from a plurality of power sources into AC current to be distributed to a plurality of load components. The electric vehicle control module includes a powertrain control circuit configured to be coupled to and to control an electric motor coupled with a drive axle of a vehicle. The electric vehicle control module includes a cowling disposed around the frame assembly to enclose the power distribution unit, the plurality of inverters, and the powertrain control circuit. The cable interface has a first junction and a second junction. The first and second junctions are configured to connect the power distribution unit with a power source and a load respectively.

The heavy duty power distribution system described in the preceding paragraph can include a charge circuit. The charge circuit can be coupled with or disposed within the frame assembly. The charge circuit can be configured to control a process of charging one or more power sources. The charge circuit can be disposed within the cowling.

The frame assembly described in the preceding two paragraphs and in more detail below can have a low profile in a forward-to-rearward direction (sometimes referred to herein as depth). For example, the frame assembly is not configured to support a gas cylinder. The cowling surrounding the frame assembly can have a dimension between the forward facing side and the rearward facing side that is less than a diameter of heavy duty vehicle gas cylinder, e.g., less than about twenty-four inches (about 61 cm), in some cases less than about eighteen inches (about 46 cm), in some cases less than twelve inches (about 30 cm) and in one example about eight inches (about 20 cm). As such the frame assembly and cowling surrounding it can occupy minimal frame rail length when mounted to a vehicle.

The heavy duty power distribution system can include or can be coupled with fuel cell components. For example, in some embodiments a depth of the frame assembly can be increased by coupling a cylinder frame assembly with an electric vehicle control module frame assembly. The electric vehicle control module frame assembly can comprise a portion of the frame assembly discussed in the preceding three paragraphs. The cylinder frame module can enable the frame assembly to support a gas cylinder configured to store hydrogen fuel. The cylinder frame assembly and gas cylinder can be part of a hydrogen fuel module.

In some embodiments a hydrogen fuel module can include a fuel cell configured to be placed in fluid communication with hydrogen gas disposed in the gas cylinder. One modular system advantageously disposes the fuel cell within the cowling to be mountable upon coupling the frame rail bracket to a frame rail of a vehicle.

In some embodiments, a fuel cell is advantageously disposed in a fuel cell module. The fuel cell module is configured to be mounted to a frame rail of a vehicle. The fuel cell module enables the fuel cell to be mounted separately from other components of the power distribution system module which can be mounted behind the cab.

In some embodiments a coolant module can be provided. The coolant module can be included in the fuel cell module. The coolant module can be operable to remove heat from a fuel cell.

In another embodiment a heavy duty vehicle power distribution system is provided that includes an electric vehicle control module and a cable interface coupled with the electric vehicle control module. The electric vehicle control module includes an electric vehicle frame assembly and a power distribution component coupled with the electric vehicle control module frame assembly. The electric vehicle control module frame assembly has an array plurality of frame members configured to support components of the electric vehicle control module and a frame rail bracket. The frame rail bracket is configured for coupling the electric vehicle control module with a vehicle frame rail, e.g., behind a cab thereof. The power distribution system module also includes a cowling disposed around the power distribution component. The cable interface has a first junction and a second junction. The first and second junctions are configured to connect the power distribution component with a power source and a load respectively.

In some embodiments, the heavy duty vehicle power distribution system module includes a fuel module. The fuel module can include a cylinder frame assembly coupled to an electric vehicle control module frame assembly. The cylinder frame assembly can be configured to support a gas cylinder configured to store gaseous fuel. The gas cylinder can be configured to store compressed natural gas and can be configured to be placed in fluid communication with a combustion engine. The fuel module can include a fuel cell configured to be placed in fluid communication with gaseous fuel, e.g., hydrogen gas, disposed in the gas cylinder. The fuel cell can be disposed within a cowling surrounding other components of the heavy duty vehicle power distribution system module. The fuel cell can be mountable upon coupling the frame rail bracket of the heavy duty vehicle power distribution system module to a frame rail of a vehicle. The fuel cell can be disposed in a fuel cell module to be separately mounted to a vehicle, e.g., directly to a frame rail thereof or in a front end compartment thereof.

In some embodiments a coolant module can be provided to cool a fuel cell. The coolant module can include a plurality of fans mounted in a fan housing, the fan housing coupled to a frame assembly of the fuel cell module, which can be coupled with the chassis. The coolant assembly can be disposed adjacent to the fuel cell. In some cases, the fan housing and fan(s) can be integrated into the fuel cell module and mountable as a unit therewith.

In another embodiment, a range extender module is provided that includes a frame and a range extender component. The frame has a first lateral portion configured to be disposed adjacent to an outside surface of a first frame rail of a vehicle chassis, a second lateral portion configured to be disposed adjacent to an outside surface of a second frame rail of the vehicle chassis, and a support member disposed between the first and second lateral portions. The support member is configured to extend transverse to the longitudinal direction of the first and second frame rails. The range extender component is coupled with and supported by the support member. One or both of the first and second lateral portions is configured to support the support member and the range extender component on the frame rails when coupled therewith.

In some embodiments, the range extender component comprises a fuel cell. In some embodiments, the range extender component comprises a generator, e.g., a motor supplied with combustion gas from a combustion gas cylinder that can be separately mounted to a vehicle.

In some modified embodiments the range extender module includes a coolant module. The coolant module can include a heat exchanger. The heat exchanger can be coupled with the frame, e.g., with the first lateral portion. In some cases, the coolant module is a first coolant module and the range extender module also includes a second coolant module. The second coolant module can be coupled with the frame, e.g., with the second lateral portion.

In another embodiment a heavy duty vehicle propulsion system is provided that includes a power distribution module, a cable interface, a power source, and an electric motor. The power distribution module includes a housing that is configured to be vertically oriented and mounted to a heavy duty vehicle rearward of a cab thereof. The power distribution module has a power distribution component disposed within the housing. The cable interface is coupled with the power distribution module. The cable interface has a first junction and a second junction. The power source is coupled to the first junction. The electric motor is coupled to the second junction. The electric motor is coupled to a drive axle to drive wheels of the vehicle. The power distribution component controls current flow to or from at least one of the first junction and the second junction.

BRIEF DESCRIPTION OF THE DRAWINGS

Features of the invention can be better understood from the following detailed description when read in conjunction with the accompanying schematic drawings, which are for illustrative purposes only. The drawings include the following figures.

DETAILED DESCRIPTION OF THE PREFERRED EMBODIMENT

Figure 1:
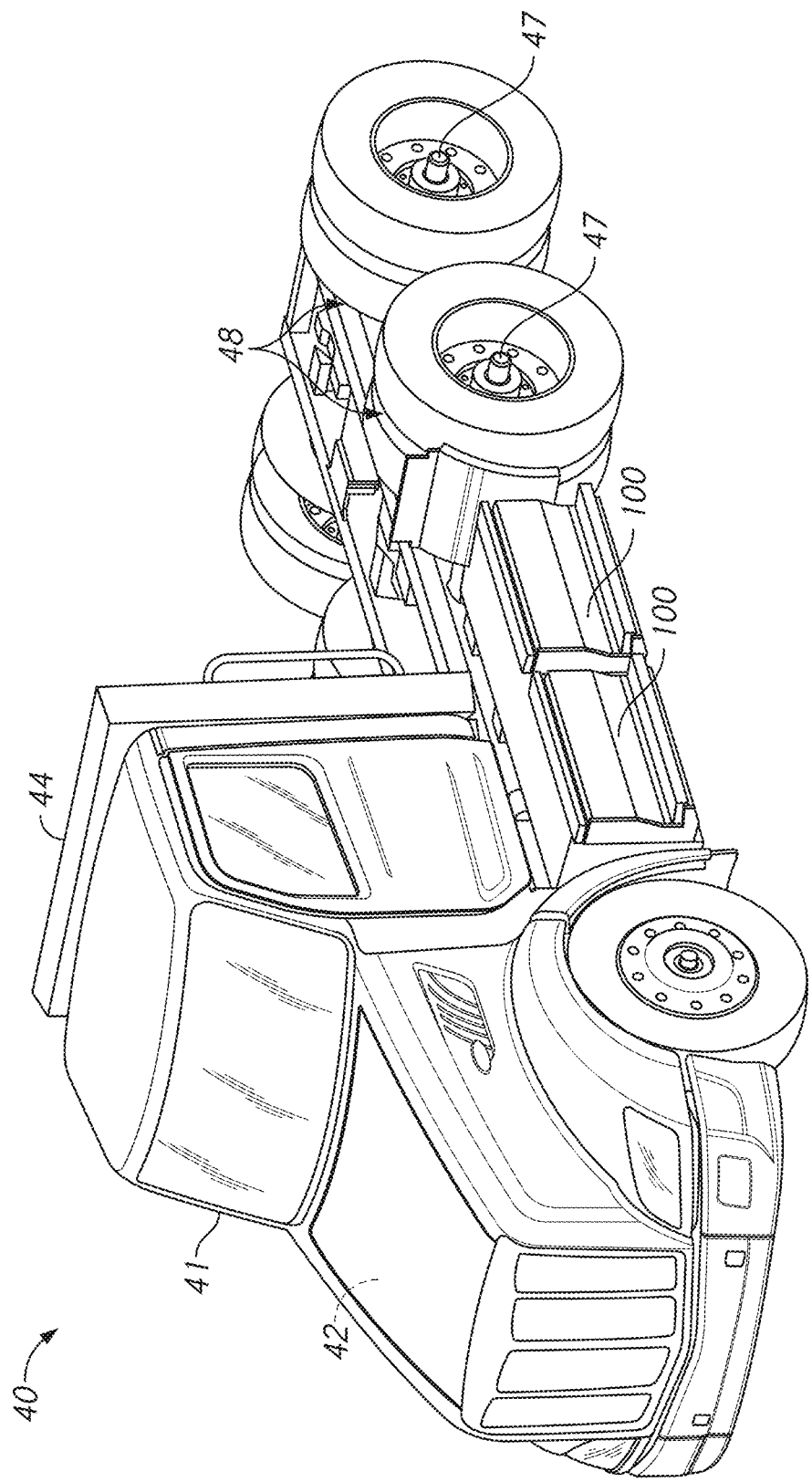
FIG. 1 is a front perspective view of a tractor unit of a tractor-trailer vehicle including an electric propulsion system that includes a power distribution system module.
Figure 1A:
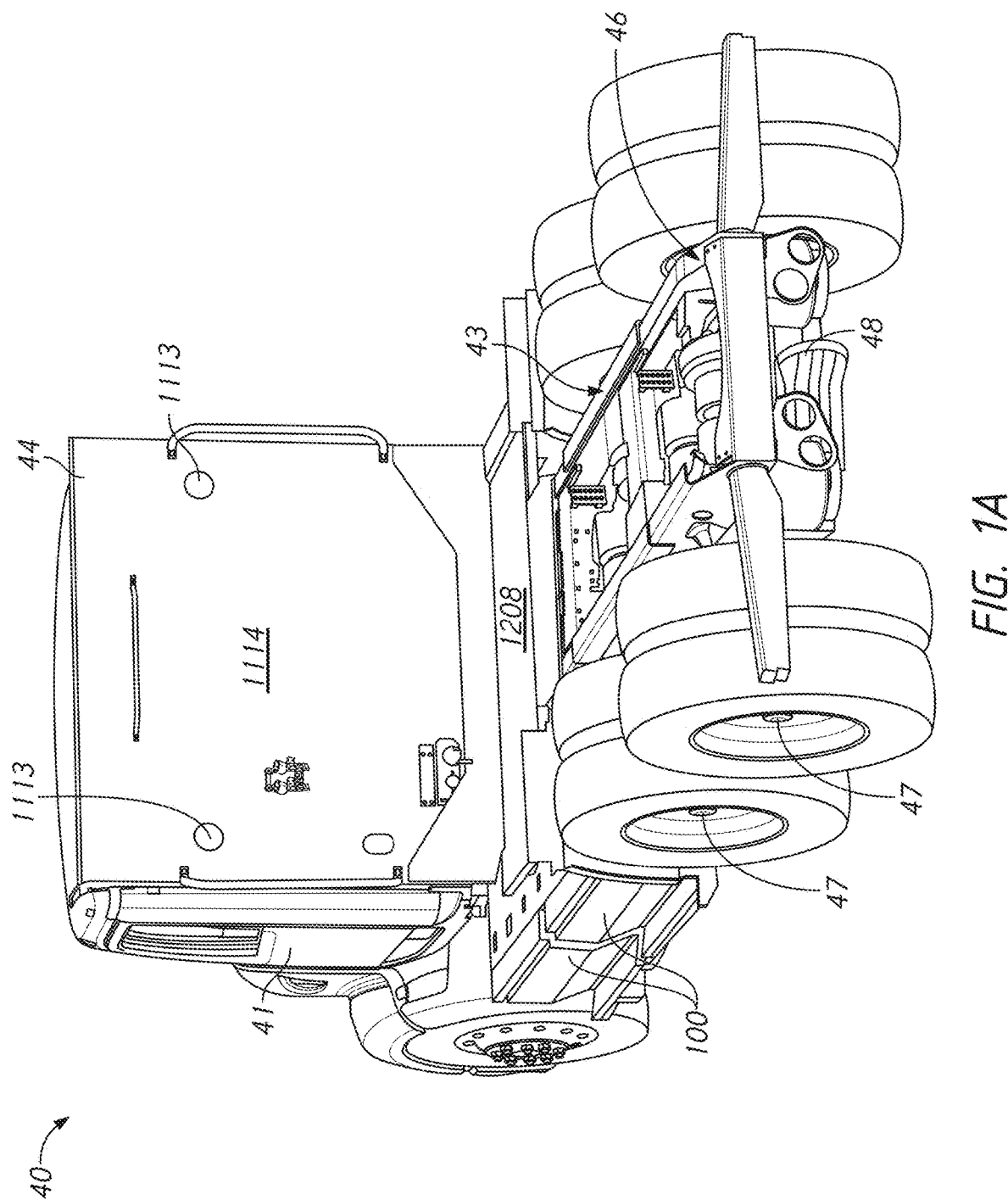
FIG. 1A is a rear perspective view of the tractor unit of FIG. 1 showing a rear side of the power distribution system module.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses novel electrical power systems, including a power distribution system module 44, one or more battery assemblies 100, a combined power distribution and fuel module 1300, 1300A, 1300B, 1300C, a range extender module such as a fuel cell module 1304, a front end accessory component assembly 104, and an electric motor 48 or any combination of two or more of the foregoing or of modified embodiments thereof as disclosed herein. By providing highly integrated systems, a vehicle 40 or a vehicle assembly 50 can be quickly equipped with an electrical power system that can include battery assemblies, accessory component assemblies, power distribution system modules, axle drive motors or combinations thereof configured to be in electrical and/or fluid communication with each other.

I. Vehicle Assembly Including Electrical Power System

FIGS. 1-1D and 2-2A show examples of vehicles and vehicle assemblies that can be equipped with one or more examples of systems disclosed herein. A fully assembled vehicle could have more components than illustrated in FIGS. 1-2A, e.g., a chassis 46 including frame rails 43A supporting wheels. The vehicle can be configured as a tractor trailer combination with a cab having a hood as in vehicle 40. The vehicle can have an integrated cargo box disposed on the frame assembly 54 trailer unit as in vehicle assembly 50.

Figure 2:
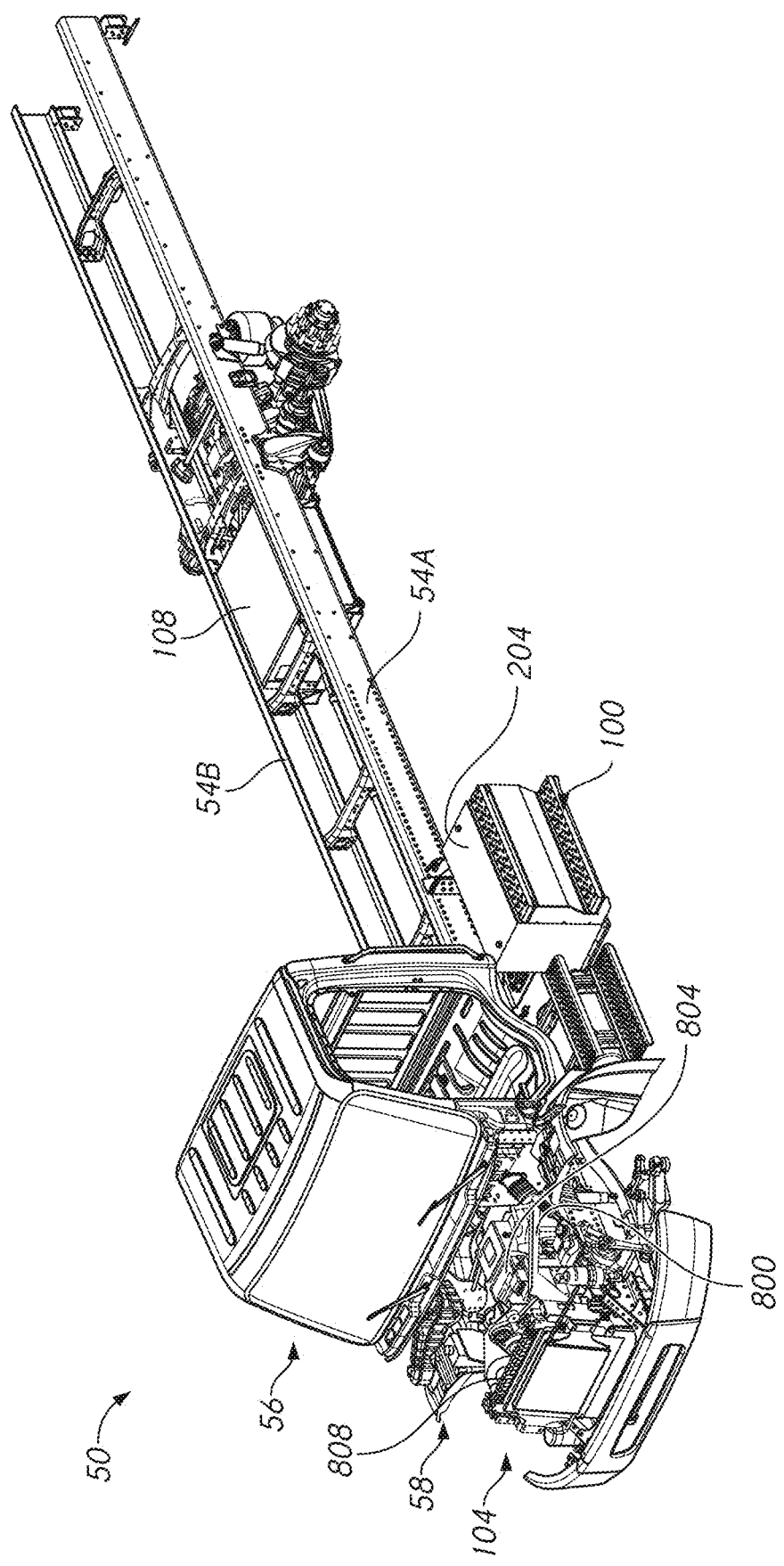
FIG. 2 is a top perspective view of a vehicle assembly having a power distribution unit directly mounted between frame rails of the vehicle assembly.
Figure 2A:
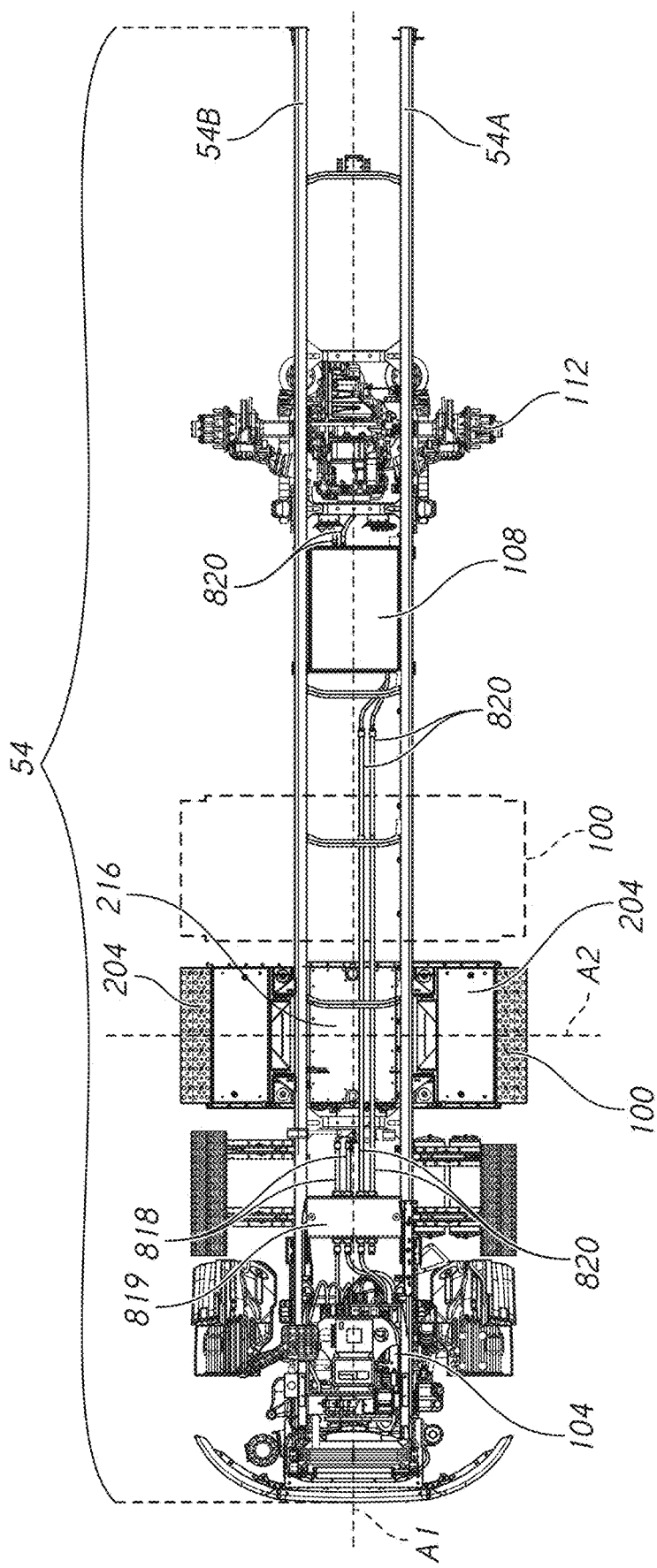
FIG. 2A is a top view of the vehicle assembly shown in FIG. 2 with a cab assembly removed for clarity.

FIGS. 2-2A show the vehicle assembly 50 includes a frame assembly 54 that includes frame members, such as a first longitudinal frame member 54A and a second longitudinal frame member 54B. The frame assembly 54 can be or can form a portion of a chassis. The vehicle assembly 50 can include a cab 56 rigidly coupled to the frame assembly 54. The vehicle assembly 50 can include an articulating connection between the cab 56 and a rear portion the frame assembly 54 in other embodiments. The cab 56 can be disconnectable from the rear portion, e.g., as in a tractor-trailer configuration. Many other vehicle assemblies can form an environment for deploying examples of systems disclosed herein.

FIG. 2 shows a perspective view in which a battery assembly 100 is coupled with the frame assembly 54. The battery assembly 100 can be mounted to the frame assembly 54 across a central longitudinal axis A1 (see FIG. 2A) of the frame assembly 54. FIG. 2A shows that in some examples, the battery assembly 100 is elongate along a longitudinal axis A2. The battery assembly 100 can have a first set of sides that are parallel to the longitudinal axis A2 and a second set of sides that are transverse to the longitudinal axis A2. The first set of sides can be long sides of the battery assembly 100. The battery assembly 100 can be configured such that either of the sides parallel to the longitudinal axis A2 can be forward or rearward facing on the vehicle assembly 50 when applied. The battery assembly 100 can be configured such that either of the sides transverse to the longitudinal axis A2 can be on a driver side or a passenger side of the vehicle assembly 50 when applied. The battery assembly 100 can be oriented transverse to the longitudinal axis A1 of the vehicle assembly 50 when coupled thereto. The battery assembly 100 can be generally symmetrical about an axis perpendicular to the longitudinal axis A2 (e.g., an axis central to the battery assembly 100 or equidistant from the end portions thereof). In some cases, only one of the first set of sides has electrical connections. Symmetry to the longitudinal axis A2 provides that at least some of the connection features, e.g., the coolant connections, can be located in the same position regardless of which of the vertical faces across the long direction of the battery assembly 100 is forward facing. The battery assembly 100 can be symmetrical to the longitudinal axis A1 of the vehicle assembly 50 when the battery assembly 100 is mounted to the vehicle assembly 50. The symmetry about the longitudinal axis A1 evenly distributes the weight of the battery assembly 100 on the frame assembly 54. This enables a mounting system for connecting the battery assembly 100 to the vehicle assembly 50 to include the same or similar components on both sides of the longitudinal axis A1.

FIGS. 2 and 2A illustrate modular electric vehicle systems. Such a modular systems can include the battery assembly 100. FIG. 2 shows that the vehicle assembly 50 can also have coupled therewith a front end accessory component assembly 104. The front end accessory component assembly 104 can be a system that can be mounted in a front end compartment 58 of the vehicle assembly 50. The front end compartment 58 can be of the same or a similar configuration as is provided in a combustion engine vehicle. That is, the front end compartment 58 can be or can include a space or a volume that is enclosed by the chassis of the vehicle assembly 50 and by a hood (now shown for clarity). The volume and general form of front end compartment 58 can be configured for an internal combustion engine. The front end accessory component assembly 104 can be shaped to occupy approximately the same volume or less volume than is occupied by the conventional internal combustion engine for which the vehicle assembly 50 was originally constructed. Said another way, the chassis including the frame assembly 54 and the front end compartment 58 can be originally designed for or can be compatible with an internal combustion engine, but can be diverted in manufacturing to an assembly including the front end accessory component assembly 104. This enables the end customer to elect between internal combustion engines and electric motor propulsion of the vehicle. Some customers may require both propulsion types but may desire the same overall vehicle configuration for other systems and subsystems. Thus, the electric vehicle systems disclosed herein advantageously do not require a custom chassis or front end compartment 58.

The front end accessory component assembly 104 can be configured to mount within the front end compartment 58 with some minimal modifications. For example, the front end accessory component assembly 104 can be coupled with brackets that can mount in convenient locations within the front end compartment 58. Such locations may be pre-defined by the manufacturer of the vehicle assembly 50 or may be provided by the installer, for example drilling holes in the chassis as needed. In some embodiments, such brackets can be coupled near or even directly on existing engine mounts that are provided for a conventional combustion engine. The mounts that would otherwise support the engine can be used to support one or more support brackets coupled with the front end accessory component assembly 104 in some applications.

A modular system can combine the battery assembly 100 and the front end accessory component assembly 104 and/or a power distribution system module 44, 1300 (discussed below in connection with a vehicle 40 in FIGS. 1-1D), 1300A, 1300B, 1300C which can be placed in communication with each other, as discussed further below. A modular system can combine one or more of the battery assemblies 100, 1004A, 1004B, and a rear end electric component assembly 108 which can be placed in communication with each other, as discussed further below. In some variations, the power distribution system module 44, 1300, 1300A, 1300B, 1300C includes a power distribution unit 1132 that can house some or all of the components as may be provided in the rear end electric component assembly 108. The simplified system can integrate the rear electric component assembly 108 into the power distribution system module 44, 1300, 1300A, 1300B, 1300C, as discussed further below. In some cases, a modified form of the power distribution system module 44, 1300, 1300A, 1300B, 1300C is configured to be provided behind the cab 56 and the rear end electric component assembly 108 also can be provided and separately mounted, e.g., as shown in FIGS. 2-2A. A modular system can combine the battery assembly 100 and an axle drive assembly 112 which can be placed in communication with each other. The axle drive assembly 112 can include an electric motor 48. A modular system can combine a front end accessory component assembly 104 and a rear electric component assembly 108 (such as the power distribution system modules 44, 1300, 1300A, 1300B, 1300C or a power distribution unit enclosed in the power distribution system module 44 or mounted separately) in some embodiments. A modular system can include any two or more of the battery assemblies 100, the front end accessory component assembly 104, the power distribution system module 44, 1300, 1300A, 1300B, 1300C alone or together with another rear electric component assembly 108, and the axle drive assembly 112.

Figure 1B:
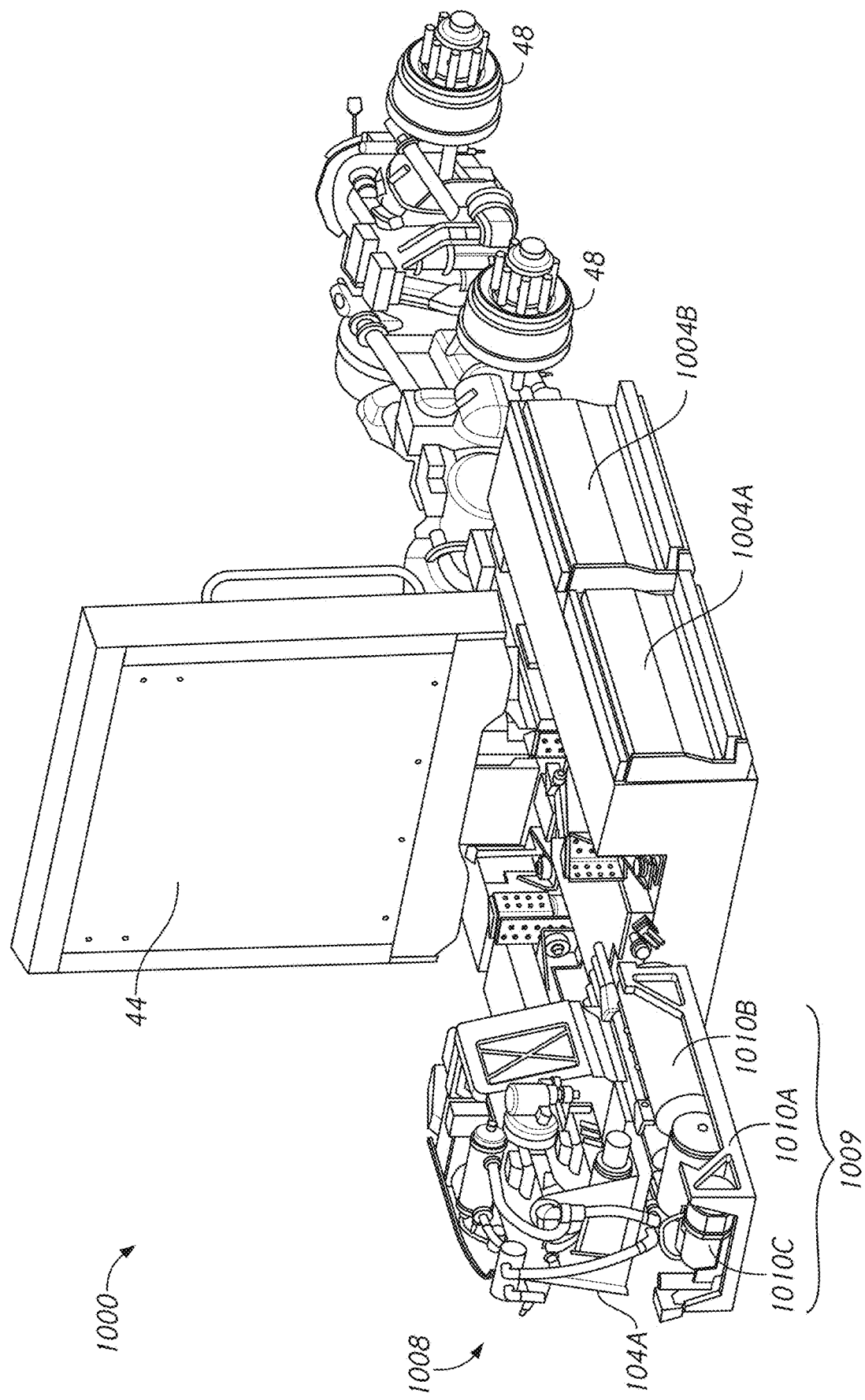
FIG. 1B shows an overall electric propulsion system that includes a power distribution system module, a front-end accessory module, battery assemblies and electric motors.
Figure 1C:
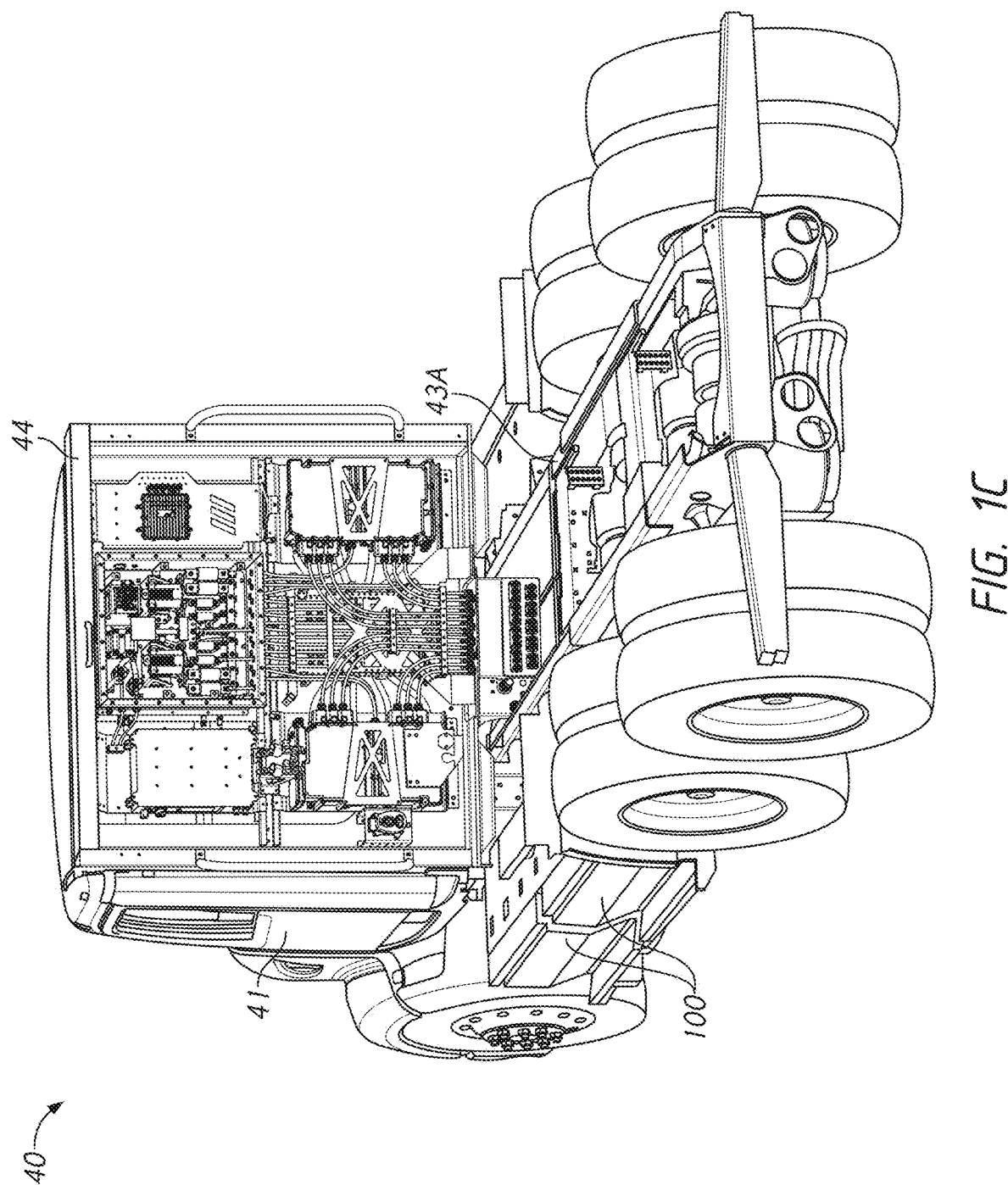
FIG. 1C shows a view similar to that of FIG. 1A with a rear portion of a cowling of the power distribution system module removed.

FIGS. 1-1C shows the power distribution system module 44 mounted to a vehicle 40. The vehicle 40 is a tractor unit that can be combined with a trailer unit of a tractor-trailer vehicle. The vehicle 40 includes a cab 41 located rearward of a front end compartment 42. The front end compartment 42 includes a volume enclosed in a vehicle cowling which can include a hood providing access to the compartment 42. The vehicle 40 includes a chassis or frame assembly 43. The frame assembly 43 includes one or more frame rails 43A. The frame rails 43A support wheels that are mounted to one or more axles 47. The frame rails 43A also can support the power distribution system module 44.

The power distribution system module 44 can be provided with or mounted adjacent to an access platform that can include a deck member 1208, as discussed below. FIGS. 1-1C shows that the power distribution system module 44 can be positioned rearward of the cab 41. The power distribution system module 44 can be directly coupled to the frame rails 43A by one or more mounting brackets as discussed further below.

A. Modular Systems Including a Power Distribution System Module, a Battery Assembly, and/or a Front End Accessory Component Assembly FIG. 1B shows an electric propulsion system 1000 that includes the power distribution system module 44. In various embodiments, the electric propulsion system 1000 can power all of the electrical components on a vehicle, such as the tractor unit vehicle 40 or a box truck including the vehicle assembly 50. To that end, the electric propulsion system 1000 can include one or a plurality of battery assemblies, e.g., a battery assembly 1004A and a battery assembly 1004B. The battery assembly 1004A, battery assembly 1004B can be electrically connected to the power distribution system module 44 via high voltage cables, as discussed further below. Current can be supplied from the battery assembly 1004A and/or the battery assembly 1004B under the control of one or more power distribution components in the power distribution system module 44.

The power distribution system module 44 also can be connected to other modules external thereto, such as a propulsion module that can include one or more electric motors 48 coupled with one or more axles 47 and thereby with wheels. The power distribution system module 44 can be connected to the electric motor(s) 48 via one or more high voltage cables as discussed further below.

In some cases, the power distribution system module 44 also can be coupled with an auxiliary component module, which can include the front end accessory component assembly 104 or an auxiliary component module 1008 described in more detail below.

Whether provided separately or combined with a battery assembly 100 or integrated into the electric propulsion system 1000, the front end accessory component assembly 104 can include a frame 800 that is configured to mount to the chassis of the vehicle assembly 50 in the front end compartment 58. The front end accessory component assembly 104 can be connected to the frame assembly 43 of the vehicle 40 in a tractor-trailer application. As discussed further below, the auxiliary component module 1008 is similar to the front end accessory component assembly 104 but also includes a lower accessory tray assembly as discussed further below. The frame 800 advantageously enables a common chassis that is design to support an internal combustion engines to be equipped with electrical power systems. The frame 800 preferably can be coupled with a mount features, e.g., plate(s), bracket(s), or rib(s) that are located in space to be positionable at, adjacent to or on a surface of the chassis or even in some applications directly on engine mount portions of the chassis in the front end compartment 58. If placed on the surface of the chassis, the plate(s), bracket(s), or rib(s) can be secured at pre-existing holes or at holes that are formed in the chassis for the front end accessory component assembly 104. The overall volume and shape as well as the mount features coupled to the frame 800 enable the front end accessory component assembly 104 to be directly placed in the front end compartment 58 and coupled to the chassis of the vehicle assembly 50 or the front end compartment 42 of the vehicle 40 without significant or any modification of the structure surrounding the front end compartment.

The front end accessory component assembly 104 also can have one or more vehicle accessories coupled therewith so that when the frame 800 is coupled to the frame assembly 54, the accessories are simultaneously mounted to the frame assembly 54 or other chassis component or portions of a chassis or frame assembly 43 of the vehicle 40 in the front end compartment 42 thereof at the same time that the frame 800 is mounted thereto. The front end accessory component assembly 104 can include a first vehicle accessory 804 that can be a heat exchanger, such as a chiller for controlling the temperature of coolant within an acceptable operational range. The heat exchanger 804 can include and/or be in fluid communication with fluid conduits that can be disposed between the front end accessory component assembly 104 and the battery assembly 100. The coolant conduits are configured to convey cooling fluid or coolant from the heat exchanger 804. As discussed above, the symmetry of the battery assembly 100 about the longitudinal axis A2 enables such conduit(s) to be fluidly coupled to either side of the battery assembly that is parallel to the longitudinal axis A2 such that the battery assembly can have two equivalent positions about a vertical axis. In some variations, the battery assembly 100 has a dedicated front side and the cooling fluid conduits can be connected such that upstream (cooler) portion of a cooling loop connects to the front side of the battery assembly 100. In other variations, a battery assembly 100 with a dedicated front side can be connected such that upstream (cooler) portion of a cooling loop connects to the rear side of the battery assembly 100. The first vehicle accessory 804 also can be a heat exchanger configured to supply coolant to the power distribution system module 44 or to the electric motor 48 as discussed further below.

The front end accessory component assembly 104 can include a second vehicle accessory 808 that serves a different function from the first vehicle accessory 804. For example, the second vehicle accessory 808 can include an electrical accessory such as a fluid pump to convey coolant from the heat exchanger, which is one example of the first vehicle accessory 804 of the front end accessory component assembly 104 to the battery assembly 100. The second vehicle accessory 808 could be one or more of an air compressor, a current driven component, a controller for a thermal system, a power steering fluid pump, a heater core, a voltage converter, a fan, power distribution unit for high voltage uses, power distribution unit for low voltage uses, and any other sort of controller that receives electric current or that controls an aspect of the operation of the battery assembly 100 or another electrical component. The first vehicle accessory 804 and the second vehicle accessory 808 could both be electrical components such as those listed above or elsewhere herein. The first vehicle accessory 804 and the second vehicle accessory 808 could both be thermal management components, such as heat exchangers in some applications.

As explained in greater detail below, the modular electric vehicle system shown in FIGS. 2-2A combines the front end accessory component assembly 104 and the battery assembly 100 such that front end accessory components can be placed in electrical communication and/or in fluid communication with the battery assembly 100. The modular system shown in FIGS. 1-1C allows battery assemblies 1004A, 1004B to be electrically connected to the auxiliary component module 1008 and to the electric motor 48 by way of the power distribution system module 44. In some variations modular systems combine the front end accessory component assembly 104 and the rear end electric component assembly 108 or the power distribution system module 44 and the electric motor 48 such that thermal management, current supply or component control can be coordinated among these assemblies. Modular systems can combine the battery assembly 100 with one or more of the front end accessory component assembly 104, the rear end electric component assembly 108, the power distribution system module 44, or the axle drive assembly 112 or the electric motor 48.

FIG. 2A illustrates that in another sense a modular system can be provided with two or more battery assemblies 100. In a similar manner, FIGS. 1-1C shows that the vehicle 40 can be equipped with two battery assemblies 100, e.g., a battery assembly 1004A and a battery assembly 1004B. The battery assembly 100 in solid lines is shown to be augmented by a second battery assembly 100 in dashed lines. The second battery assembly 100, illustrated in dashed line, can be located behind a first battery assembly 100. The battery assemblies 100 can be mounted in a linear array along the longitudinal axis A1 of the vehicle assembly 50. Although not shown in FIG. 2A, a location for a second or subsequent battery assembly 100 can be forward of the location of the solid line battery assembly 100. A forward location can be directly under the cab 56 in a modular system with one, two, or more than two battery assemblies 100. When disposed directly under the cab 56 the battery assembly 100 can advantageously have one or more steps directly mounted thereon to enable a driver or passenger to enter or exit the cab 56. As discussed further below a lower step and an upper step can be integrated into a step assembly that is supported directly by a housing of the battery assembly 100 to enable battery units in the battery assembly 100 and the step assembly to be simultaneously attached to the frame assembly 54 to make the assembly of the modular system or of the battery assembly 100 to the vehicle assembly 50 more efficient for the end user. In some cases, modular systems can be formed from a small number of variants of the battery assembly 100, such as providing one or more battery assembly 100 with one or more steps and one or more battery assembly 100 without steps, which variant can be combined in a system based on the need for or the positions of steps. Mounting the steps directly on the battery assembly 100 can enable the vehicle assembly 50 to have a smaller lateral profile by eliminating separate support members to support the steps. In some cases, an access deck 1200 can be provided in a modular assembly, e.g., as part of the power distribution system module 44 as discussed further below.

In another modular system, the front end accessory component assembly 104 is not provided. Instead, front end accessories are mounted in another manner, e.g., separately within the front end compartment 58 or elsewhere at other locations of the vehicle assembly 50. For example, one or more components of the front end accessory component assembly 104 or the auxiliary component module 1008 can be incorporated into the power distribution system module 44 as described further below. This can allow the front end compartments 42 or 58 to be used for an additional battery module for additional battery capacity. A modular system can include one or more battery assemblies 100 and the rear end electric component assembly 108. A modular system can include a plurality of battery assemblies 100 to provide for greater range from a fully charged condition to a fully depleted condition than in a system with only one battery assembly 100. The battery assemblies 100 are advantageously configured for flexible connection to the vehicle assembly 50 or the vehicle 40, e.g., in a forward facing direction on the frame assembly 54 or in a rearward facing direction on the frame assembly 54. In some cases, one of the battery assembly 100 can be forward facing and another can be rearward facing. The battery assembly 100 can be symmetrical such that forward and rearward facing mounting includes providing the longitudinal axis A2 transverse to, e.g., perpendicular to the longitudinal axis A1. The battery assembly 100 can be asymmetrical as to system connections, e.g., with dedicated coolant inflow manifolds such that forward facing provides a dedicated inflow manifold side of the battery assembly 100 forward of a dedicated fluid outflow manifold when installed on the frame assembly 54. The battery assembly 100 can be asymmetrical as to electrical connection such that the power cables are only attached at one side of the battery assembly 100.

The flexibility in connection fosters a modular system that can allow the battery assembly 100 to be mounted to the frame assembly 54 as space permits. The symmetry of the battery assembly 100 about the longitudinal axis A1, when provided, allows the battery assembly 100 to have the same weight balance regardless of which of the long faces is forward facing when the battery assembly 100 is installed on the frame assembly 54. In some cases, heat transfer systems of the battery assembly 100 allow coolant to be delivered to a coolant flow path in the battery assembly 100 from either of two manifolds at the ends of the coolant flow paths. This can allow the end user to determine whether to dedicate a shorter coolant conduit to the cooler side or to the hotter side of the battery assembly 100. A longer conduit on the hotter side of the battery assembly 100 may enable some heat to dissipate before entering a heat exchanger, which could enable a smaller or less costly heat exchanger to be used.

Figure 1D:
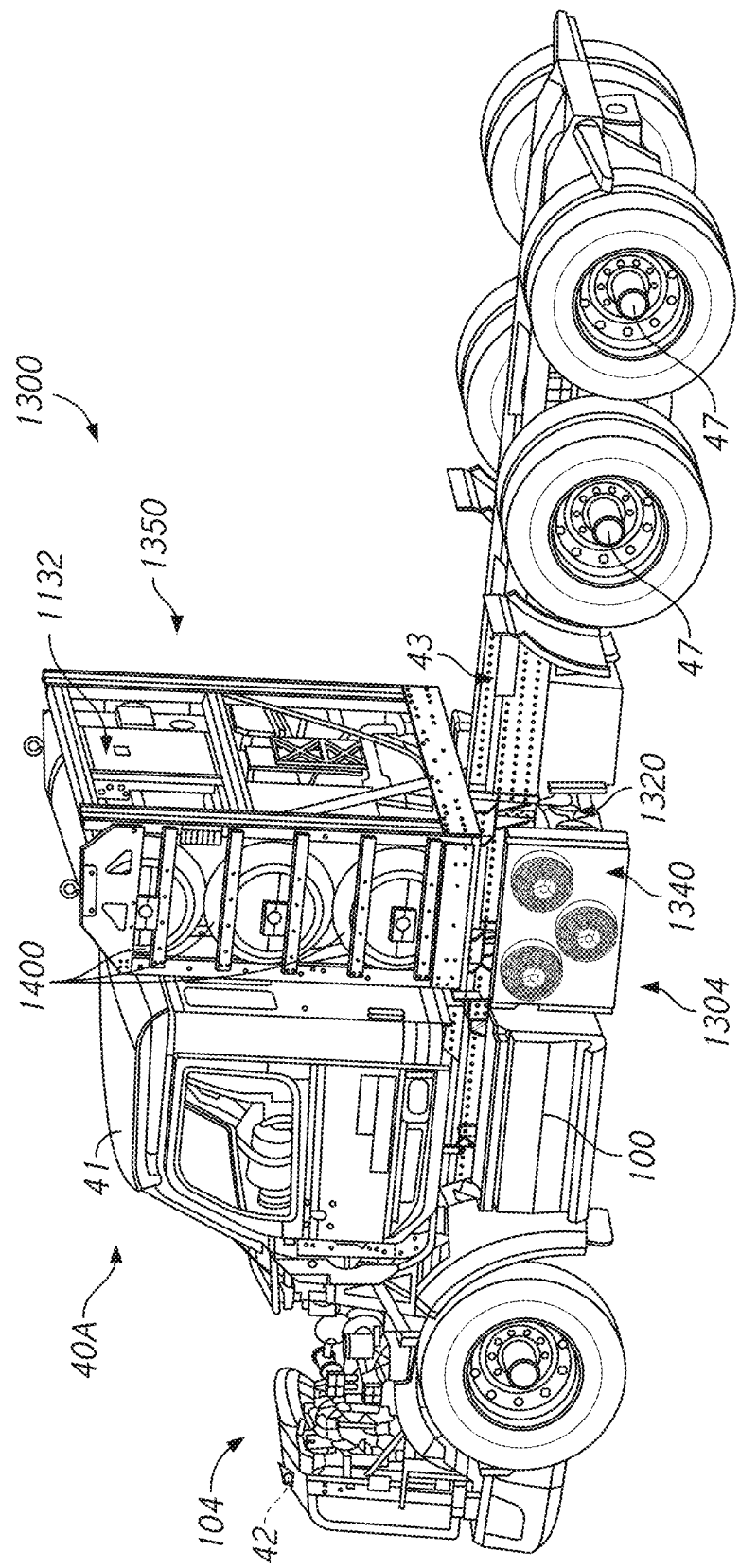
FIG. 1D is a rear perspective view of a vehicle with a power distribution module that includes fuel cell components.

B. Modular Systems Including a Power Distribution System Module and a Range Extender Module FIG. 1D shows a vehicle 40A that is similar to the vehicle 40 except as described differently below. For example, the vehicle 40A can include a cab 41, a front end compartment 42, a front end accessory component assembly 104, a frame assembly 43, frame rails 43A, axles 47, and a battery assembly 100, among other components and/or assemblies.

The vehicle 40A can include a power distribution system module 1300, a range extender module in the form of a fuel cell module 1304, and/or a front end accessory component assembly 104. The power distribution module 1300 is shown in greater detail in FIG. 21 and described further below. In some embodiments, at least some of the components of the fuel cell module 1304 can be integrated in the housing 1350 (see FIG. 21) of the power distribution system module 1300. In some embodiments, at least some of the components of the front end accessory component assembly 104 can be integrated in the housing 1350 of the power distribution system module 1300.

The power distribution system module 1300 can be positioned behind the cab 41 of the vehicle 40A. The power distribution system module 1300 can include a power distribution module (e.g., including a power distribution unit) and a fuel module (e.g., including gas cylinders). For example, one or more gas cylinders 1400 (e.g., two gas cylinders, three gas cylinders, four or more gas cylinders, etc.) for storing gases such as hydrogen can be positioned within the housing 1350 of the power distribution system module 1300.

The fuel cell module 1304 can include one or more fuel cell(s) 1320 and/or one or more coolant module(s) 1340 (e.g., radiators and fans). The fuel cell(s) 1320 and/or coolant module(s) 1340 can be positioned within, or can be separate from, the housing 1350 of the power distribution system module 1300. For example, the fuel cell(s) 1320 can be positioned in the housing 1350 of the power distribution system module 1300, in the fuel cell module 1304 at least partially between and/or at least partially below the frame rails 43A of the frame assembly 43 of the vehicle 40A, and/or in an engine compartment. The fuel cell module 1304 can be positioned beneath the power distribution system module 1300. In some applications, the vehicle 40A can include a plurality of fuel cell(s) 1320 and/or a plurality of fuel cell module(s) 1340. The gaseous fluid disposed in the gas cylinders 1400 can be placed in fluid communication with the fuel cell(s) 1320. For example, hydrogen gas stored in the gas cylinder(s) 1400 in the power distribution system module 1300 can be provided to the fuel cell(s) 1320 to fuel the fuel cell(s) 1320 in operation of the fuel cell(s) 1320 to generate current.

While the fuel cell module 1304 is a convenient example of a range extender module, other range extenders modules are contemplated. For example, the fuel cell 1320 can be replaced with another component configured to produce electrical energy on the vehicle 40A. For example, a generator of any type, e.g. including a turbine, could be provided within the power distribution module 1300 or to be coupled therewith. In one example, an auxiliary motor could operate by burning a combustion gas stored in a combustion gas cylinder 1402 (discussed further below in connection with FIG. 24). The power distribution module 1300 could be modified to include an inverter to enable the current generated by the generator to be supplied to a battery assembly and/or to a load (e.g., directly to the electric motor 48). The auxiliary motor could have an output shaft engaged with a generator to generate current to replenish the battery assembly 1004A, the battery assembly 1004B or another battery assembly as described herein which could be disposed on the vehicle 40A or could provide current directly to the electric motor 48. Thus, the auxiliary motor could generate current to indirectly drive the axle 47 by way of the electric motor 48.

The vehicle 40A can include one or more battery assemblies 100. As illustrated in FIG. 1D, the battery assembly 100 can be positioned beneath the cab 41. Depending on the length of the frame assembly 43 of the vehicle 40A, the first battery assembly 100, or an additional battery assembly 100, can be positioned rearward of the cab 41 and/or rearward of the power distribution system 1300 along the length of the frame assembly 43. FIG. 2 illustrates a longer frame assembly 54 providing space for a more rearward position of the battery assembly 100 or for multiple battery assemblies 100 in some variations.

Figure 24:
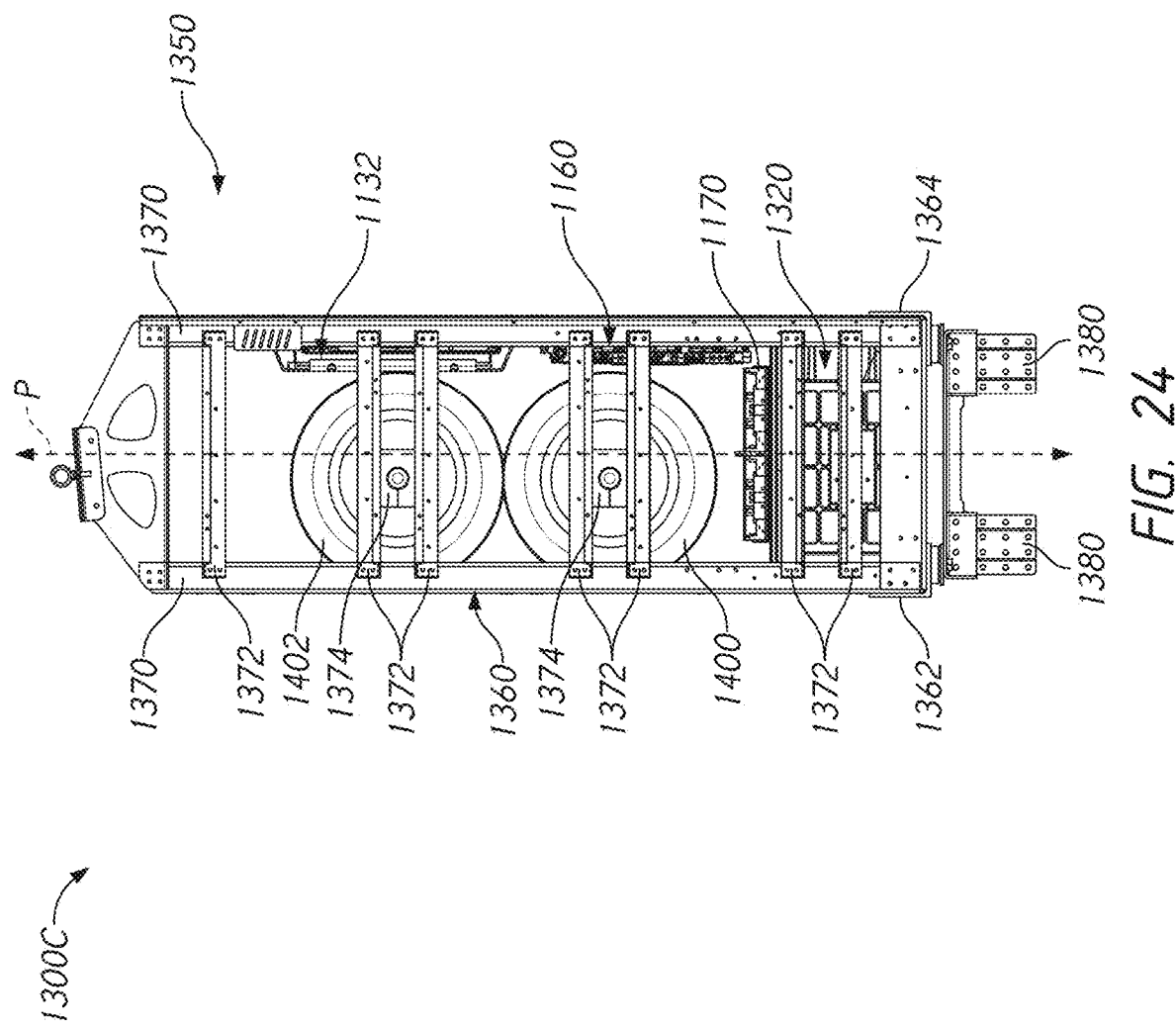
FIG. 24 is a lateral view of a modified embodiment of the power distribution system of FIG. 22 including a combustion gas cylinder.

C. Modular Systems Including a Power Distribution System Module, a Combustion Fuel Module, and/or a Battery Assembly In some applications, the vehicle 40A can include a power distribution system module 1300, a combustion fuel module (e.g., including combustion gas cylinders 1402 as illustrated in FIG. 24), and/or a battery assembly 100. In some embodiments, the combustion fuel module and/or fuel cell 1320 can be disposed in the housing 1350 of the power distribution system module 1300. For example, one or more combustion gas cylinders 1402 can be disposed in the housing 1350 of the power distribution system module 1300. The combustion gas cylinders 1402 can be configured to store compressed natural gas. The compressed natural gas in the combustion gas cylinders 1402 can be placed in fluid communication with a combustion engine which can be disposed in the front end compartment 42. In some examples, compressed natural gas disposed in the combustion gas cylinder 1402 can be placed in fluid communication with an auxiliary engine configured to drive a generator to produce electrical energy to extend the range of one or both of the battery assembly 1004A, battery assembly 1004B, or of another battery assembly coupled with the power distribution module 1300C. The combustion gas cylinder 1402 could be coupled with a valve that could direct the gas therein to a generator assembly including a first auxiliary combustion engine coupled with a generator or to a second auxiliary combustion engine coupled with one or more axles to directly drive the wheels of a vehicle.

In some applications, the power distribution system module 1300 can include a power distribution unit 1132, one or more gas cylinders 1400 (e.g., for storing hydrogen), one or more combustion gas cylinders 1402 (e.g., for storing compressed natural gas), and/or one or more fuel cell 1320.

II. Front End Accessory Component Assemblies

Figure 3:
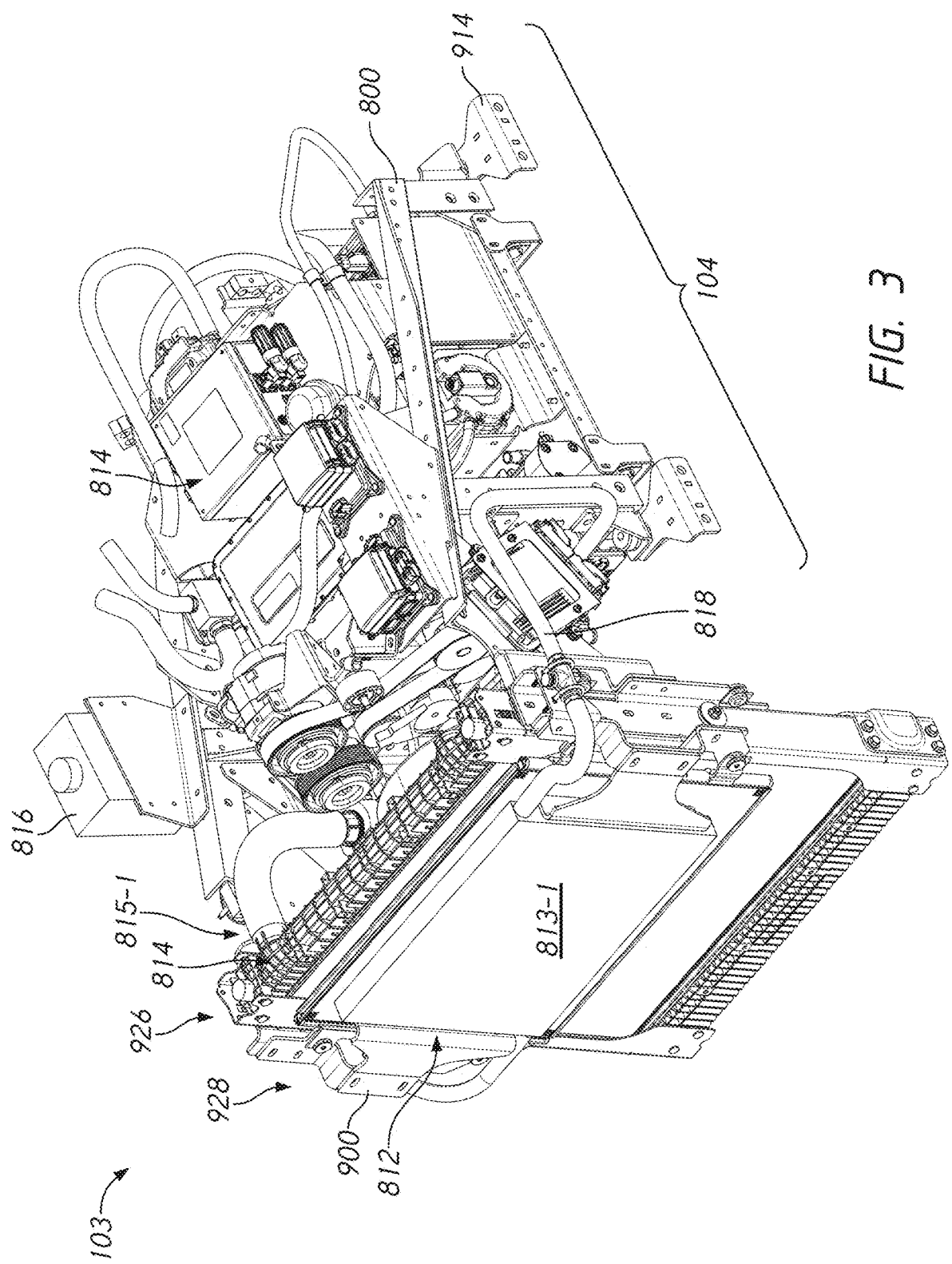
FIG. 3 is a front perspective view of a front end assembly that includes a front end accessory component assembly configured to simultaneously connect multiple components to a vehicle assembly to enable such components to be integrated into subsystems of the vehicle.
Figure 4:
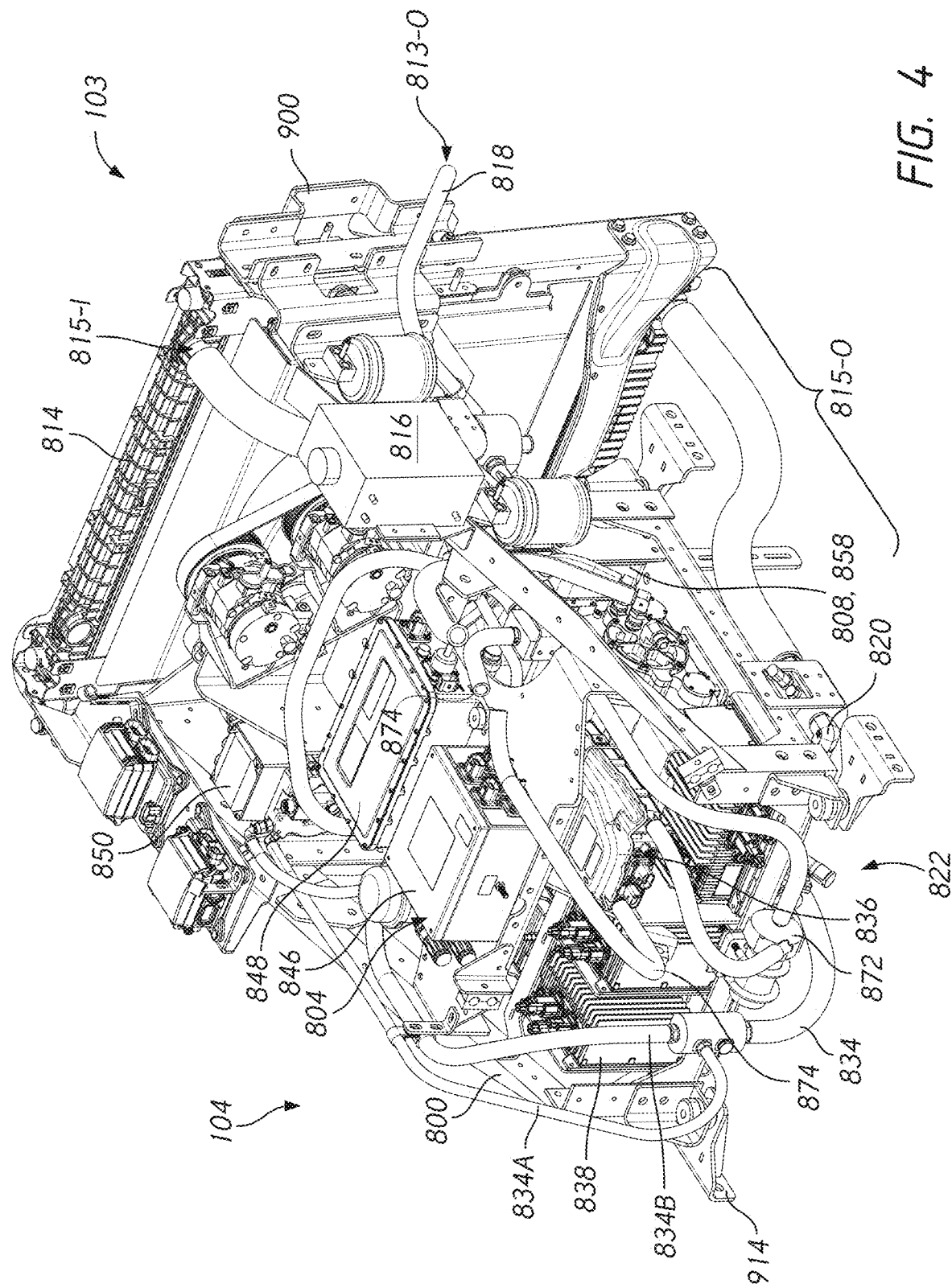
FIG. 4 is a rear perspective view of the front end assembly of FIG. 3.
Figure 4A:
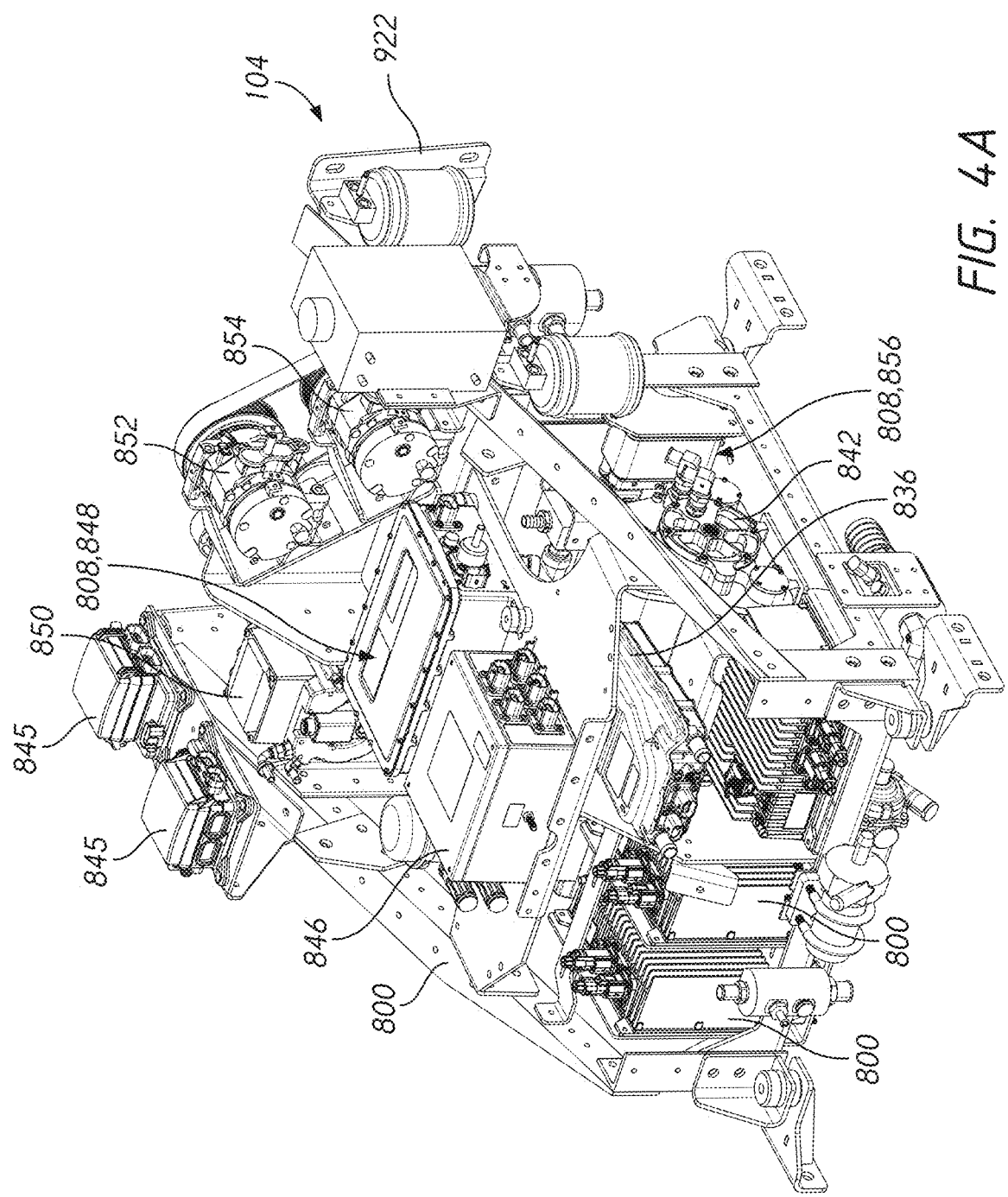
FIG. 4A is a rear perspective view of a front end accessory component assembly of the front end assembly of FIG. 3.

FIGS. 3-4 show one example of a front end assembly 103 that can include a front end accessory component assembly 104. The frame 800 of the front end accessory component assembly 104 is configured for mounting a plurality of components to the vehicle assembly 50. The frame 800 can support the first vehicle accessory 804 and the second vehicle accessory 808 as discussed above. The first vehicle accessory 804 can include a heat exchanger or other component of a thermal management system. The second vehicle accessory 808 can include one or more electrical component, as discussed above. The first vehicle accessory 804 and the second vehicle accessory 808 can be structurally mounted to the vehicle assembly 50 following assembly of these components or systems to the frame 800.

Figure 7:
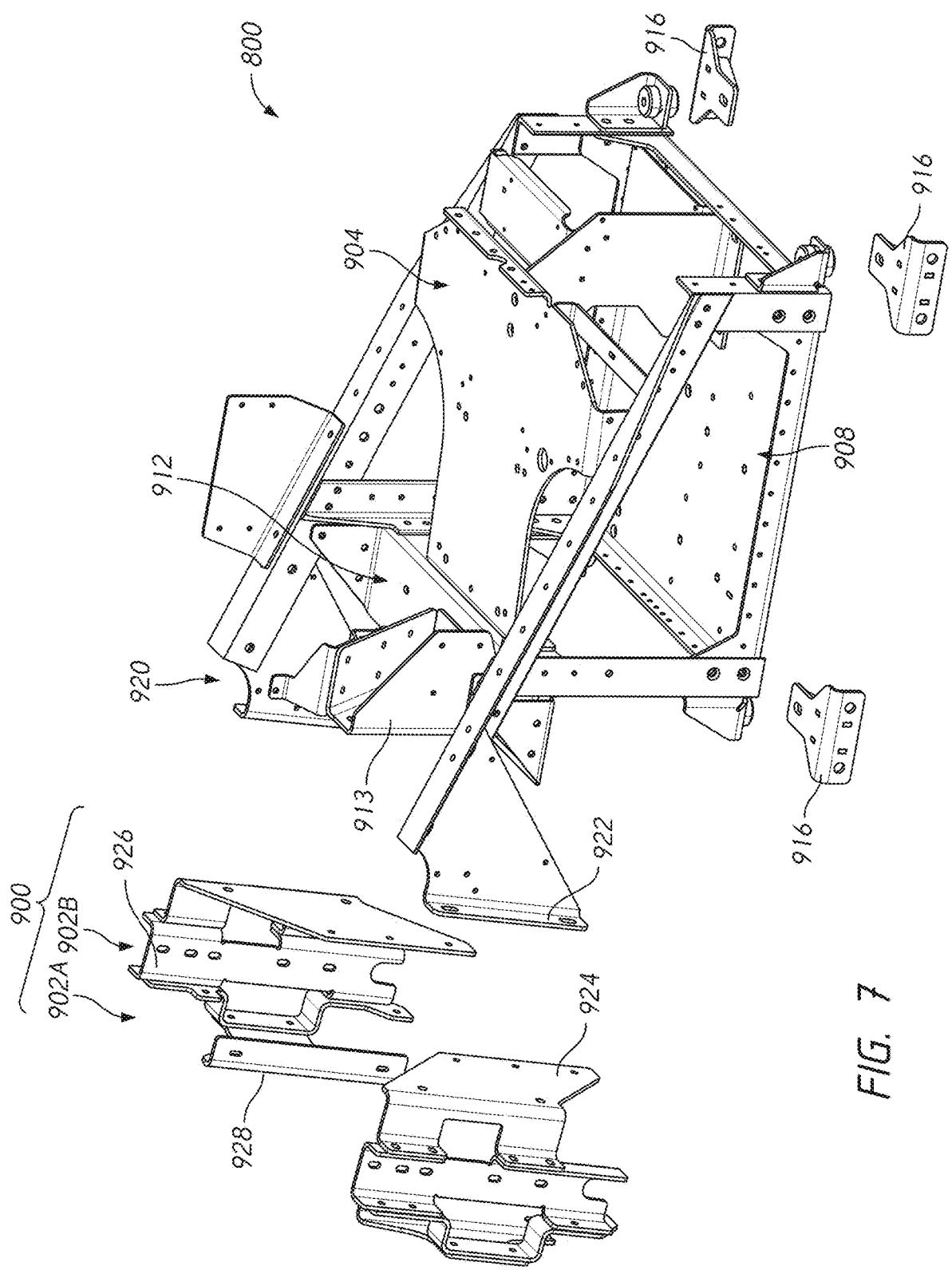
FIG. 7 is a top perspective view of a frame configured to be mounted in a front end compartment to simultaneously mount multiple components in a front end compartment of a vehicle assembly.
Figure 8:
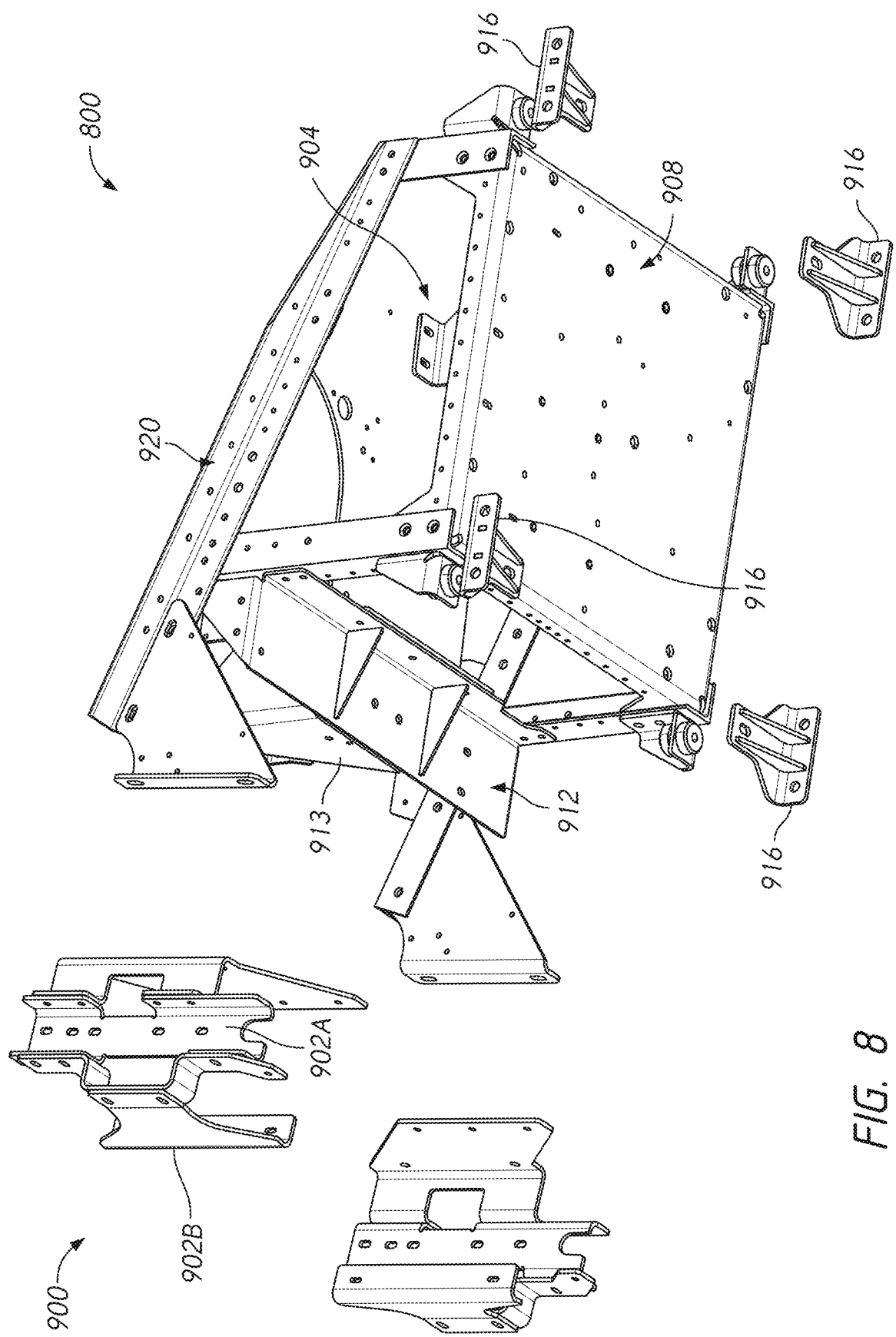
FIG. 8 is a bottom perspective view of the frame shown in FIG. 7.
Figure 9:
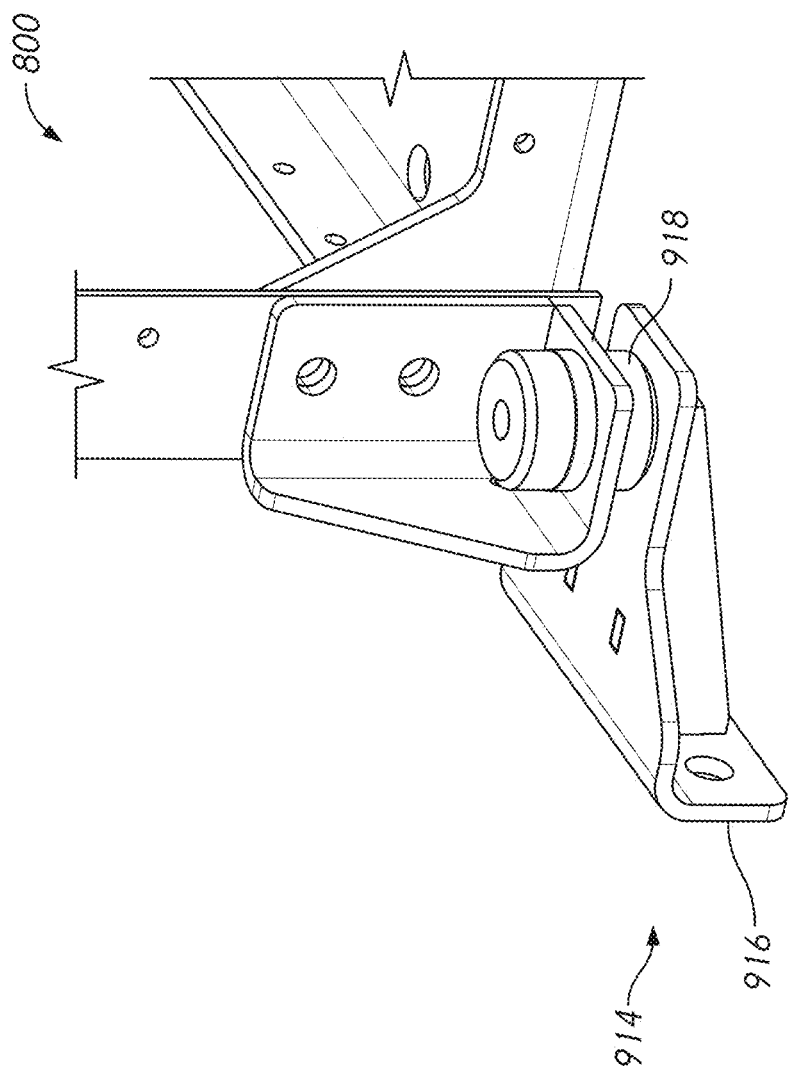
FIG. 9 is a perspective view of one of a plurality of system mounts of the frame shown in FIG. 7.

FIGS. 7-9 shows the frame 800 shown in greater detail. The frame 800 includes a multi-area structure for mounting a plurality of components to the frame 800. In one example, the frame 800 is configured to be coupled to a heat exchanger frame 900 that can be coupled to a generally forward location of the front end accessory component assembly 104. The heat exchanger frame 900 can be disposed to be located adjacent to, e.g., immediately behind a front grill of the vehicle assembly 50 such that airflow can reach one or more heat exchangers. In one approach, the frame 800 and the components mounted thereto can be secured within the front end compartment 58 and the heat exchanger frame 900 can be coupled with the frame 800 thereafter.

The frame 800 also can include a first tray 904, a second tray 908 and a third tray 912 in one embodiment. One or more components can be mounted to one or more of the first tray 904, second tray 908, and third tray 912. The first tray 904 can provide upper area of the frame 800 where components can be more easily accessed behind the heat exchanger zone 900. An upper surface of the first tray 904 can provide a support surface for one or more components, e.g., for components of an electrical sub-system of the front end accessory component assembly 104. The second tray 908 can provide an area for supporting components below the first tray 904. The second tray 908 will be less accessible than the first tray 904 so components on the second tray 908 may be selected to include those components that would benefit from more frequent service or repair. The separation between the top surface of the second tray 908 and the bottom surface of the first tray 904 can enable one or more components to be mounted to the bottom of the second tray 908 immediately above one or more components mounted to the top surface of the second tray 908. The first tray 904 and the second tray 908 each can include one or more, e.g., an array of holes formed from top to bottom surfaces thereof for mounting purposes.

The third tray 912 can be located generally between the first tray 904 and heat exchanger frame 900 when the frame 900 is coupled to the frame 800 The third tray 912 is relatively easily accessible in the front end compartment 58 in embodiments where the third tray 912 is located immediately behind the heat exchanger frame 900. The third tray 912 can be wider than it is deep. That is, the lateral dimension of the frame 800 in the vicinity of the third tray 912 can be larger than the longitudinal direction, providing a shallow shelf area. In this context, the longitudinal direction corresponds to the longitudinal axis A1 of the vehicle assembly 50 when the front end accessory component assembly 104 is mounted in the front end compartment 58.

The third tray 912 can be provided with a vertical extension 913. The vertical extension 913 can include an A or V shaped member that raises up from the top surface of the third tray 912 providing two or more surfaces that are exposed from the top of the frame 800, which surfaces can enable mounting of components to the frame 800. The vertical extension 913 can have a combined surface area on the two or more surfaces that is greater than the span of the third tray 912 to which the vertical extension 913 is coupled. As discussed further below, the vertical extension 913 can have one, two, or more than two components of the front end accessory component assembly 104 mounted thereof.

The heat exchanger frame 900 can be separated into multiple zones for separate heat exchangers. For example a forward heat exchanger support 902A can be provided that is disposed forward of a rear heat exchanger support 902B. The forward heat exchanger support 902A can be used to support a heat exchanger that is in need of greater access to cooling air. The forward heat exchanger support 902A can support a smaller heat exchanger or one that provides the cooling requirements of a component that is generating more heat. The rear heat exchanger support 902B can support a heat exchanger that can operate well with lesser cooling air access. The rear heat exchanger support 902B can support a heat exchanger that is larger than the heat exchanger supported in the forward heat exchanger support 902A. The rear heat exchanger can operate in the presence of waste heat generated by the forward heat exchanger.

The frame 800 advantageously includes a frame array 920 that supports and joins two or more of, the first tray 904, the second tray 908, and the third tray 912. The frame array 920 also can join the frame 800 to the heat exchanger frame 900 as discussed further below. The frame array 920 can include vertical, horizontal, and diagonal L-shaped members. The frame array 920 can include one or more plates to join two or more of the trays and zones together. The frame array 920 can include one or more or an array of openings to allow additional components to be mounted thereto.

The heat exchanger frame 900 can include a frame interface 924 configured to mate to a heat exchanger frame interface 922 of the frame 800. The frame interface 924 and the heat exchanger frame interface 922 can include transverse flange portions. The transverse flange portions can include openings or apertures configured to receive bolts to connect the heat exchanger frame interface 922 and the frame interface 924 together. The rear heat exchanger support 902B can include a rearward flange 926 that is configured to mate with the heat exchanger 814. The forward heat exchanger support 902A can include a forward flange 928 configured to mate with the heat exchanger 812. The rearward flange 926 advantageously is connected to the frame interface 924. The forward flange 928 is connected to the rearward flange 926. The frame interface 924 can include a generally triangular plate member coupled at one end with the frame array 920, wherein a transverse expanse can be secured to the frame interface 924.

The trays and or the frame array 920 can be coupled with or can include one or more, e.g., two, three, or four system mounts 914. The bracket 916 can include horizontal faces and vertical faces for positioning one or more bolt or other fastener apertures in a desired position in space to mate with a mount member or feature within the front end compartment 58 of the vehicle assembly 50. The bracket 916 can be supported on a lower side thereof by one or more angle members. The bracket 916 can be coupled with a vibration isolator 918 that is disposed between the system mounts 914 and the nearest connecting member of the frame array 920. The vibration isolator 918 can include a polymeric member that is sufficiently resilient for a sufficient operational life to provide for muting or reduction of road, vehicle, and engine vibrations that would otherwise be transferred to components of the front end accessory component assembly 104. The vibration isolator 918 can be made of rubber, a rigid plastic or another member with suitable shock absorbing and durability properties. The vibration isolator 918 can be formed as cylindrical members disposed between the bracket 916 and a member of the frame array 920. A neck region of the vibration isolator 918 can extend through the thickness of the bracket 916 in an opening thereof. A fastener can securely connect the frame array 920 to the bracket 916 by compression of the vibration isolator 918 between the bracket 916 and a member of the frame array 920.

The system mounts 914 can be configured to mate to a chassis of an existing vehicle design. The bracket 916 can be configured to reach a wall of the front end compartment 58. Apertures can be drilled through the chassis wall to facilitate such mounting. In some cases, the brackets 916 are configured to reach engine mount locations in the front end compartment 58 such that existing support points that would otherwise be used for mounting a combustion engine can be used to support the front end accessory component assembly 104. The lateral face of the bracket 916 can be disposed adjacent to engine mount locations and bolts or other fasteners can be secured through the openings in the bracket 916 and through corresponding openings at the mount locations in the front end compartment 58.

The frame 800 and the heat exchanger frame 900 can support a number of vehicle components. The frame 800 enables two or more components to be simultaneously placed in the front end compartment 58.

A. Electrical Accessory Device Integration

FIGS. 2-6 show that the front end accessory component assembly 104 can support electrical devices and/or controllers for electrical devices. Some of these devices support the function of thermal management systems for removing heat from vehicle components, as discussed further below.

Figure 5:
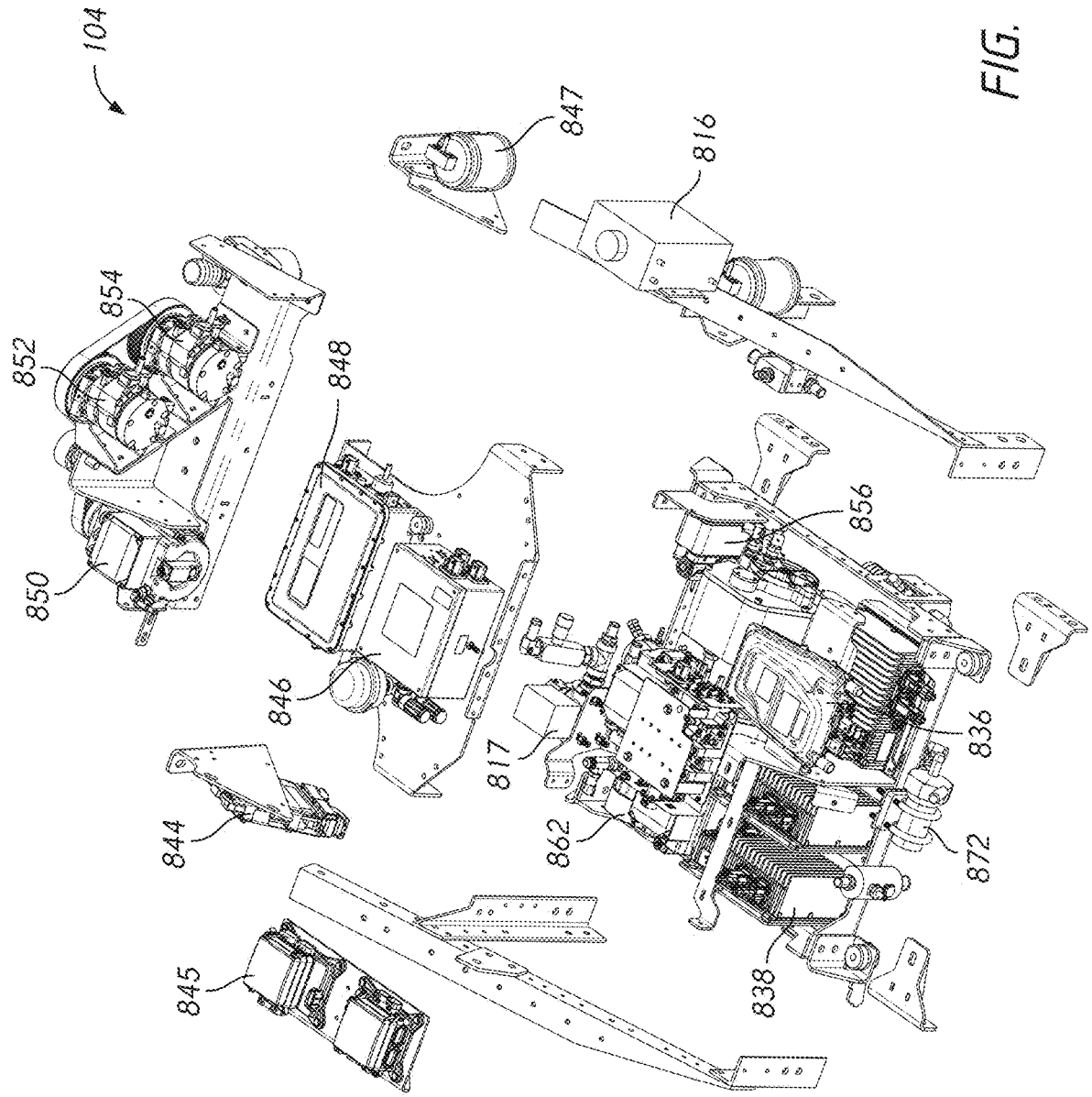
FIG. 5 is a top exploded view of a frame and a plurality of vehicle accessories.

FIG. 5 shows a number of electrical components of one embodiment of the front end accessory component assembly 104. The front end accessory component assembly 104 can include an accessory power distribution unit 846 and a power converter 848. The accessory power distribution unit 846 and the power converter 848 can be mounted in an upper area of the frame 800, e.g., in the first tray 904. The power converter 848 can be mounted forward of the accessory power distribution unit 846. The power converter 848 can provide a voltage conversion function by which the voltage from the battery assembly 100 can be converted from higher voltage to lower voltage. The battery assembly 100 can output high voltage for certain high voltage components, e.g. for the axle drive assembly 112. However, the battery assembly 100 can also support the operation of a number of lower voltage components mounted on the front end accessory component assembly 104. The accessory power distribution unit 846 can include circuitry that take an input current from the power converter 848 and provides portions of that current to many or in some cases all of the rest of the electrical components mounted on the front end accessory component assembly 104.

One component that receives current from the accessory power distribution unit 846 is an accessory motor 850. The accessory motor 850 can include an output shaft that drives a transmission component, such as a belt, to provide rotation of a working shaft of an air conditioner compressor 852 and of a battery chiller compressor 854. The air conditioner compressor 852 can be in a loop with a dryer receiver 847, for example. The dryer receiver 847 can be mounted to an outside surface of the frame 800, e.g., to a span of the frame array 920. The compressors driven by the accessory motor 850 provide the function of compressing low pressure refrigerant gas in a heat transfer circuit, as discussed further below. The accessory motor 850 can be mounted to a lateral portion of the third tray 912. One or both of the air conditioner compressor 852 and the battery chiller compressor 854 can be mounted to the vertical extension 913 of the third tray 912. In one embodiment, the accessory motor 850 is mounted on one side of the vertical extension 913 and both of the air conditioner compressor 852 and the battery chiller compressor 854 are mounted on an opposite side of the vertical extension 913.

In one embodiment, a plurality of electrical components are mounted below the first tray 904, e.g., to the second tray 908. One or more motor inverters 838 can be mounted to the second tray 908. The motor inverters 838 can control the operation of the accessory motor 850 and of an air compressor motor 840. The air compressor motor 840 is also connected to the second tray 908 in one embodiment. The air compressor motor 840 can include an output shaft that is engaged with an air compressor 842. The air compressor 842 can supply pressurized air to components such as air brakes in the vehicle assembly 50.

A fluid heater 836 can be mounted on or above the second tray 908, e.g., a flange connected to the frame array 920. The fluid heater 836 can be part of a heat transfer circuit to provide a source of heat to a cab heater, as discussed further below.

Additionally, a power steering pump 862 can be mounted to the second tray 908. The power steering pump 862 assists the driver in steering as is known.

Figure 6:
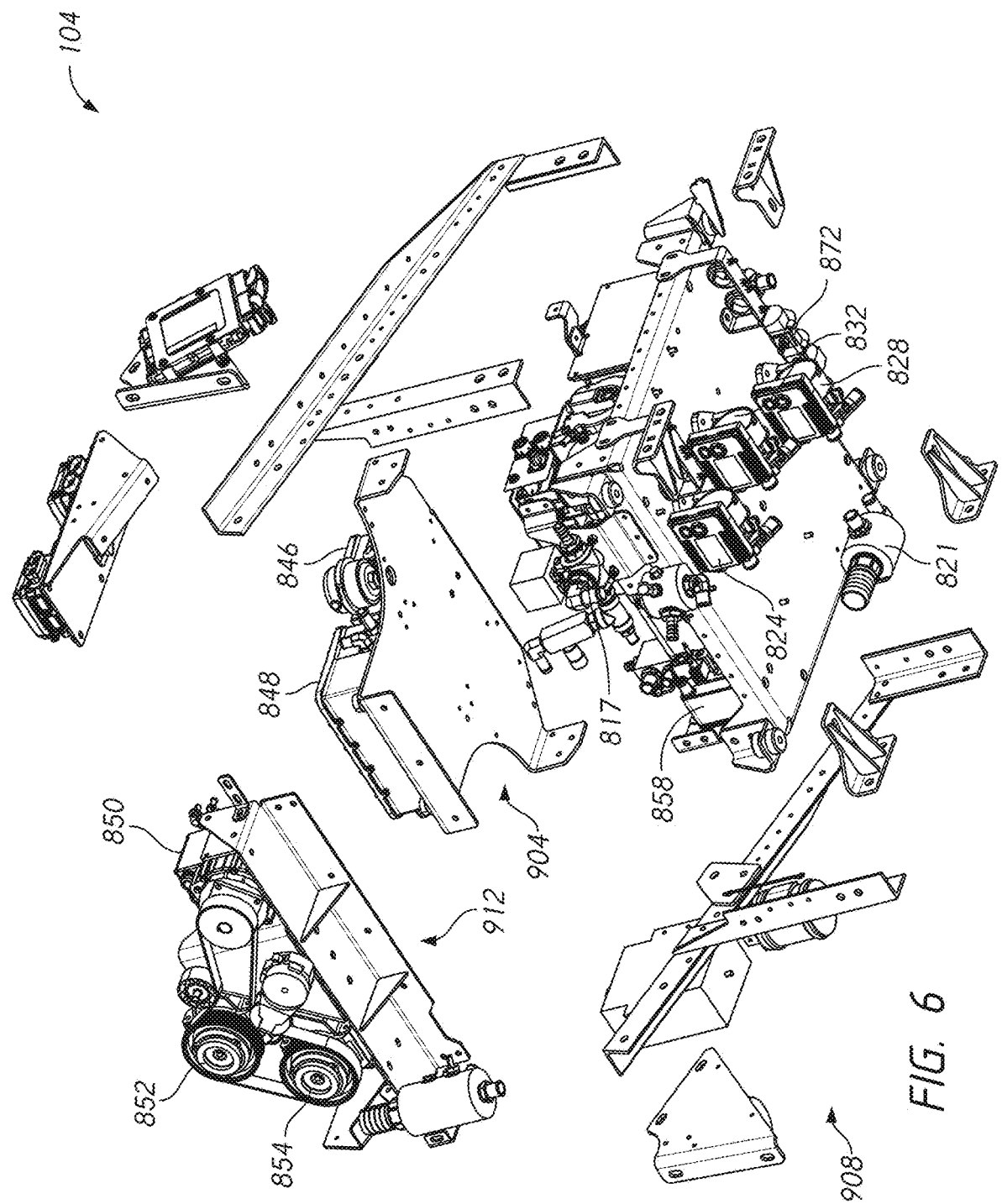
FIG. 6 is a bottom exploded view of a frame and a plurality of vehicle accessories.

FIG. 6 shows that the second tray 908 also can support one or more electrical components on a lower side thereof. A first coolant pump 824 can be supported on a lower side of the second tray 908 in one embodiment. The first coolant pump 824 can supply coolant to a first coolant loop as discussed further below. A second coolant pump 828 can be disposed on the lower side of the second tray 908 rearward of the first coolant pump 824. The second coolant pump 828 can supply coolant to a second coolant loop as discussed further below. A third coolant pump 832 can be disposed on the lower side of the second tray 908. The third coolant pump 832 can supply coolant to a third coolant loop as discussed further below.

In some embodiments, components can be mounted to side surfaces of the frame 800, e.g., to a side surface of the second tray 908. For example, a heater core pump 872 can be mounted to a rear side surface of the second tray 908. The heater core pump 872 can supply a coolant to a circuit for supplying heat to a cab of the front end compartment 58.

Other components can be mounted to the frame 800. Light and/or low profile components can be mounted to side surfaces of the frame 800, e.g., to lateral portions of the frame array 920. A supervisor 844 can be mounted to the second coolant loop 820, e.g., to a lateral portion of the heat exchanger frame interface 922. A fuse relay 845 can be mounted to a small shelf on a lateral side of the frame array 920 of the frame 800. The fuse relay 845 can be disposed on the top of a shelf that partially overhangs the accessory motor 850.

B. Coolant Loop Integration

FIGS. 2-6 show that the front end accessory component assembly 104 can support components of a thermal management system that supports removing heat from components of the vehicle assembly 50. The front end accessory component assembly 104 can coordinate thermal management for the vehicle assembly 50. Thermal control components can be coupled with the frame 800 of the front end accessory component assembly 104. The thermal control components can manage heat from heat generating components mounted to the frame 800 or mounted to the frame assembly 54 elsewhere on the vehicle assembly 50. More particularly, the front end accessory component assembly 104 can serve cooling fluid to the battery assembly 100. The front end accessory component assembly 104 can serve cooling fluid to the rear end electric component assembly 108. The front end accessory component assembly 104 can serve cooling fluid to the axle drive assembly 112, either directly or through a manifold integrated into the rear end electric component assembly 108. The frame 800 of the front end accessory component assembly 104 and the heat exchanger frame 900 of the front end assembly 103 can efficiently integrate core portions of one or more coolant loops.

A plurality of coolant conduits or loops can be provided in the vehicle assembly 50, which are fed and controlled from the front end accessory component assembly 104. The front end assembly 103 can include a heat exchanger 812 disposed in the forward heat exchanger support 902A. The heat exchanger 812 can be fluidly coupled with a first coolant loop 818. Core portions of the first coolant loop 818 not including the heat exchanger 812 can be secured to the frame 800 of the front end accessory component assembly 104. A heat exchanger outlet 813-O can supply fluid to the first coolant loop 818. The first coolant loop 818 can have a first segment between the heat exchanger outlet 813-O and a first coolant pump 824. The first coolant pump 824 can be mounted to the frame 800, e.g., to an underside of the second tray 908 as discussed above. The outlet of the first coolant pump 824 can supply the first coolant loop 818 downstream thereof. A manifold mounted on the front end accessory component assembly 104 can join a volume of fluid from a coolant reservoir 816 with the volume of fluid from the heat exchanger outlet 813-O to assure adequate supply to the battery assembly 100. The output of the first coolant pump 824 in the first coolant loop 818 can be fluidly coupled to a manifold of the battery assembly 100 to supply cooling fluid to heat generating components thereof, e.g., to battery units disposed therein. A return line portion of the first coolant loop 818 can be disposed between the battery assembly 100 and the heat exchanger inlet 813-I. A valve, e.g., a three way valve 817, can be used to allow a volume of coolant from a chiller 858 (or other heat exchanger) to be merged to the flow in the return portion of the first coolant loop 818 between the battery assembly 100 and the hot side of the heat exchanger 812. In one embodiment, at least a portion of the return flow in the first coolant loop 818 from the outlet of the battery assembly 100 can be diverted to the chiller 858 in a conduit. The flow diverted to the chiller 858 can be cooled as heat is removed from the flow within the chiller 858. A control system can be included in the front end accessory component assembly 104 whereby flow to the chiller 858 is provided when the heat exchanger 812 (e.g., including a radiator) is unable to remove enough heat from the first coolant loop 818.

In one arrangement the supply and return conduits of the first coolant loop 818 are supported by a coolant support member 819 that can be mounted to the frame assembly 54. The coolant support member 819 can support the conduit of the first coolant loop 818 in any suitable manner. For example, the coolant support member 819 can support a generally hotter coolant return conduit of the first coolant loop 818 at an inboard position and a generally cooler supply conduit of the first coolant loop 818 at a generally outboard position. The hotter return conduit of the first coolant loop 818 can be disposed between the cooler supply line and the longitudinal axis A1. In one embodiment the, hotter return line of the first coolant loop 818 is disposed at or adjacent to the longitudinal axis A1 and the cooler conduit is lateral of the longitudinal axis A1 and/or the longitudinal axis A1 and the hotter conduit of the first coolant loop 818. As discussed above, the first coolant loop 818 can include the three way valve 817 to divert at least some of the flow from the outlet of the battery assembly 100 to the chiller 858 to enhance removal of heat in the first coolant loop 818 as may be needed in certain conditions. After the coolant has traversed the battery assembly 100, the generally hotter fluid is returned in downstream portion of the first coolant loop 818 to the heat exchanger inlet 813-I. The first coolant loop 818 can include additional valves and manifolds to achieve the desired coolant flow path.

The front end accessory component assembly 104 includes a second coolant loop 820 that can supply cooling fluid to other heat generating components of the vehicle assembly 50. The second coolant loop 820 can be coupled with a heat exchanger outlet 815-0 of a heat exchanger 814 that can be supported by the heat exchanger frame 900 in the front end assembly 103. The heat exchanger outlet 815-0 can include an outlet port on a lower portion of the heat exchanger 814. The heat exchanger outlet 815-0 can include the outlet port and a length of conduit extending from the outlet port to a manifold 821. The manifold 821 can split the coolant flow from the heat exchanger outlet 815-0 into the second coolant loop 820 and into a third coolant loop 822.

The second coolant loop 820 extends from the manifold 821 to a second coolant pump 828 and from the second coolant pump 828 to downstream conduits that convey the cooling fluid away from the front end accessory component assembly 104 to heat generating components located elsewhere on the vehicle assembly 50. The second coolant loop 820 can extend from the front end accessory component assembly 104 to the coolant support member 819. The coolant support member 819 can support supply and return conduits of the second coolant loop 820 generally along the longitudinal axis A1 of the vehicle assembly 50. In one embodiment, the hotter return conduit of the second coolant loop 820 can be disposed between the cooler supply line and the longitudinal axis A1. In one embodiment, the hotter return line of the second coolant loop 820 is disposed at or adjacent to the longitudinal axis A1 and the cooler conduit is lateral of the longitudinal axis A1 and/or the longitudinal axis A1 and the hotter conduit of the second coolant loop 820. After the coolant has traversed the rear end electric component assembly 108, another branch of the second coolant loop 820 extends to the axle drive assembly 112. A manifold can split the supplied coolant into a first flow to cool components of the rear end electric component assembly 108 and a second flow to cool the axle drive assembly 112. Coolant fluid from the axle drive assembly 112 and/or from the rear end electric component assembly 108 returns to the front end accessory component assembly 104 through one or more hotter return conduits. The generally hotter fluid is returned in the downstream portions of the second coolant loop 820 to the heat exchanger inlet 815-I. The second coolant loop 820 can include additional valves and manifolds to achieve the desired coolant flow path.

In other embodiments discussed below, the second coolant loop 820 can supply coolant to the power distribution system module 44, to the electric motor 48, or to both the power distribution system module 44 and the electric motor 48 in series or in parallel. The routing of and coolant supply to the second coolant loop 820 can otherwise be similar to that described in connection with the vehicle assembly 50 and the front end accessory component assembly 104.

FIG. 2A shows that the second coolant loop 820 extends along an upper side of the battery assembly 100. The battery assembly 100 can have a W-shaped configuration in which a first lateral portion 204 and a second lateral portion 208 extend to a higher elevation than a central portion 212. The central portion 212 can provide an upwardly oriented recess 216 that can receive the first longitudinal frame member 54A and the second longitudinal frame member 54B of the frame assembly 54. A mounting system 240 can enable a housing 200 of the battery assembly 100 to be supported on outboard lateral sides of the first longitudinal frame member 54A and the second longitudinal frame member 54B. Conduit of the second coolant loop 820 can extend through the upwardly oriented recess 216, e.g., at least partially at an elevation below the top surfaces of the first lateral portion 204 and second lateral portion 208. The coolant support member 819 can be configured to support the conduit of the second coolant loop 820 along a path inboard of the first longitudinal frame member 54A and the second longitudinal frame member 54B as shown in FIG. 2A.

As discussed further below, the second coolant loop 820 can extend through the upwardly oriented recess 216 and upward to connect to an inlet of a coolant manifold 1224A to route coolant through the power distribution system module 44. The connection of the second coolant loop 820 to the coolant manifold 1224A can be access beneath the deck member 1208, as discussed below.

The third coolant loop 822 can extend from the manifold 821 to a coolant conduit between the manifold 821 and a third coolant pump 832. The third coolant pump 832 can output a flow into a third coolant conduit 834 that extends to a manifold that splits the flow into a first branch 834A and a second branch 834B. The third coolant conduit branches 834A, 834B each provide coolant flows to a plurality of downstream components. In one embodiment, the third coolant conduit branch 834B is provided through a larger conduit in which a larger portion of the flow from the third coolant conduit 834 is directed by the manifold that splits the flow into the branches. The third coolant conduit branch 834B provides flow initially to the accessory power distribution unit 846. The outflow of the third coolant conduit branch 834B out of the accessory power distribution unit 846 then flows into the air compressor 842. The outflow from the air compressor 842 flows into a return manifold 835 that merges flow into the heat exchanger inlet 815-I.

The third coolant conduit branch 834A provides a smaller portion of the flow from the third coolant conduit 834 initially into the accessory motor 850. The outflow of the cooling passage through the accessory motor 850 flows in the third coolant conduit branch 834A to the air compressor motor 840 which is cooled thereby. The outflow of the cooling passage through the air compressor motor 840 then flows to the power steering pump 862 to provide cooling thereof. The outflow of the cooling passage through the power steering pump 862 flows to the return manifold 835 to merge with other return flow therein to return coolant to the heat exchanger inlet 815-I. The return manifold 835 is also fluidly coupled with the return passage of the second coolant loop 820 such that output coolant fluid from the rear end electric component assembly 108 and/or from the axle drive assembly 112 can be merged in the return manifold 835 with other coolant in the third coolant loop 822. Thus, the heat exchanger 814 can be seen to support flow through the second coolant loop 820 and the third coolant loop 822. The return manifold 835 can also be coupled with a supply conduit from the coolant reservoir 816 to assure the adequate volume of coolant is present in the third coolant loop 822

The foregoing describes that a significant portion of three distinct coolant loops can be mounted to the front end accessory component assembly 104 to provide a highly integrated system. The front end accessory component assembly 104 can enable simultaneous mounting of conduits, pumps, and controllers for a plurality of cooling loops. The front end accessory component assembly 104 can support cooling of components mounted on the front end accessory component assembly 104 and also on other integrated systems of an electric vehicle. For applications involving less available space in the front end compartment 58 some of these components can be shifted to the power distribution system module 44.

Further thermal management accessories can be integrated into the front end accessory component assembly 104. For example, climate control for the cab of the vehicle assembly 50 can be mounted on the frame 800. In one embodiment, a heater core pump 872 is provided to move a heating fluid through a heating fluid loop 874. A flow can be generated by the heater core pump 872 and can flow into the heating fluid loop 874 in an initial segment that extends from the heater core pump 872 to a fluid heater 836. The fluid heater 836 can elevate the temperature of the fluid in the heating fluid loop 874. The fluid heater 836 can produce an elevated temperature in an outflow conduit thereof that can be delivered to a heater core (not shown) that can be mounted directly to the wall of the chassis on the front end compartment 58. Heat is removed from the fluid and a return segment of the heating fluid loop 874 returns the fluid to a manifold that supplies the inflow to the heater core pump 872. The manifold is also seen in FIG. 4 to have another input that can be coupled to the coolant reservoir 816.

The frame 800 and the heat exchanger frame 900 can support many of the components of the first coolant loop 818, the second coolant loop 820, and the third coolant loop 822. The frame 800 can support many of the components of the heating fluid loop 874.

C. Front End Auxiliary Component Modules

Figure 19:
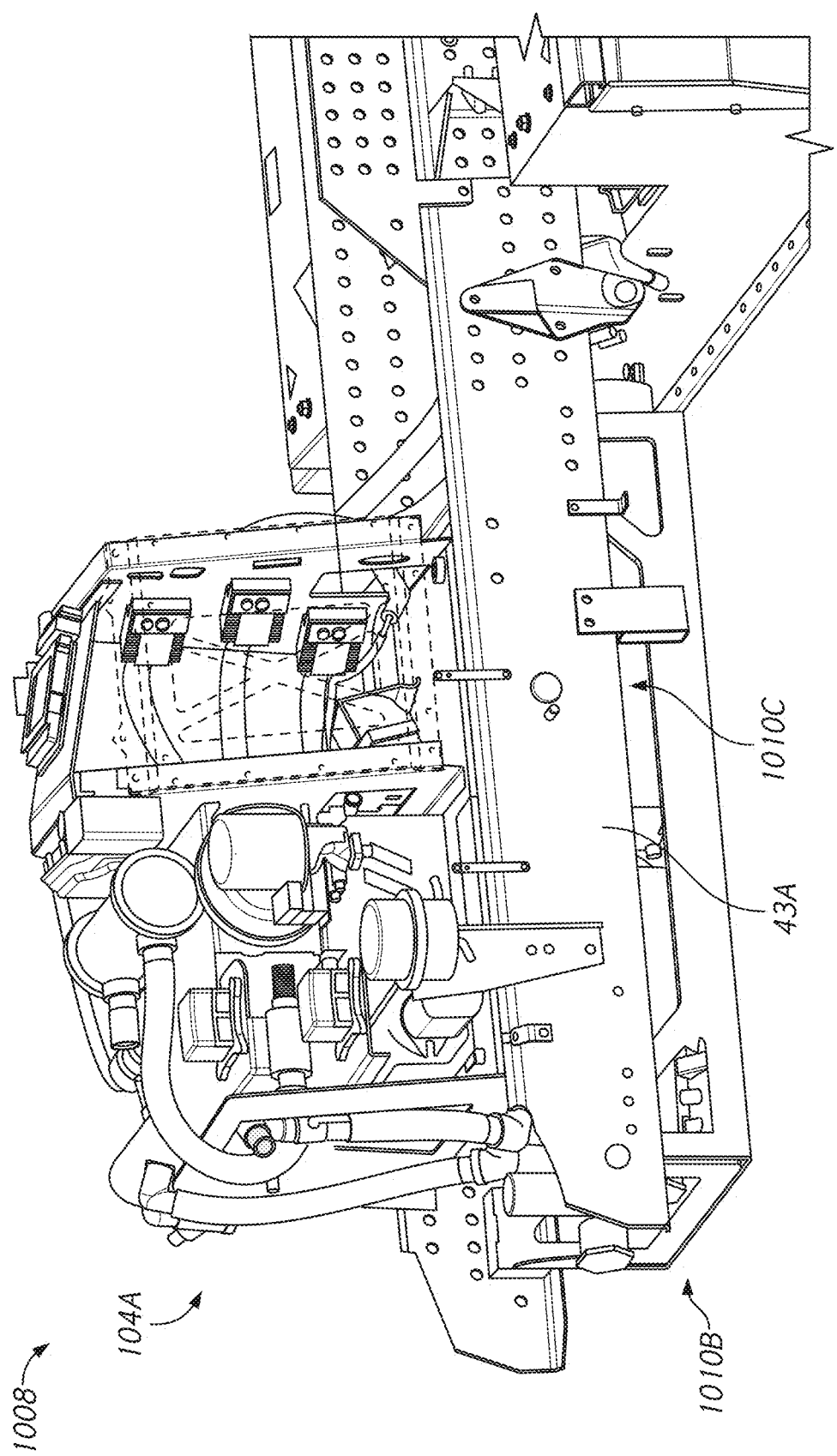
FIGS. 19 and 20 are side perspective views of an auxiliary component module coupled with frame rails of a vehicle.
Figure 20:
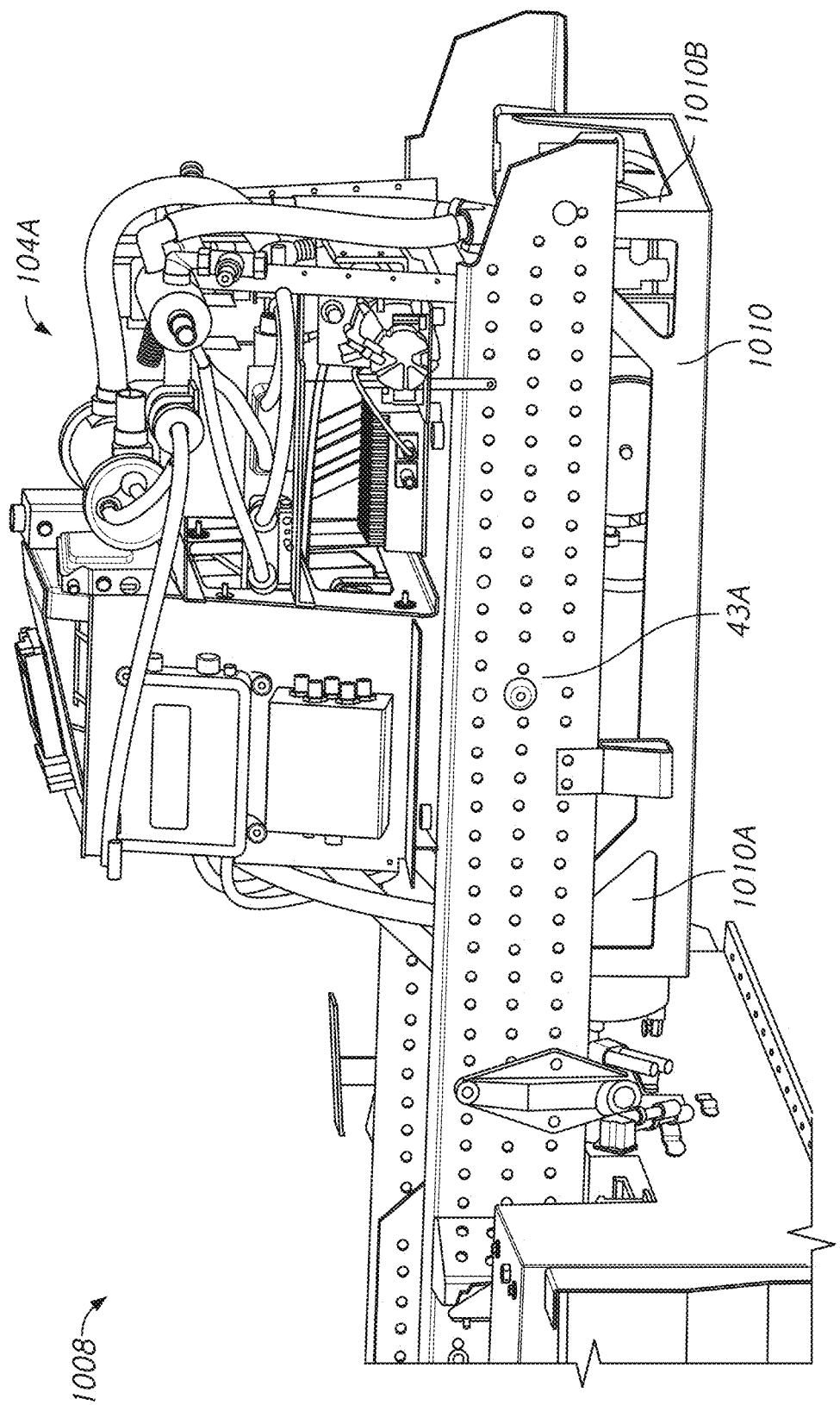

FIGS. 1B, 19-20 show an auxiliary component module 1008 as part of an electric propulsion system 1000 and mounted to the frame assembly 43 of chassis of the vehicle 40. The auxiliary component module 1008 includes a front end accessory component assembly 104A that is similar to the front end accessory component assembly 104 except as described differently below. The descriptions of the front end accessory component assembly 104 can be combined with and can supplement the description of the auxiliary component module 1008. The descriptions of the auxiliary component module 1008 that are not inconsistent with the front end accessory component assembly 104 can be combined with any features of the front end accessory component assembly 104.

The auxiliary component module 1008 a lower accessory tray assembly 1009 that can be disposed beneath the front end accessory component assembly 104A. The lower accessory tray assembly 1009 includes a plurality of components mounted to a lower accessory frame 1010. For example, an air tank 1010A can be mounted to the lower accessory frame 1010. Also, an air compressor 1010B can be mounted to a forward portion of the lower accessory frame 1010. The air compressor 1010B can be in pressure communication with the air tank 1010A to compress air to be stored in the air tank 1010A and/or to compress air in the tank for higher pressure components downstream of the air tank 1010A. FIGS. 19-20 show that the auxiliary component module 1008 is configured to be mounted between adjacent frame rails 43A of the frame assembly 43. The auxiliary component module 1008 can include brackets with outward facing surfaces configured to be placed adjacent to or in contact with inward facing surfaces of the frame rails 43A such that the lower accessory frame 1010 can be secured to the frame rails 43A. In one embodiment the front end accessory component assembly 104A and the lower accessory tray assembly 1009 are separate units that are separately mounted to the frame rails 43A of the vehicle 40. In another embodiment, the front end accessory component assembly 104A and the lower accessory tray assembly 1009 pre-connected together such that the auxiliary component module 1008 can be mounted as a single unit to the frame rails 43A of the vehicle 40.

III. Power Distribution System Modules

Having described electric propulsion system and modules that can be used therein, the following description will supplement the disclosure of the power distribution system module 44, which is a modular component that can be used in a number of different vehicle systems. The power distribution system module 44 can be used in connection with a plug-in storage battery vehicle system (discussed in detail in Section III(A)) and in connection with a hydrogen fuel cell or hybrid vehicle system (discussed in detail in Section III(B)).

A. Plug-In Chargeable Storage Battery Vehicle System Examples

Figure 10:
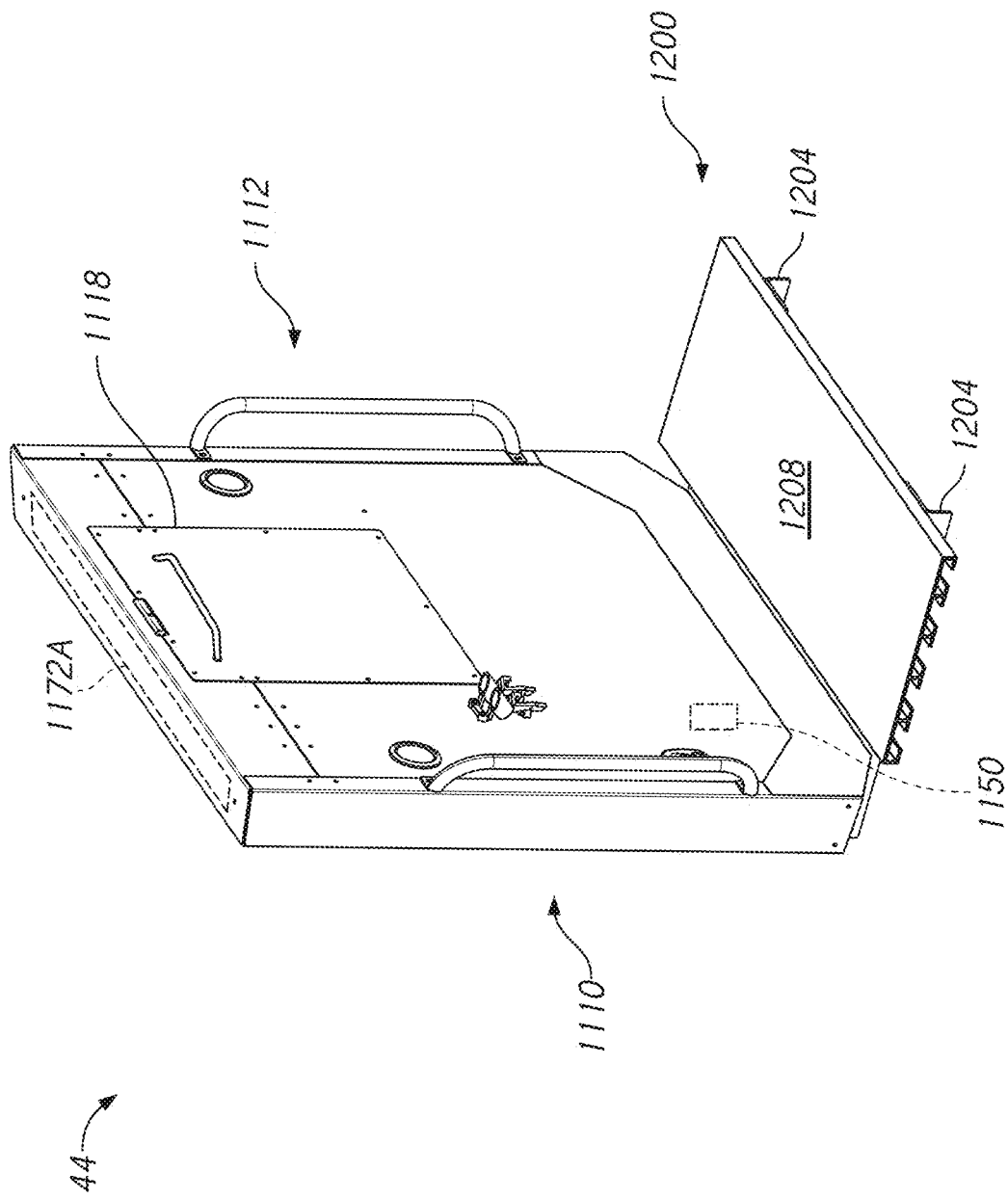
FIG. 10 is a rear perspective view of a power distribution system module including an access deck.

FIG. 10 shows the power distribution system module 44 separate from the vehicle 40. The power distribution system module 44 includes a housing 1110 that includes a cowling 1112 that encloses a frame assembly 1100. The frame assembly 1100 includes a plurality of frame members 1104. The frame members 1104 can be arranged in an array, e.g., defining a rectangular space in horizontal and vertical cross-section that can provide for mounting various power distribution components therein and for providing externally facing mounting surfaces that can couple to the cowling 1112 and other components. The frame members 1104 provide a structure that can support power distribution components to be incorporated into the power distribution system module 44. The cowling 1112 can include one or more portions that enclose the frame members 1104 and the power distribution components. The cowling 1112 can be configured to provide access for service, as described further below. For example, one or more components of the cowling 1112 can be hinged or separately connected to be removable to expose any component needing service in use. The cowling 1112 can include one or more lights 1113 disposed on an outside surface 1114 thereof. The lights 1113 provide for illumination when the power distribution system module vehicle 40 is operating, e.g., when backing up or when running headlights are on.

The housing 1110 can include a frame rail bracket 1108 that can be used to couple the power distribution system module 44 to the vehicle 40, e.g., to the frame assembly 43 thereof. The frame rail bracket 1108 can also be coupled to the vehicle assembly 50 discussed above. Preferably vibration isolation is provided between the frame rail bracket 1108 and the frame assembly 43, e.g., using a vibration isolator similar to the vibration isolator 918 provided in the front end accessory component assembly 104, as discussed above in connection with FIG. 9.

In some cases, the power distribution system module 44 has advantageous overall dimensions. For example, the frame assembly 1100 in a power distribution system module 44 configured for the vehicle 40 can have a frame rail dimension or length of as little as seven to nine inches, a height of six feet or more, and a width of seven feet or more. More generally, one or both of the height and the width of the housing 1110 can be configured to fit within a horizontal plane boundary rearward of the cab of the vehicle with which is to be coupled, e.g., within a space defined by fairings of the vehicle. In this way the housing 1110 fits in a space bounded in the width and height directions that is already set by the manufacturer of the vehicle 40. The housing 1110 beneficially can be very short in a frame rail direction to fit in tight frame rails spaces behind a vehicle cab. For example, as discussed in greater detail below components within the housing 1110 can be oriented with their smallest housing diameter oriented in the frame rail direction, e.g., vertically and mounted to supports therein in this orientation. In some applications where more frame rail space is available components can be oriented horizontally, e.g., with smallest dimensions oriented vertically. The housing 1110 can have a high aspect ratio. In some cases, an aspect ratio calculated as height to frame rail length of between about 48 and about 200, e.g., between about 72 and about 175, e.g., about 150, about 140, about 13, or about 120 is provided. Although the high aspect ratio is advantageous in providing capacity inside the cowling 1112 for components while still allowing space between the vehicle 40 and a trailer unit with which it is to be coupled (or in the case of the vehicle assembly 50 between the cab thereof and a box coupled with the chassis 52), the power distribution system module 44 can be subject to tipping forward or backward. In some applications, the housing 1110 is not deep enough to house fuel tanks (e.g., the frame rail dimension of the housing 1110 is too small to accommodate fuel tanks). In some applications, as discussed further below and as illustrated in FIG. 1D, a power distribution system module 1300 is provided with a housing 1350 that has a large enough frame rail dimension or depth to house one or more gas cylinder(s) 1400 (e.g., for storing hydrogen) and/or one or more combustion gas cylinder(s) 1402 (e.g., for storing compressed natural gas). A longer vehicle frame assembly (such as the frame assembly 54 shown in FIG. 2) can accommodate a housing 1350 having a larger frame rail dimension. One embodiment provides an access deck 1200 assembly that provides a stability enhancing footprint and also provides for convenient access to other components of the electric propulsion system 1000 or another modular system or vehicle with which the power distribution system module 44 is coupled.

The access deck 1200 can include one or more supports 1204 configured to be coupled to a frame rail or member of the frame assembly 43 or to the chassis 52 of the vehicle assembly 50. The supports 1204 can include one or more brackets configured to mount to outside surfaces of the frame assembly 43. The supports 1204 can be coupled with the frame rail bracket 1108. In one embodiment, the supports 1204 and the frame rail bracket 1108 form parts of a bracket unit that can be mounted together to a bottom portion of the frame assembly 1100. The supports 1204 preferably have a frame rail dimension, e.g., length that is equal to or more than the frame rail dimension of the cowling 1112. The supports 1204 can have a frame rail dimension that is two, three, four, five, six or more than six times longer than the frame rail dimension of the cowling 1112. The supports 1204 provide needed stability such that the power distribution system module 44 is not prone to tipping toward the cab 41 or toward a trailer unit coupled with the vehicle 40.

In some cases the access deck 1200 includes a deck member 1208 that is coupled with the supports 1204. The deck member 1208 can include a unit that is configured to extend over the supports 1204. The deck member 1208 can be removable from the supports 1204 such that a space between or beneath frame rails 43A of the frame assembly 43 of the vehicle 40 or between or beneath the frame rails of the chassis 52 can be accessed by removing the deck member 1208. As discussed above, the battery assembly 1004A and/or the battery assembly 1004B can have a W-shaped configuration or otherwise be configured to be mounted around the frame rails of a chassis. When so mounted a space above a middle portion of the battery assemblies 1004A, 100B and between the frame rails can be disposed beneath the power distribution system module 44. This space can be accessed by removing the deck member 1208 such that service can be provided to components therein. For example, high voltage cables can be routed in this space to convey current to and from the battery assemblies. The condition of these cables can be verified and they can be conveniently replaced by accessing the space beneath the deck member 1208.

The deck member 1208 also provides access to components of the power distribution system module 44 that may need service. In particular, the deck member 1208 can be configured to support the weight of a service technician who can step onto the deck member. Handles can be provided on one or both sides of the housing 1110 to assist in stepping up onto the access deck 1200. A handle can also be provided on a portion of the cowling 1112 that can be opened to provide access to internal components of the power distribution system module 44. The power distribution system module 44 is configured such that an access door on the outside surface 1114 of, e.g., on a rearward side 1118 of, the cowling 1112 is located at arm level, eye level or at another elevation that allows for convenient, comfortable access. An access door could be located on another portion the cowling 1112, e.g., on the forward side 1116. In some vehicles access is possible on the forward side 1116. For example, the power distribution system module 44 could be reconfigured such that the access deck 1200 is located between a forward side of the cowling 1112 and the cab 41 of the vehicle 40. In other vehicles access from the forward side 1116 is possible be removing the power distribution system module 44 from the vehicle.

Figure 11:
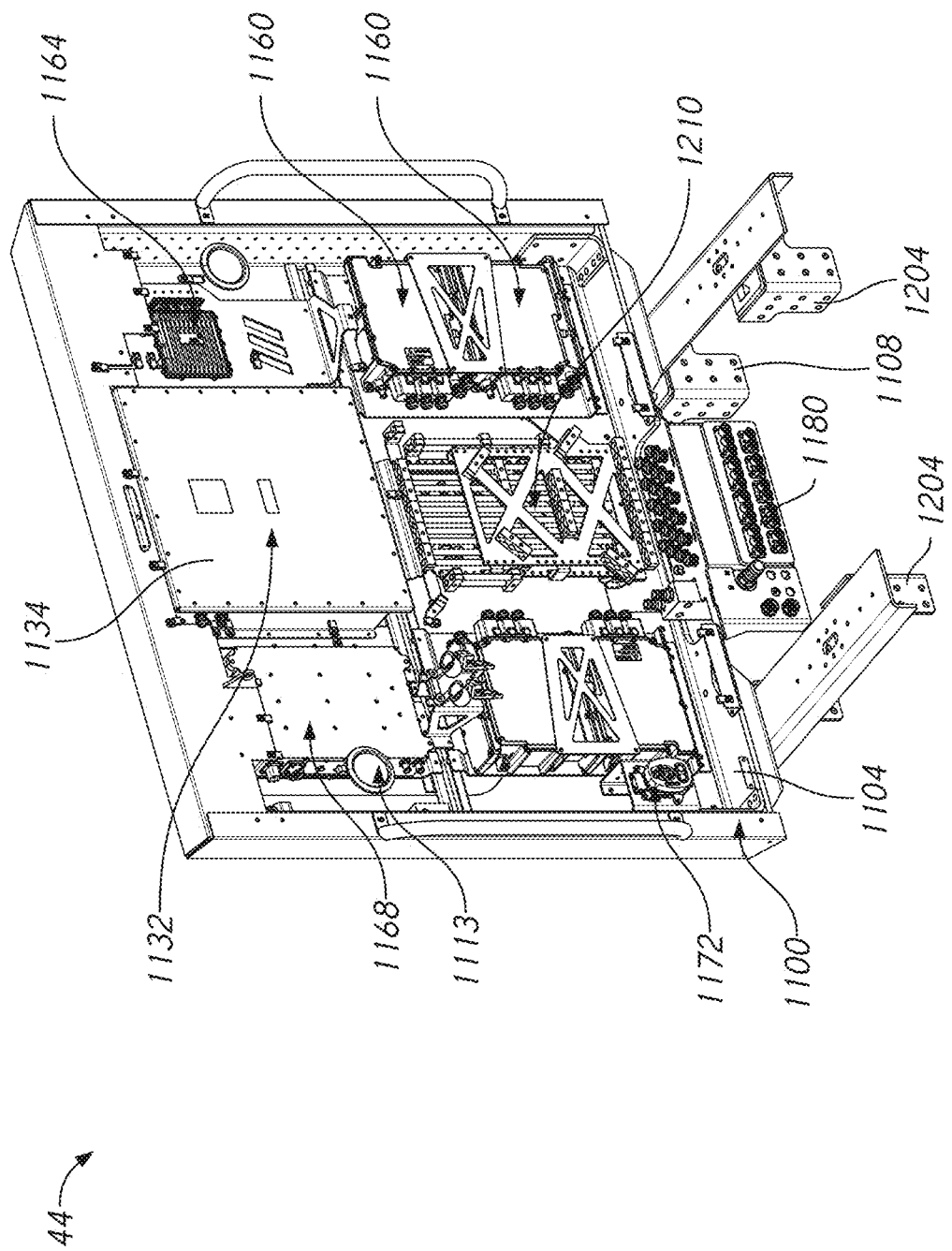
FIG. 11 is a rear perspective view of the power distribution system module of FIG. 10 with a portion of a cowling thereof removed.

FIG. 11 shows the power distribution system module 44 with the rearward side 1118 of the cowling 1112 removed. With the rearward side 1118 removed various power distribution components can be visible or accessible. The components are also seen to be close to a junction box 1180 to facilitate connection between the power distribution components and other components and modules of the electric propulsion system 1000 or of the vehicle to which the power distribution system module 44 is coupled.

Power distribution components of the system module 44 disposed on the rear side are electrically coupled with each other. A charge interface 1172 can be provided on the rear side, e.g., on a driver side of the housing 1110. The charge interface 1172 can be provided on a lateral side, e.g., the driver or passenger side, of the housing 1110. The charge interface 1172 can be provided on both the driver side and the passenger side of the housing 1110. In the power distribution module 1300 discussed below the charge interface 1172 can be located on a same panel as a fill panel for filing a gas cylinder 1400 or a combustion gas cylinder 1402. When connected to an external source, current from the external source flows through the charge interface 1172 to a charging system. The interface 1172 can include a receptacle for inserting an end portion of a charging cable. FIG. 10 shows that a charge interface 1172A can be provided on a top surface or the power distribution module 44 in place of or in addition to the charge interface 1172 to enable coupling with an overhead external source of current. The charging system includes an AC charge circuit 1168 that is adapted to receive AC current and to direct the AC current to any of the battery assemblies 100, 1004A, 1004B. The charging system also can include a charge circuit 1156 that is electrically coupled with the charge interface 1172 and that is adapted to provide a more rapid charge to any of these battery assemblies. The charge circuit 1156 or another circuit within the housing 1110 can be coupled with the charge interface 1172A to facilitate overhead charging. The charge circuit 1156 can be adapted to receive a direct current (DC) from the charge interface 1172 in a manner that results in reaching a full charge much faster than through the AC charge circuit 1168. The charge circuit 1156 can include or be coupled with a sensor 1158 configured to assure that the charging process operates as planned. For example, the sensor 1158 can be configured to detect the polarity of the circuit such that current is confirmed to be flowing in the correct direction, that is toward one or more of the battery assembly 1004A and the battery assembly 1004B. The sensor 1158 can be integrated into the charge circuit 1156 or can be a separate circuit coupled therewith. However, the AC charge circuit 1168 provide the advantage that AC current may be available in more locations than a DC current source configured to charge the battery assemblies. The charge interface 1172 is configured with separate sections that can receive an AC or the DC current source plug.

The power distribution system module 44 also includes a power distribution unit 1132 disposed within the cowling 1112. The power distribution unit 1132 houses circuits that can provide, direct, or interrupt current flow in a number of situations. The power distribution unit 1132 is disposed in a power distribution unit housing 1134 that can be located toward the top of the frame assembly 1100 of the power distribution system module 44. The location of the power distribution unit 1132 advantageously allows the power distribution unit housing 1134 to be access by service personnel standing on the access deck 1200. For example, a door of the cowling 1112 can be opened or a panel thereof removed to expose the power distribution unit housing 1134. The power distribution unit housing 1134 preferably also has a door, a removable panel, or another access portal on a rear side thereof (the side visible in FIG. 11) to facilitate service. The power distribution unit 1132 is discussed in greater detail below.

A powertrain control circuit 1164 is provided adjacent to, e.g., at the same elevation as, the power distribution unit 1132. The powertrain control circuit 1164 includes a low voltage processor or computer that is configured to regulate the operation of the electric motors 48 that are coupled with and that drive the axles 47 of the vehicle 40 or an electric motor disposed in the axle drive assembly 112. The powertrain control circuit 1164 regulates the amount of current that flows to the electric motor(s) and, at least in this sense, is also a power distribution component. The powertrain control circuit 1164 is shown mounted separately from the power distribution unit 1132 but could be disposed within the power distribution unit housing 1134 and/or combined with other circuits within the power distribution unit 1132. The powertrain control circuit 1164 could be combined with other circuits of the power distribution system module 44 disposed within the housing 1110 and outside of the power distribution unit 1132.

Figure 12:
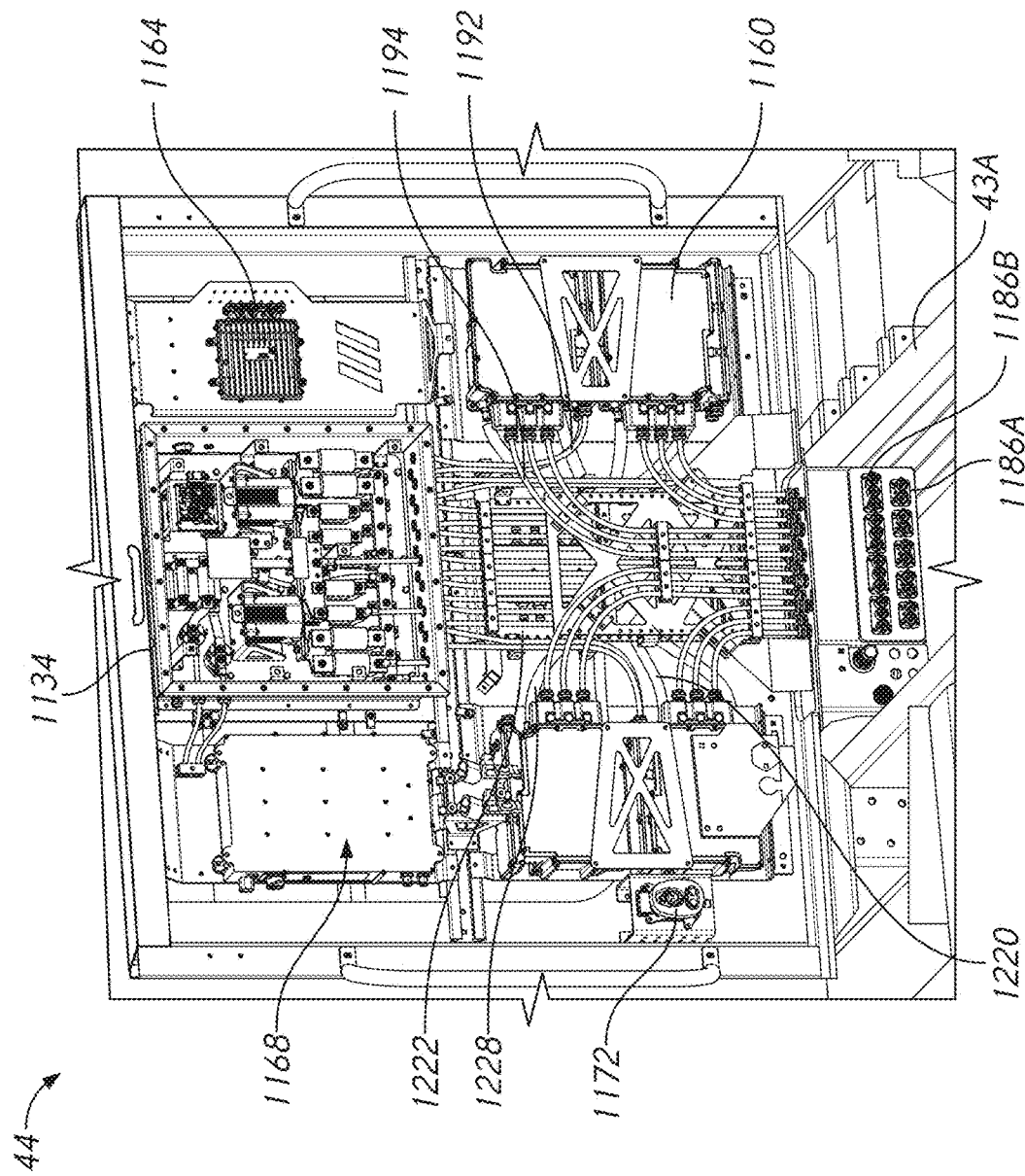
FIG. 12 shows a number of electric power distribution components disposed in an interior of the power distribution system module of FIG. 10.

FIG. 12 shows that the power distribution unit 1132 also can be mounted to the frame assembly 43 directly above the junction box 1180. This configuration enables high voltage cables conveying current from battery assemblies to extend directly vertically from the junction box 1180 to the power distribution unit 1132. Current from battery assemblies can flow directly to the power distribution unit 1132 and, if not interrupted by a circuit element therein, can flow to one or a plurality of inverters 1160. If the current from the battery assemblies are not interrupted the current can flow in a first segment 1192 of an electrical conveyance disposed in the power distribution system module 44. The electrical conveyance of which the first segment 1192 is a part can extend from the power distribution unit 1132 to the junction box 1180. The first segment 1192 can extend between the power distribution unit 1132 and the inverter(s) 1160. The current can flow in the first segment 1192 in a two phase configuration from the power distribution unit 1132 to the inverter(s) 1160. The inverter(s) 1160 convert the current from DC to AC current, e.g., three phase power AC current. The outlet of the inverter(s) 1160 is connected to the junction box 1180 by a second segment 1194 of the electrical conveyance disposed between the power distribution unit 1132 and the junction box 1180. The second segment 1194 can be configured to convey three phase power from the inverter(s) 1160 to the junction box 1180. The junction box 1180 can have junctions that can connect to high voltage cables that convey three phase power to other components or modules of the electric propulsion system 1000.

The junction box 1180 preferably is configured to fit between adjacent frame rails of a vehicle chassis. The junction box 1180 includes a cable interface 1184 that enables the junction box 1180 to connect to components or modules outside of the power distribution system module 44, e.g., to other components or modules of the electric propulsion system 1000. The cable interface 1184 can be located on a portion of the junction box 1180 configured to face rearward and to be accessible when installed on a vehicle for connecting power modules and for service. The cable interface 1184 can have a portion that faces toward the power distribution unit 1132 within the cowling 1112 and another portion that is aligned with a longitudinal axis of a vehicle to facilitate routing high voltage cables therefrom to other components.

The cable interface 1184 can include junctions for connecting battery assemblies, e.g., the battery assembly 1004A or the battery assembly 1004B to the power distribution system module 44. The battery assemblies can be connected to the junction box 1180 at a first junction 1186A. Current can flow from the first junction 1186A through high voltage cables from the junction box 1180 to the power distribution unit 1132. If the current is not interrupted by circuit elements in the power distribution unit 1132 the current can flow to a second junction 1186B. The second junction 1186B can be coupled with a load, such as the electric motor 48 by way of the electrical conveyance 1190. The electrical conveyance 1190 can include the first segment 1192 to the inverter 1160 and the second segment 1194 from the inverter 1160 to the junction box 1180.

Figure 14:
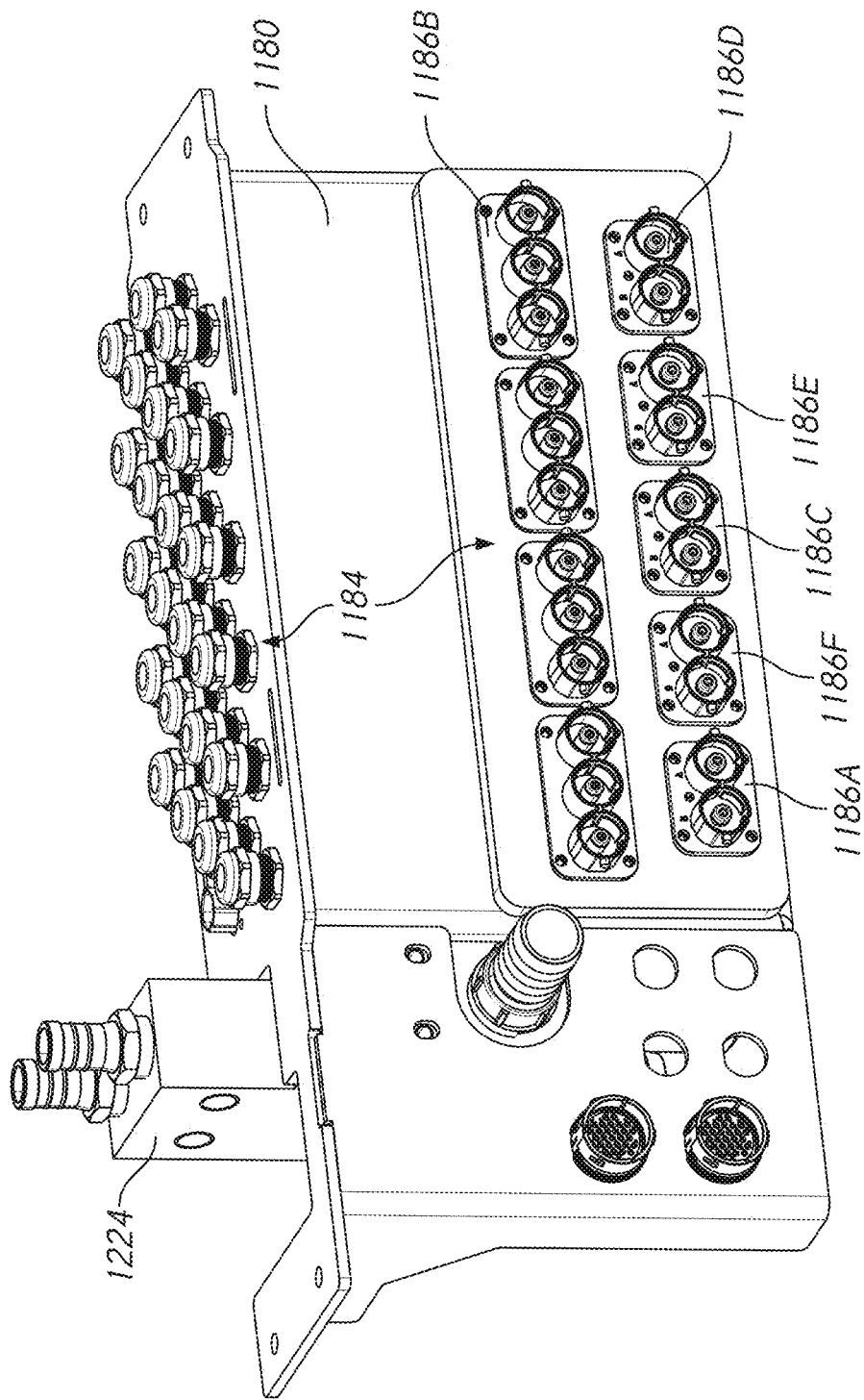
FIG. 14 shows a junction box that includes a cable interface and a coolant manifold.

FIGS. 12 and 14 show that the junction box 1180 can include a third junction 1186C that can be configured to be coupled with another load. For example, the third junction 1186C can be coupled with the auxiliary component module 1008 or the front end accessory component assembly 104 by way of a high voltage. The high voltage cable connecting the third junction 1186C to an accessory module can be routed beneath the power distribution system module 44 to a front portion of the vehicle 40, e.g., in the front end compartment 42. One or more high voltage cables can be routed in a spaced bounded below by a top surface of a battery assembly and by a bottom surface of the junction box 1180.

The foregoing describes that the power distribution module 44 can be connected to two loads, e.g., to the electric motor 48 and to the front end accessory component assembly 104 or the auxiliary component module 1008, the power distribution module 44 can be connected to two electric motors 48 the second junction 1186B and another junction. Also, the number of connections for loads is not limited to two junctions. Rather the junction box 1180 can be equipped with additional junctions to connect with three or more loads, e.g., two electric motors 48 and the auxiliary component module 1008.

In one configuration redundant current is provided to two or more electric motors 48 by the power distribution module 44. For example, the battery assembly 1004A can be coupled to the power distribution module 44 and the power distribution module 44 can couple the battery assembly 1004A to a first electric motors 48. The connection can be by way of one or more inverters 1160 and the junction box 1180 such that the system can be modular and/or set up by the end user for a particular application. The battery assembly 1004B can be coupled to a second electric motor 48. In one configuration, the battery assembly 1004A and the battery assembly 1004B connect to the first electric motor 48 and the second electric motor 48 through the same power distribution module 44. In one variation, an independent current path is provided for each of the battery assembly 1004A and the battery assembly 1004B. For example, there can be dedicated circuits for each current path in the power distribution unit 1132. Or multiple power distribution units 1132 can be provided, one for each current path. Also, there can be one or more dedicated inverters 1160 for the current path connecting the battery assembly 1004A to the first electric motor 48 and one or more dedicated inverter 1160 for the current path connecting the battery assembly 1004B to the second electric motor 48.

By providing two or more independent current paths, the electric propulsion system 1000 can be protected from complete failure if one of the battery assemblies or some aspect of the current path from the battery assembly to an electric motor fails. For example, the failed current path can be taken out of service and the remaining current path(s) can be relied upon to share the load. The electric propulsion system 1000 can also be configured to adapt in such a case to assure that the vehicle 40 with which the electric propulsion system 1000 is coupled can reach a destination. In one configuration, a derate strategy can be employed whereby the electric propulsion system 1000 limits current draw by regulating the operation of the vehicle 40, e.g., by applying a maximum speed regardless of the manner in which the driver operates the vehicle 40.

The cable interface 1184 can also include a fourth junction 1186D that can be configured to connect to second battery assembly, for example to the battery assembly 1004B if the battery assembly 1004A is connected to the first junction 1186A. This allows two battery assemblies to be connected to the junction box 1180, one at each of the first junction 1186A and the fourth junction 1186D. In certain configurations each of the battery assembly 1004A and the battery assembly 1004B include two separate high voltage cable assemblies. The cable assemblies can include a positive conveyance and a negative conveyance coupled together. Such a cable assembly can be provided for each side of the battery assembly 1004A or the battery assembly 1004B. In such embodiments the cable interface 1184 of the junction box 1180 can include a fifth junction 1186E configured to connect to a second high voltage cable of the battery assembly 1004A and a sixth junction 1186F configured to connect to a second high voltage cable of the battery assembly 1004B. In variations one of the battery assembly 1004A, 1004B can have one or more than two high voltage cable assemblies spanning therefrom to the junction box 1180. One or both of the battery assembly 1004A, battery assembly 1004B can include four separate high voltage cables, e.g., a first pair of positive and negative conveyances and a second pair of positive and negative conveyances. Providing two or more high voltage cables allows a subset of battery cells in the battery assembly 1004A, 1004 B to supply current to the power distribution system module 44 even if some of the cells thereof are inoperable.

Also, the junction box 1180 and the power distribution module 44 can be seen to be independently connectable to the battery assembly 1004A, the battery assembly 1004B, or any other battery assembly as a source of current. For example, one or more battery assemblies could be coupled with another part of a vehicle while the battery assembly 1004A and/or the battery assembly 1004B can be coupled as shown in FIG. 1, e.g., beneath frame rails supporting the cab of a tractor unit. The junction box 1180 can enable the power distribution module 44 to be coupled with battery assemblies located elsewhere on the vehicle by way of the any two or more of the junctions, e.g., by connection of a battery assembly mounted elsewhere to the fourth junction 1186D and the fifth junction 1186E. Although the junction box 1180 is shown with four junctions for connecting to two battery assemblies with cable redundancy (e.g., two high voltage cables per battery assembly, each of which can direct current to an electric motor independently of the other), in other embodiments there can be more or fewer junctions. For example, a third pair of junctions can be provided for coupling two high voltage cables coupled with a trailer mounted battery assembly such that when an application would benefit from additional on-board electric storage, the junction box 1180 and the power distribution module 44 can be quickly coupled with a third (or fourth or more) battery assembly. This allows the flexibility to equip a tractor-trailer with, e.g., 50% more stored power when the type of load and/or haul distance would benefit from such additional power. Since the trailer can be selected from a fleet of trailers, some can be equipped with additional battery assemblies and some need not be so equipped. The junction box 1180 allows quick and convenient connection to the battery assembly equipped trailer. In the instance where the additional power is not needed power source junctions can go unused but be available for subsequent trips where the junctions can be used for connection to the additional battery assemblies. The power distribution module 44 allows the power sources and loads to be indirectly coupled to each other, which provides benefits such as allowing intervening control circuits to be placed in series with the power sources and loads.

FIG. 12 shows that the second junction 1186B can include a plurality of connections that can provide current to a load. For example, in some cases more than one axle 47 of the vehicle 40 are driven by independent electric motor 48. Each electric motor 48 can be supplied independently by a separate high voltage cable connected to the second junction 1186B. The second junction 1186B can be coupled with four loads simultaneously, e.g., four electric motors 48, each driving a separate axle 47.

Figure 13:
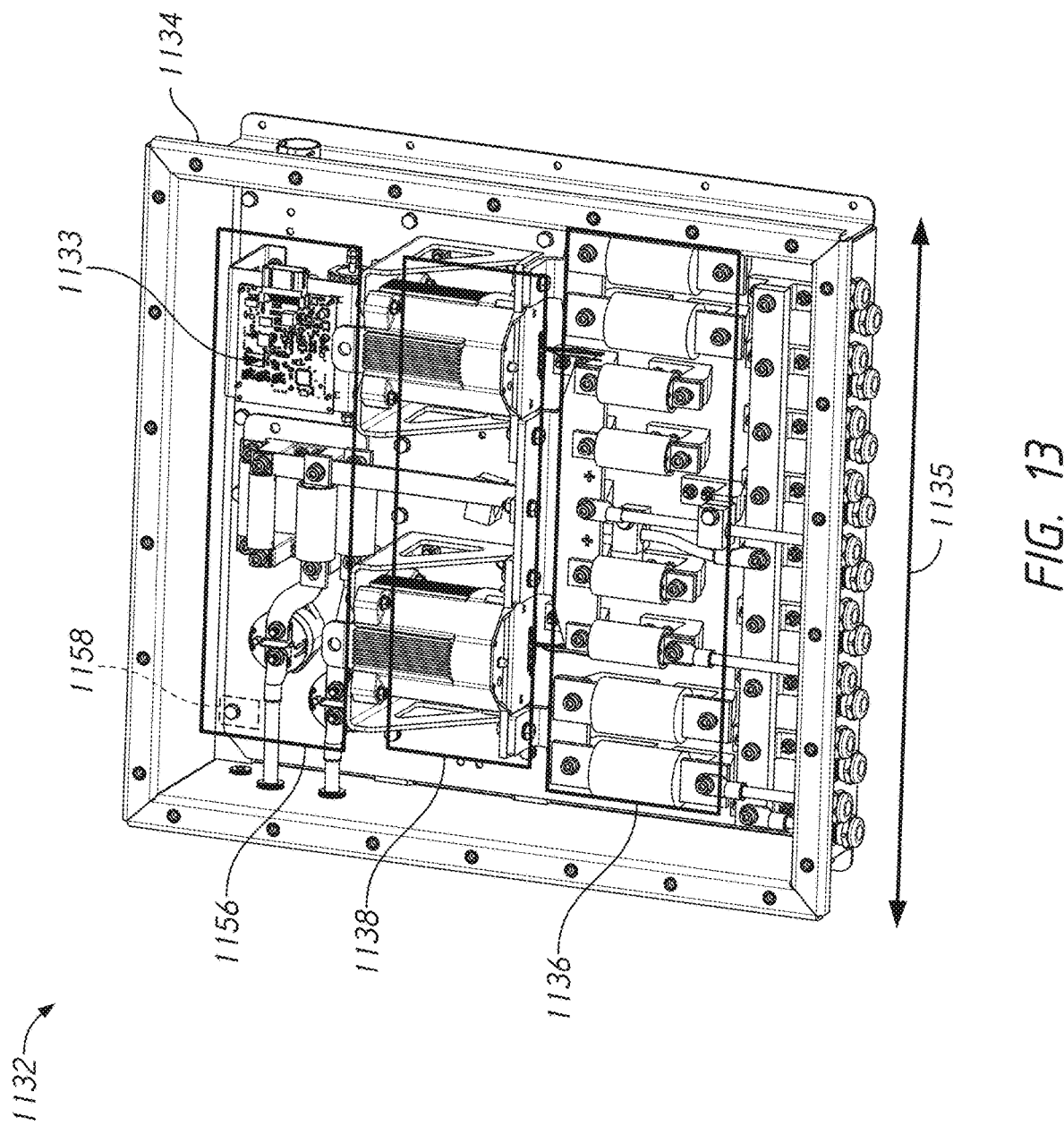
FIG. 13 shows a number of internal components of a power distribution unit, a portion of a housing thereof having been removed.

FIG. 13 shows one example layout of contents of the power distribution unit 1132. As discussed above, the power distribution unit 1132 can enclose the charge circuit 1156. The charge circuit 1156 can receive a DC current from a power source and can be used to more rapidly charge the battery assembly 1004A and/or the battery assembly 1004B. The power distribution unit 1132 also can house one or a plurality of fuses 1136. In one example the power distribution unit 1132 houses a fuse 1136 for the battery assembly 1004A, the battery assembly 1004B, and each of the electric motors 48. In some cases the fuses 1136 can include a fuse for first and second battery sub-assemblies within one or both of the battery assembly 1004A, 1004B. The power distribution unit 1132 also can include switches 1138 configured to regulate operation of the electric motor 48. The switches 1138 can provide an open circuit between the battery assembly 1004A or the battery assembly 1004B and the electric motor 48 any time a vehicle key is disengaged or in an off position. The switches 1138 provide an emergency off operation for the electric motor 48 such that continued operation of the electric motor 48 to drive the electric motor 48 and the wheels can be interrupted as needed. As noted above, the power distribution unit 1132 can have a housing width 1135 that is less than a spacing between frame rails of a vehicle such that the power distribution unit 1132 can be mounted within the housing 1110 or directly to the frame rails similar to how the rear electric component assembly 108 is mounted in the vehicle assembly 50, as shown and described in connection with FIG. 2.

The power distribution unit 1132 can have other safety circuits. For example, the power distribution unit 1132 can have an active discharge switch 1133, which can include a resistor and contactor, that can drain any charge from the electric propulsion system 1000, e.g., between the power distribution unit 1132 and the electric motor 48 within seconds of a key switching to an off position. The active discharge switch 1133 can drain charge stored in high voltage power electronic bulk capacitors of electric propulsion system 1000, e.g., of the power distribution system module 44 or other power distribution modules disclosed herein.

FIGS. 15-18 show aspects of a conduit management assembly 1210 configured to house cables and conduits of the power distribution system module 44 within the housing 1110. The conduit management assembly 1210 enhances order within the cowling 1112 and also enhances access to components therein for inspection and servicing. The conduit management assembly 1210 can include a frame member 1104A and a frame member 11104B. The frame members 1104A, 1104B can be coupled to each other by one or plate member. The plate members can serve as dividers. For example, a forward divider 1214 and a rearward divider 1218.

Figure 15:
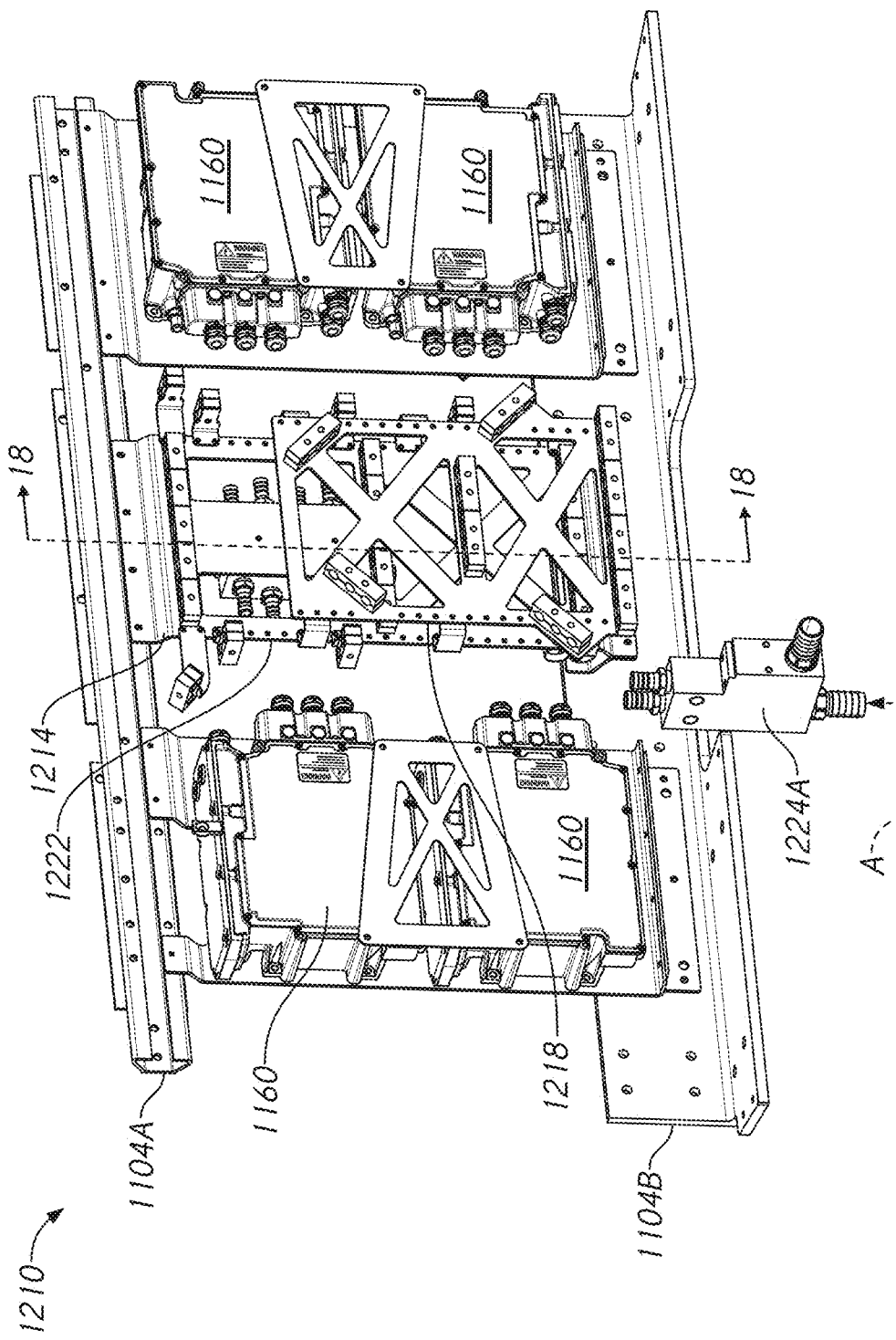
FIGS. 15 and 16 are perspective views of a cable management assembly along with certain cable and conduit connected components disposed around the assembly.
Figure 16:
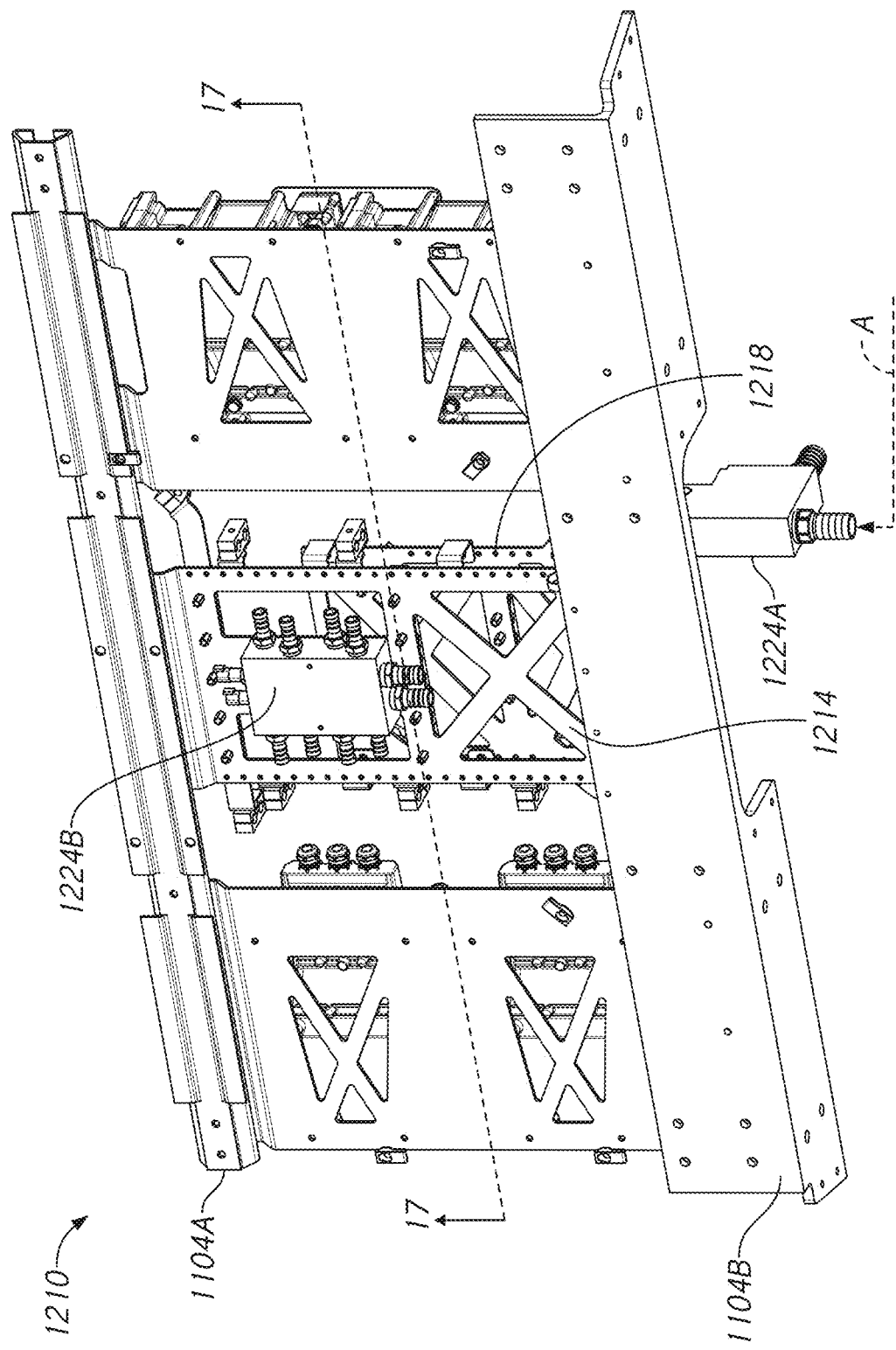
Figure 17:
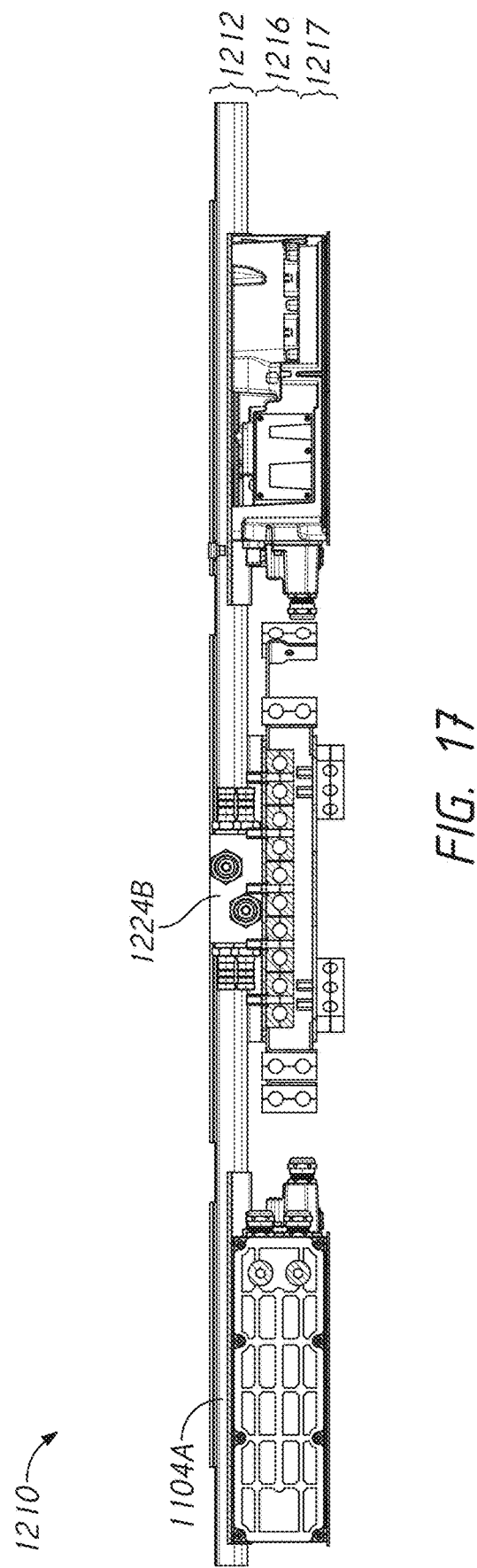
FIG. 17 is a horizontal cross-sectional view of the cable management assembly taken at the section plane 17-17 in FIG. 16.
Figure 18:
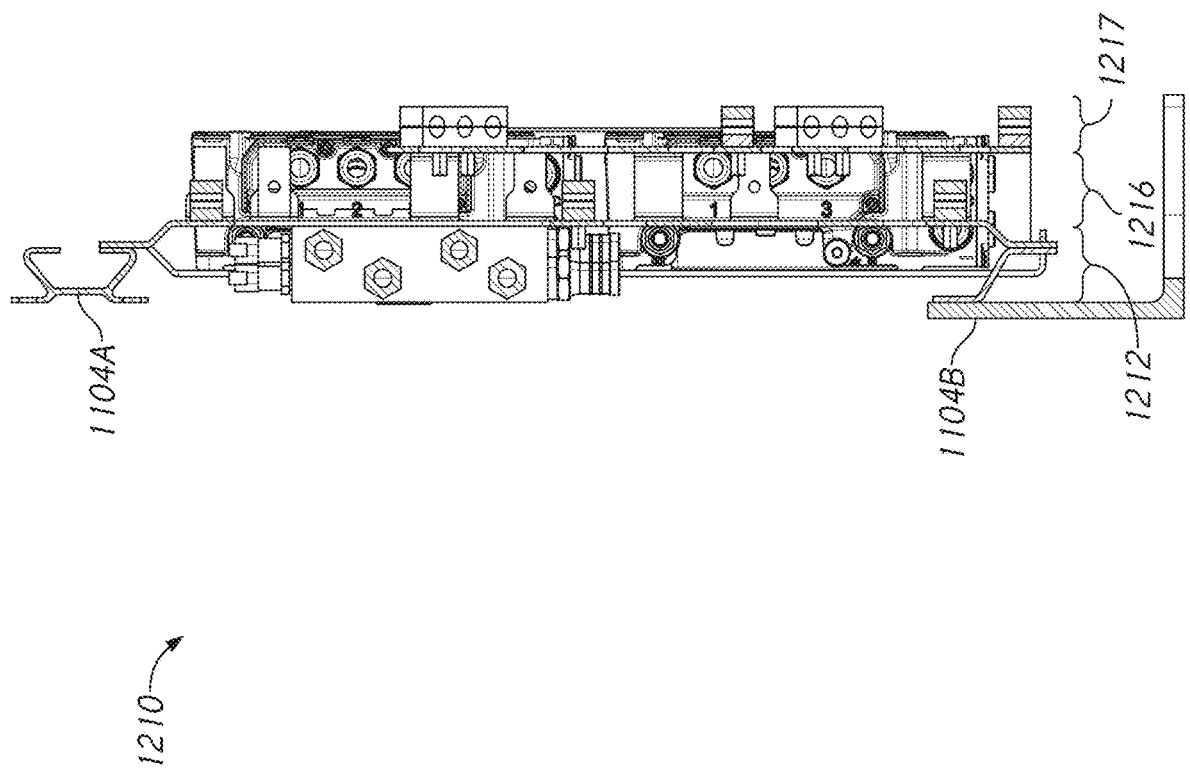
FIG. 18 is a vertical cross-sectional view of the cable management assembly taken at the section plane 18-18 in FIG. 15.

FIG. 16 shows the forward divider 1214 in greater detail. The forward divider 1214 can serve to support one or more components of a subsystem, e.g., of a fluid or thermal management system. In on embodiment a thermal management system of the power distribution system module 44 can include a coolant manifold 1224A and a coolant manifold 1224B. The coolant manifold 1224B can be mounted to a forward face of the forward divider 1214. The forward face of the forward divider 1214 can also generally define a rearward boundary of a forward zone 1212 of the conduit management assembly 1210. The forward zone 1212 can be dedicated to providing a space for one or a plurality of coolant flow conduits 1228. For example, a portion of the coolant flow conduit 1228 can extend from the coolant manifold 1224A into the forward zone 1212 and within the forward zone 1212 to the coolant manifold 1224B. Coolant can be pumped into the coolant manifold 1224A by a pump disposed elsewhere on a vehicle, e.g., from the front end accessory component assembly 104A of the auxiliary component module 1008. A dashed arrow A on FIGS. 15-16 schematically shows the coolant flow. The coolant can split at the coolant manifold 1224B to a plurality of conduits sub-loops to supply components that benefit from active cooling, such as the inverters 1160. Coolant can flow through the inverters 1160 to an outlet thereof and through conduits in the forward zone 1212 back to the coolant manifold 1224A by way of a hot side outlet of the coolant manifold 1224B. The outflow of the coolant manifold 1224A can then flow out of the power distribution system module 44 by way of an outlet port of the coolant manifold 1224A to the electric motor 48 or another component or module of an electric propulsion system that would require or benefit from cooling. Various portions of the coolant flow conduit 1228 can be seen in FIG. 12.

The conduit management assembly 1210 also advantageously can manage high voltage cables of the power distribution system module 44. An intermediate zone 1216 can be defined between the forward divider 1214 and a rearward divider 1218 of the conduit management assembly 1210. The intermediate zone 1216 can provide an unobstructed vertical space extending directly up from a portion of the cable interface 1184 disposed on a top side of the junction box 1180. Straight segments of high voltage cables can be routed directly up through the intermediate zone 1216 to the power distribution unit 1132. In one example the junction box 1180 has four junctions 1186A, 1186D, 1186E, and 1186F that connect to external battery assembly high voltage cables. The junction box 1180 can convey current from the junctions 1186A, 1186D, 1186E, and 1186F to outlet junctions that are directly below the intermediate zone 1216. Accordingly, high voltage cables can connect outlet junctions of the junction box 1180 to inlet junctions of the power distribution unit 1132 disposed directly above the outlet junctions of the junction box 1180. In one example, the intermediate zone 1216 is configured to accommodate eight high voltage cables disposed between the junction box 1180 and the power distribution unit 1132. In another example, the intermediate zone 1216 is configured to accommodate ten high voltage cables disposed between the junction box 1180 and the power distribution unit 1132.

The conduit management assembly 1210 can also provide a rearward zone 1217 disposed between the rearward divider 1218 and the forward face of a rear portion of the cowling 1112. The rearward zone 1217 can house a set of high voltage cables in one embodiment. The rearward zone 1217 can be used to mount high voltage AC cables, e.g., cables with current that is configured to be delivered by the power distribution system module 44 to other components or modules of a vehicle, e.g., the electric motors 48 or the front end accessory component assembly 104A of the auxiliary component module 1008. For example, output cables of the inverters 1160 can connect outlets of the inverters with three phase power inlets of the junction box 1180. The three phase power inlets can be coupled with three phase power outlets of the junction box 1180 that can be coupled with high voltage cables of the power distribution system module 44 to couple with the electric motor 48 or other components of the vehicle 40.

The conduit management assembly 1210 can also provide a further cable management zone disposed between the forward zone 1212 and the intermediate zone 1216 in which a plurality of high voltage cables can be disposed. For example, a side plate 1218A can extend between the forward divider 1214 and the rearward divider 1218. A lateral face 1222 of the side plate 1218A can have one or a plurality of high voltage cables connected thereto. The lateral face 1222 can be configured to mount high voltage cables connected to outlets of the power distribution unit 1132 and to an inlet of the inverters 1160. In some examples the lateral face 1222 provides a layer that is disposed between the forward zone 1212 and the intermediate zone 1216. Another side layer can be provided on an opposite of the intermediate zone 1216 from the side plate 1218A. Thus, the conduit management assembly 1210 can provide a plurality of zones aligned with a longitudinal axis of a vehicle, or for-to-aft. The conduit management assembly 1210 can provide a plurality of zones aligned with a transverse axis of a vehicle, e.g., toward a driver side and toward a rider side.

Although the foregoing describes a cable management layout in which the coolant flow conduit 1228 is forward of one or a plurality of layers of high voltage cables, in other embodiments other arrangements are possible. For example the coolant flow conduit 1228 can be disposed in the rearward zone 1217 such that the coolant flow conduit 1228 can be accessed from the access deck 1200 without having to remove any of the high voltage cables or to cross any layers housing electrical conveyances. This can enhance serviceability of the power distribution system module 44 while maintaining a high level of safety as to current carrying components.

One or more of the zones, e.g., the forward zone 1212, the intermediate zone 1216 or the rearward zone 1217 can include clips for securing cables or coolant conduits. The clips can include hose clamps, spring clips, or brackets that open and can be secured by screws or other fasteners to provide a very secure and in some cases motion limited or motion free assembly.

The junction box 1180 also advantageously provides for electrical and coolant connection between the power distribution system module 44 and other components or modules of a vehicle at a single component location or point of connection. By providing a single point of connection between these components, the junction box 1180 facilitates a modular construction where the power distribution system module 44 can be quickly integrated onto a vehicle and into larger vehicle system, such as an electric propulsion system 1000. The junction box 1180 also facilitate quick reconfiguration, such as adding battery assemblies, electric motors or other load components.

Variations of the power distribution system module 44 can provide for further integration of components in a position rearward of the cab 41 of the vehicle 40. For example the frame rail dimension of the power distribution system module 44 could be made larger, e.g., up to about 20 inches or more in some cases. This arrangement can allow for more components of the auxiliary component module 1008 to be shifted into the power distribution system module 44 to be located behind the cab 41 and out of the front end compartment 42. For example, as illustrated in FIG. 10, the power distribution system module 44 can be configured with one or more output junctions 1150 to export or provide one or more or all of alternating current power (in various voltages or phases, e.g., 110V, 220V, and/or 440V in single, dual or three phase configurations), compressed air, and pressurized hydraulic fluid. In some cases the mounting of components within to the frame assembly 1100 can be in a more horizontal configuration, e.g., with horizontal trays or shelves to which one or more power distribution components or other accessory devices or components can be mounted.

In one example, an air compressor, one or more air tanks and pumps can be located within the cowling 1112 of the power distribution system module 44. This can reduce the size of or eliminate the lower accessory tray assembly 1009 in the auxiliary component module 1008. In some cases, all components of the auxiliary component module 1008 can be located in the cowling 1112. In some cases, all components other than cab climate control components can be located within the cowling 1112. By shifting these components to a location behind the cab 41 space can be freed up in front end compartment 42 for additional battery assemblies.

B. Power Distribution System Modules with Gas Storage Components

Although charging the battery modules in the battery assembly 100 by connection to an external current source is convenient for some applications, FIGS. 1D and 21-24 illustrate embodiments of power distribution system modules with on-board current generation to periodically or continuously recharge the battery assembly 100 without requiring an external current source, e.g., during operation of the vehicle.

FIG. 1D shows a power distribution system module 1300 that can include any or all of the electrical components of the power distribution system module 44. For example, the power distribution system module 1300 can include an electric vehicle control module. The power distribution system module 1300 can be configured to couple with the frame assembly 43, e.g., via one or more frame rail brackets 1380. The power distribution system module 1300 can be configured to be coupled with a fuel cell module 1304 that can be coupled with the frame assembly 43 separately from the power distribution system module 1300.

Figure 21:
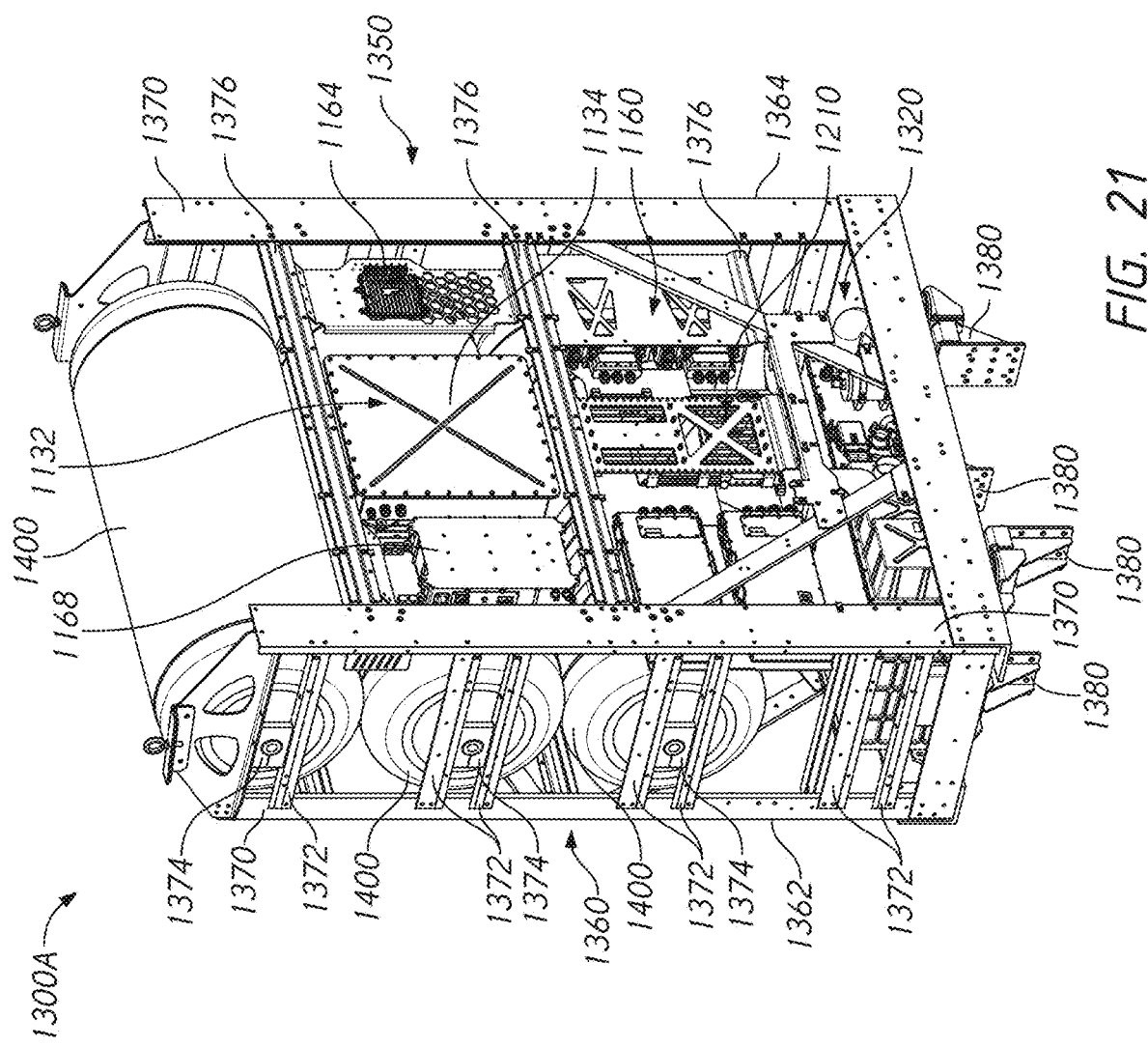
FIG. 21 is a top, rear perspective view of a power distribution system with a cowling thereof removed.

The power distribution system module 1300 can additionally include a hydrogen fuel module. For example, a plurality of gas cylinders 1400 (e.g., two gas cylinders 1400, three gas cylinders 1400, four or more gas cylinders 1400, etc.) can be disposed in the housing 1350 of the power distribution system module 1300. The housing 1350 is shown in FIGS. 1D and 1n FIG. 21 in connection with power distribution module 1300A. The description of the power distribution module 1300A can supplement the description of the power distribution module 1300. The gas cylinders 1400 can be configured to store and supply hydrogen to one or more fuel cell(s) 1320.

In some applications, the power distribution system module 1300 can include a combustion fuel module. For example, one or more, or all, of the plurality of gas cylinders housed in the power distribution system module 1300 can be combustion gas cylinder(s) 1402. FIG. 24 shows that in one modified embodiment a power distribution system module 1300C can include a combination of gas cylinder(s) 1400 (e.g., for storing hydrogen gas) and combustion gas cylinder(s) 1402 (e.g., for storing compressed natural gas). The power distribution system module 1300 may include two gas cylinders 1400 and one combustion gas cylinder 1402, or one gas cylinder 1400 and one combustion gas cylinder 1402, or one gas cylinder 1400 and two combustion gas cylinders 1402, as a few example combinations. The gas cylinder(s) 1400 and the combustion gas cylinder(s) 1402 can have some or all of the same features. For example, the diameter of the gas cylinder 1400 can be similar to or the same as the diameter of the combustion gas cylinder 1402. In some applications, the walls of the gas cylinder(s) 1400 are thicker than the walls of the combustion gas cylinder(s) 1402 or are otherwise constructed to be able to store gas at a higher pressure and/or to provide for minimal permeation of gas therefrom.

The frame assembly 1360 of the power distribution system module 1300 can include an electric vehicle control module frame assembly and a cylinder frame assembly. The cylinder frame assembly can be coupled to the electric vehicle control module frame assembly. For example, a portion of the frame assembly 1360 (e.g., a rearward portion thereof configured as the electric vehicle control module frame assembly) can be configured to support electrical components of the power distribution system module 1300 and a portion of the frame assembly 1360 (e.g., a forward portion thereof configured as the cylinder frame assembly) can be configured to support one or more gas cylinder(s) 1400 and/or one or more combustion gas cylinder(s) 1402. The cylinder frame assembly can include an array of frame members forming a forward part of the frame assembly 1360 and one or a plurality of generally horizontally extending frame members extending rearward from the forward part. The electric vehicle control module frame assembly can include an array of frame members forming a rearward part of the frame assembly 1360. The electric vehicle control module frame assembly can be configured the same or similar to the frame assembly 1100 of the power distribution module 44. The cylinder frame assembly can expand the depth of the frame assembly 1360 to provide space for the gas cylinder 1400 and/or combustion gas cylinder 1402.

Figure 1F:
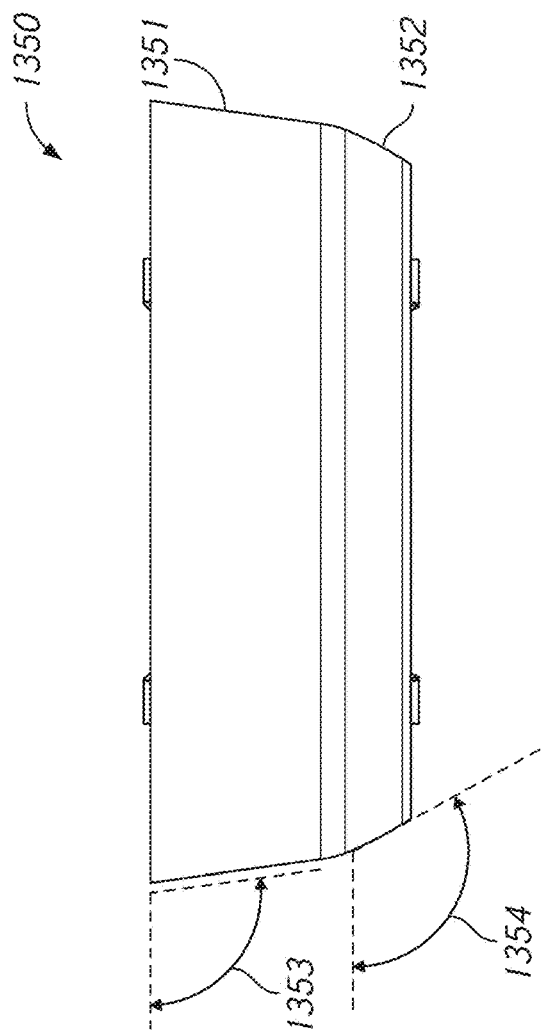
FIG. 1F is a top view of the tapered housing of FIG. 1E.
Figure 1E:
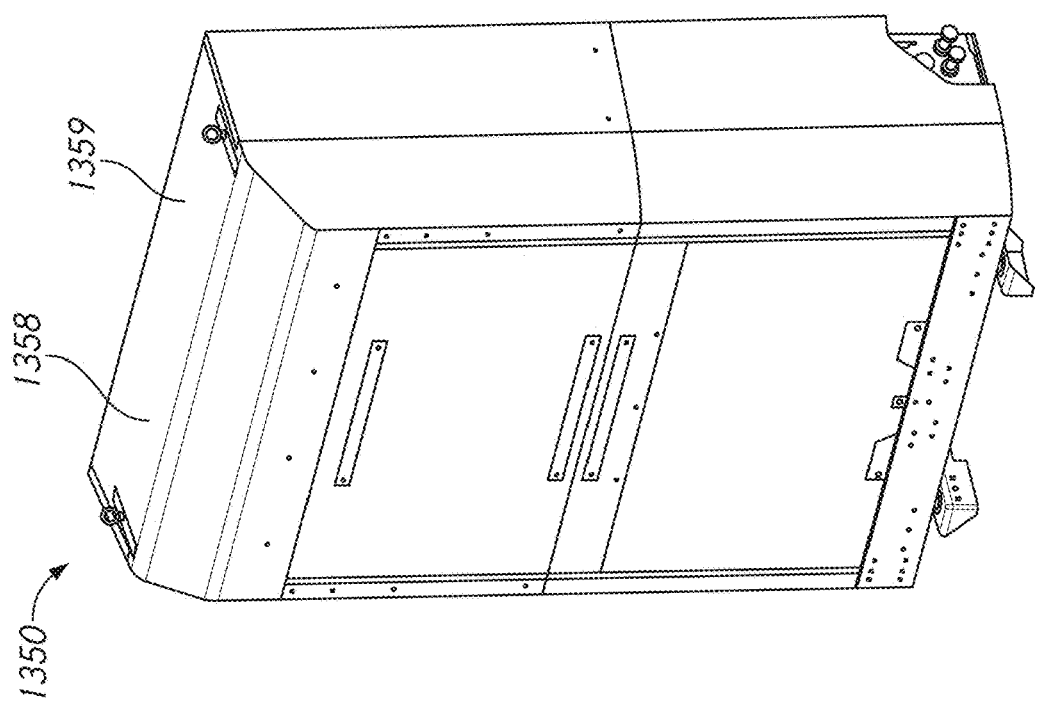
FIG. 1E is a front perspective view of a tapered housing of a power distribution system module.

The housing 1350 of the power distribution system module 1300 can be tapered to reduce the space requirements of the power distribution system module 1300 on the vehicle 40A. For example, as illustrated in FIGS. 1E and 1F, the housing 1350 can have a tapered profile with a narrower dimension toward a forward portion of the housing 1350 compared to a rearward portion of the housing 1350. The maximum frame width of the cylinder frame assembly can be less than the maximum frame width of the electric vehicle control module frame assembly. The housing 1350 (e.g., the cowling 1358) can have a tapered profile in a horizontal cross-section. The tapered profile can have a smaller width dimension toward a forward portion of the cowling 1358 and a larger width dimension toward a rearward portion of the cowling 1358. The tapered profile can include a first taper 1351 (e.g., an angle 1353 between a transverse axis and the side surface of the housing in a rearward portion) extending along the electric vehicle control module and a second taper 1352 (e.g., an angle 1354 between a transverse axis and the side surface of the housing in a forward portion) extending along the hydrogen fuel module. In some applications, a fairing disposed on a rearward portion of the cab 41 of the vehicle 40A can be disposed rearward of the forward portion of the tapered profile of the housing 1350. The housing 1110 (e.g., cowling 1112) of the power distribution system module 44 can be tapered in the same or similar manner discussed above with respect to the housing 1350 (e.g., cowling 1358) of the power distribution system module 1300.

The power distribution system module 1300 can be configured with one or more output junctions (e.g., on a cowling thereof similar to that shown in FIG. 10) to export or provide one or more or all of alternating current power (in various voltages or phases, e.g., 110V, 220V, and/or 440V in single, dual or three phase configurations), compressed air, and pressurized hydraulic fluid. The output junction can be located on a same panel where fill ports are located for gas cylinder 1400 and/or combustion gas cylinder 1402. In some cases, output junctions can be located on a lateral side, e.g., on the driver side of the power distribution module 1300. Output junctions can be located on a passenger side of the power distribution module 1300. Multiple output junctions can be provided, e.g., on both the driver and passenger sides of the power distribution module 1300.

As discussed in greater detail below, FIG. 1D shows that the fuel cell module 1304 can include one or more coolant module(s) 1340 and one or more fuel cell(s) 1320. Providing the fuel cell module 1304 configured to be mounted to the frame assembly 43 separately from the power distribution system module 1300 is advantageous in that it can reduce the space requirements of the power distribution system module 1300 and provide additional space within the housing 1350 for other components. Also, these components can be modular to allow selection of one of several fuel cell modules 1304 and selection of one of several power distribution system modules 1300, the selected ones to be combined into an integrated system. Furthermore, the fuel cell module 1304 can be serviced, repaired and replaced without or with minimal interaction with the power distribution system module 1300 and the power distribution system module 1300 can be serviced, repaired or replaced with minimal interaction with the fuel cell module 1304.

In another embodiment, a power distribution system module 1300A is provided in which a fuel cell 1320 is disposed within a cowling (not shown) of the power distribution system module 1300A. This arrangement allows the fuel cell to be mounted to the frame assembly 43 at the same time as the rest of the components disposed within the cowling. As such, the power distribution system module 1300A provides for simplified assembly to the vehicle 40A. For example, in this configuration, the fuel cell 1320 is mountable to the vehicle 40A upon coupling the frame rail brackets 1380 of the power distribution system module 1300 to the frame rails 43A of the vehicle 40A.

In some applications, the vehicle 40A may be equipped with one or more fuel cell(s) 1320 disposed within the housing 1350 of the power distribution system module 1300 in addition to a separately mounted fuel cell module 1304 housing another one or more fuel cell(s) 1320.

The power distribution system module 1300A further includes a housing 1350 having a frame assembly 1360 and a cowling. The frame assembly 1360 can have a first side 1362 and a second side 1364. The first side 1362 of the frame assembly 1360 can face in a direction towards the back of the cab 41 of the vehicle 40A when the frame assembly 1360 is installed on the vehicle 40A. The second side 1364 of the frame assembly 1360 can face rearward, in a direction facing away from the cab 41 of the vehicle 40A, when the frame assembly 1360 is installed on the vehicle 40A. The frame assembly 1360 can include a plurality of vertical frame members 1370, a plurality of neck support members 1372, a plurality of cross members 1376, and/or neck supports 1374. The neck support members 1372 can extend between the vertical frame members 1370 in a frame rail direction and be configured to couple to the neck supports 1374. The neck supports 1374 can be configured to couple to an end of a gas cylinder 1400, 1402. The cross members 1376 can extend between the vertical frame members 1370 in a direction perpendicular to the frame rail direction. The combination of the rearward vertical frame members 1370 and the cross members 1376 can comprise or form a part of an electric vehicle control module frame assembly in that the electrical system components disposed in the power distribution system module 1300A are coupled to this array of members. The forward vertical frame members 1370 and cross members 1376 and the neck support members 1372 can form a cylinder frame assembly in that these members extend the size of the housing 1350 to an extent to accommodate gas cylinders disposed transverse to the frame rail direction of the power distribution system module 1300A.

The power distribution system module 1300A can be configured to couple to the frame assembly 43 of the vehicle 40A using frame rail brackets 1380. One or more frame rail bracket(s) 1380 can be coupled to the bottom of the frame assembly 1360 of the power distribution system module 1300A and be configured to couple to a plurality of frame rails 43A. For example, as illustrated in FIG. 21, the power distribution system module 1300A can include four frame rail brackets 1380, two configured to couple to a first frame rail 43A and two configured to couple a second frame rail 43A.

FIG. 21 shows that the power distribution system module 1300A can include a plurality of gas cylinders 1400. For example, in the embodiment of FIG. 21, the power distribution system module 1300A includes three gas cylinders 1400. If providing as much hydrogen capacity is desired, most or all of the gas cylinders can be configured to store hydrogen gas. For example, most or all of the gas cylinders 1400 can be configured to retain hydrogen stored at about 350 bar to about 950 bar. The gas can be supplied to the fuel cell 1320 to generate current to recharge battery modules in the battery assembly 100 on a continuous or as needed basis including during operation of the vehicle.

As illustrated in FIG. 21, the power distribution system module 1300A can include a power distribution unit 1132 in a power distribution unit housing 1134, a powertrain control circuit 1164, an AC charge circuit 1168, a conduit management assembly 1210, inverters 1160, and/or a DC/DC converter 1170. Positioning these components in the same housing 1350 as the gas cylinders 1400 can advantageously reduce the complexity of vehicle component routing, provide for simplified assembly to the vehicle 40A, provide for easier access to components during service, and/or allow for more components to be integrated in a vibration-isolated, thermally-protected enclosure. The function of generating current by the fuel cell 1320 and exporting that current to the battery assembly 100 can be provided by the power distribution module 1300A, in addition to other control functions such as directing current from the battery assembly 100 to the axle drive assembly 112 and/or to the front end accessory component assembly 104.

The power distribution unit 1132, power distribution unit housing 1134, powertrain control circuit 1164, AC charge circuit 1168, conduit management assembly 1210, and inverters 1160 can include any or all of the features described with respect to these components of the power distribution system module 44. The DC/DC converter 1170 can be configured to convert a source of direct current from a first voltage to a second voltage. The power distribution unit 1132, powertrain control circuit 1164, AC charge circuit 1168, conduit management assembly 1210, and inverters 1160 can be disposed towards the second side 1364 (e.g., rearward facing side) of the frame assembly 1360 of the power distribution system module 1300A and the gas cylinders 1400, 1402 can be disposed towards the first side 1362 (e.g., forward facing side) of the frame assembly 1360 of the power distribution system module 1300A. The power distribution unit 1132, powertrain control circuit 1164, and AC charge circuit 1168 can be disposed in an upper portion of the housing 1350, vertically between two cross members 1376. The power distribution unit 1132, powertrain control circuit 1164, and AC charge circuit 1168 can be disposed laterally between two vertical frame members 1370. The conduit management assembly 1210 and inverters 1160 can be disposed in a lower portion of the housing 1350, vertically between two cross members 1376. The conduit management assembly 1210 and inverters 1160 can be disposed laterally between two vertical frame members 1370. Each of the power distribution unit 1132, powertrain control circuit 1164, AC charge circuit 1168, conduit management assembly 1210, and inverters 1160 can be disposed above the fuel cell 1320.

Figure 22:
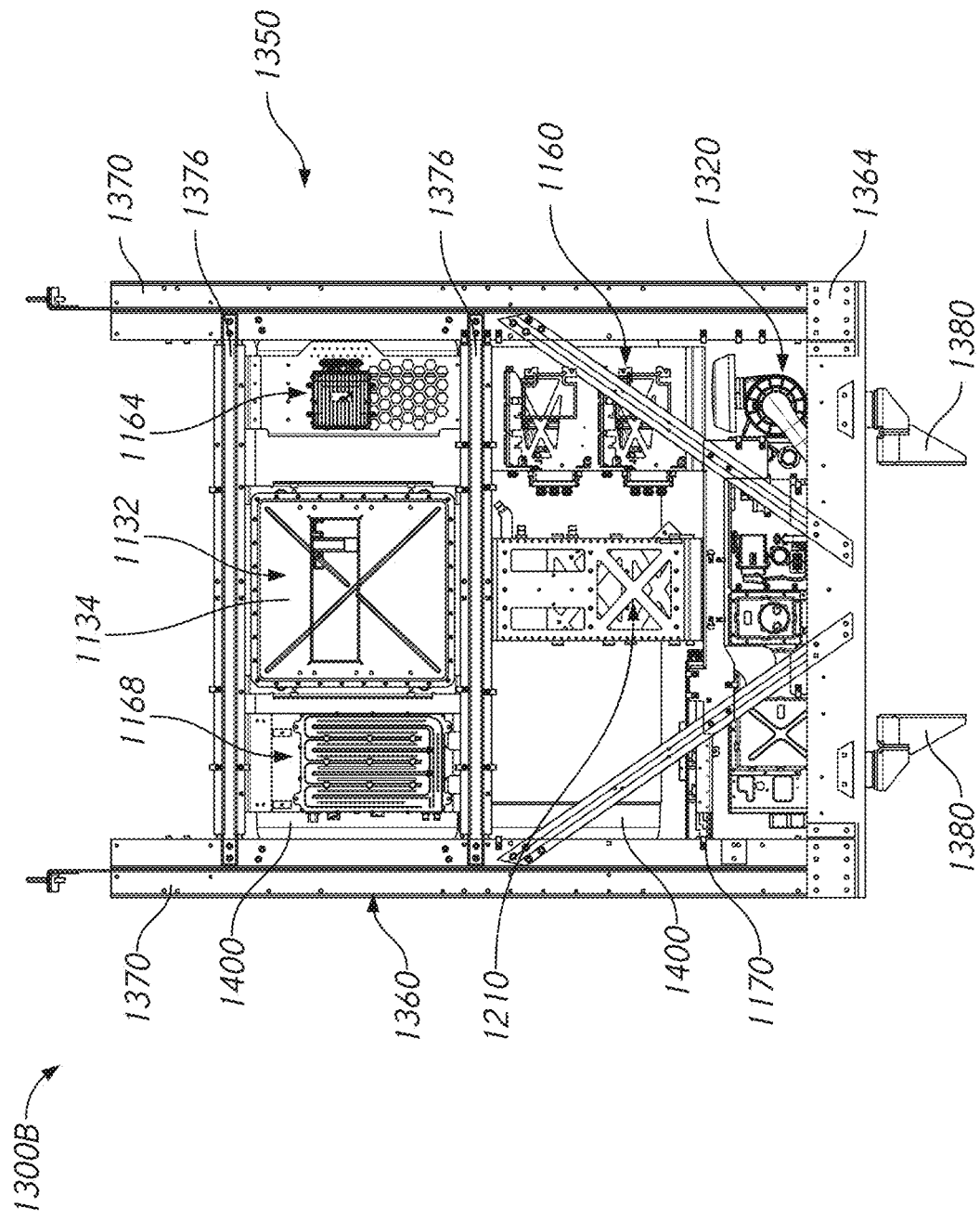
FIG. 22 is a rear view of another power distribution system with a cowling thereof removed.
Figure 23:
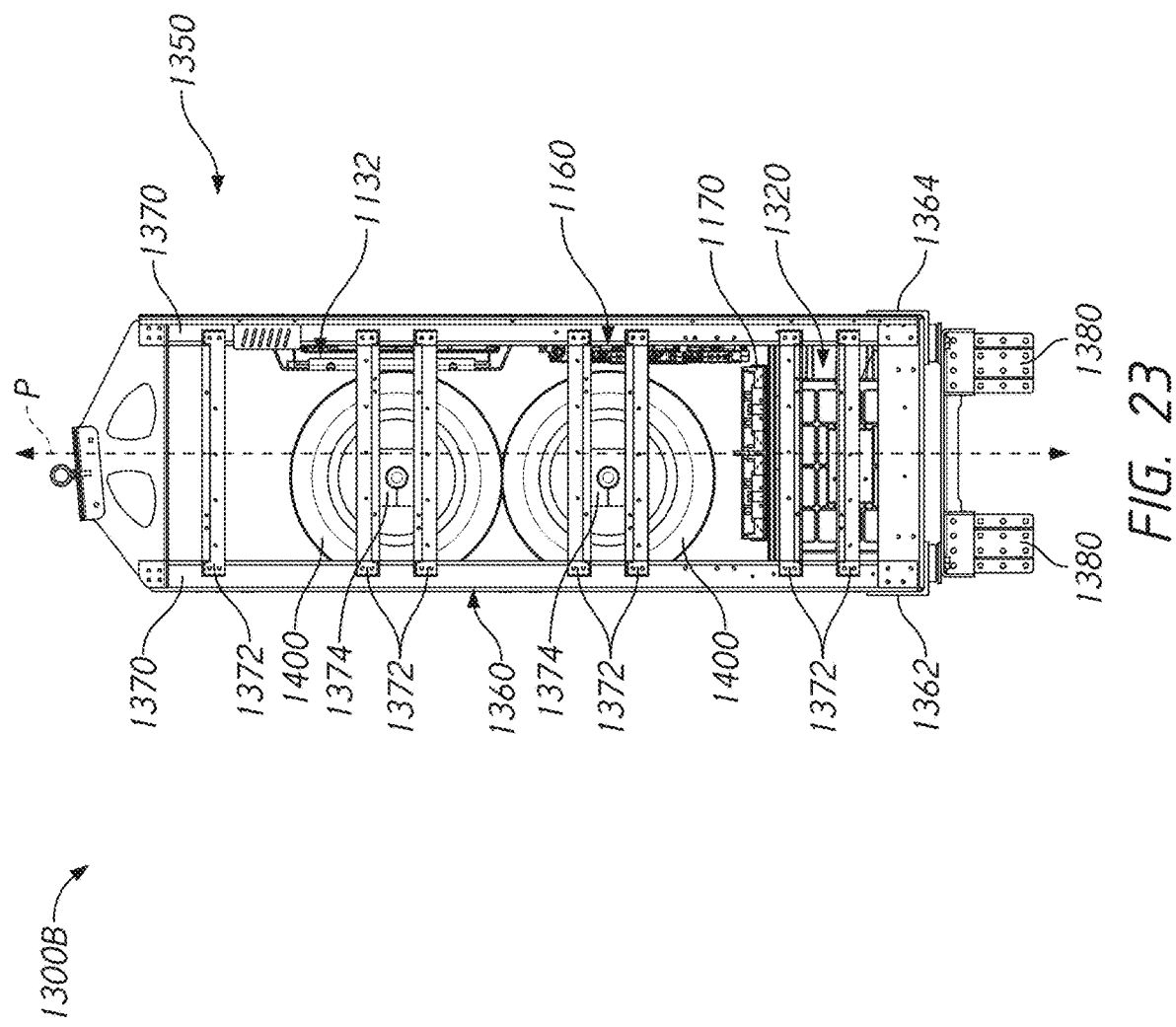
FIG. 23 is a lateral view of the power distribution system of FIG. 22.

FIGS. 22-23 show a power distribution system module 1300B that is similar to the power distribution system module 1300A except as described differently below. As shown in FIGS. 22-23, the power distribution system module 1300B can include two gas cylinders 1400. The gas cylinders 1400 can be spaced apart from the top and bottom of the frame assembly 1360. As shown in FIG. 23, the gas cylinders 1400 can be offset from a central plane P intersecting the midpoint of the neck support members 1372 of the frame assembly 1360. For example, the gas cylinders 1400 can be mounted to the frame assembly 1360 forward of the central plane P (e.g., the neck supports 1374 can be coupled to the neck support members 1372 at a location forward of the midpoint of the neck support members 1372). This arrangement can advantageously provide space for other components (such as electronics) between the gas cylinders 1400 and the second side 1364 of the frame assembly 1360. FIG. 23 shows a space above the upper gas cylinder 1400 that could be used for a third gas cylinder, increasing the gas storage capacity by 50%, demonstrating further modularity of the power distribution module 1300B.

FIG. 24 shows a power distribution system module 1300C that is similar to the power distribution system modules 1300, 1300A, 1300B except as described differently below. The power distribution system module 1300C can include an electric vehicle control module, a hydrogen gas module, and/or a combustion fuel module. The frame assembly 1360 can include an electric vehicle control module frame assembly (e.g., including the vertical frame members 1370 and the cross members 1376 disposed toward the rear of the frame assembly 1360) for supporting the electric vehicle control module and a cylinder frame assembly (e.g., including the vertical frame members 1370 and the cross members 1376 toward the front of the frame assembly 1360 and the neck support members 1372) for supporting the hydrogen gas module and/or the combustion fuel module. The electric vehicle control module frame assembly can be coupled to the cylinder frame assembly. The power distribution system module 1300C can include a plurality of gas cylinders (e.g., within the hydrogen gas module and/or the combustion fuel module). At least one and in some case more than one, and even all of the gas cylinders can be combustion gas cylinders 1402 configured to store a combustion gas, such as compressed natural gas. The combustion fuel module can include conduits configured to place the combustion gas stored in the combustion gas cylinder(s) 1402 in fluid communication with a combustion engine of a hybrid vehicle. The remaining gas cylinders (if any) can be gas cylinders 1400 configured to store hydrogen. The hydrogen stored in the gas cylinders 1400 can be placed in fluid communication with one or more fuel cell(s) 1320. Thus, power distribution module 1300C facilitates vehicle operation by combustion engine, by electric propulsion through the axle drive assembly 112 and on-board recharging by the fuel cell 1320.

FIG. 1D and FIGS. 21-24 show that at least one gas cylinder 1400 can be omitted from the housing 1350 to provide a component space for components supporting functions inside the housing 1350 or configured to be mounted elsewhere on a vehicle. FIGS. 21-24 show that a lower-most location that could be used for a gas cylinder can be dedicated to other components. In some embodiments, the component space can be used to secure one or more components that are described above as integrated into the front end accessory component assembly 104. For example, a compressor for a hydrogen vehicle application (e.g., the air compressor 842, the air conditioner compressor 852, the battery chiller compressor 854 or the air compressor 1010B) could be coupled to the frame assembly 1360. In another embodiment an accessory motor (such as the air compressor motor 840, the accessory motor 850 for the battery chiller compressor 854) could be coupled to the frame assembly 1360. In another embodiment, an inverter (e.g., the motor inverters 838) for an accessory coupled to the frame assembly 1360. Further, a compressor system (e.g., a motor, inverter and a pump) for a hydraulic fluid could be disposed in the component space provided by the omission of one or more for the gas cylinders 1400. Pressurized hydraulic fluid could be stored in a hydraulic fluid tank or reservoir that can be placed into fluid communication with a hydraulic actuated component disposed outside of a housing of a system, e.g., in or on a trailer unit or a tractor unit. The component space can also be used to store other fluids. For example a cylinder can be provided to store air or another non-combustion gas that can operate a pneumatic component, such as an air horn. Hydraulic fluid and pneumatic fluid supply can be accessed at an appropriate coupling of the output junctions 1150 shown in FIG. 10.

In another modified embodiment, at least a portion of thermal management systems described above in connection with the front end accessory component assembly 104 can be disposed in the component space provided by excluding one of the gas cylinder 1400 from within the housing 1350. The thermal management systems can be configured to manage the heat of the battery assembly 100, the battery assembly 1004A, and/or the battery assembly 1004B. Any one or more of the components of the first coolant loop 818 described above can be disposed in the component space provided by excluding one of the gas cylinder 1400 from within the housing 1350. Any one or more of the components of the second coolant loop 820 described above can be disposed in the component space provided by excluding one of the gas cylinder 1400 from within the housing 1350. Waste heat from these coolant loops can be used to elevate the temperature of any of the battery assemblies as needed, via 3-way valves.

In some cases, one or more of the electrical components mounted to the frame assembly 1100 as seen FIGS. 10-18 can be disposed in a component space of the power distribution modules 1300, 1300A, 1300B, 1300C. Positioning some of these components beneath the location of other gas cylinders 1400 can allow re-positioning some of the remaining tanks. For example the electronic components at the elevation of the uppermost gas cylinder 1400 can be disposed in the component space described above. This can provide space to move the uppermost gas cylinder 1400 to be centered on the plane P (see FIG. 23) while leaving the vertical central plane of the gas cylinder 1400 disposed beneath the uppermost gas cylinder 1400 to be shifted forward of the plane P. Such use of the component space enables the center of gravity to be selectively positioned by adjusting the locations of some of the gas cylinders 1400.

Figure 25:
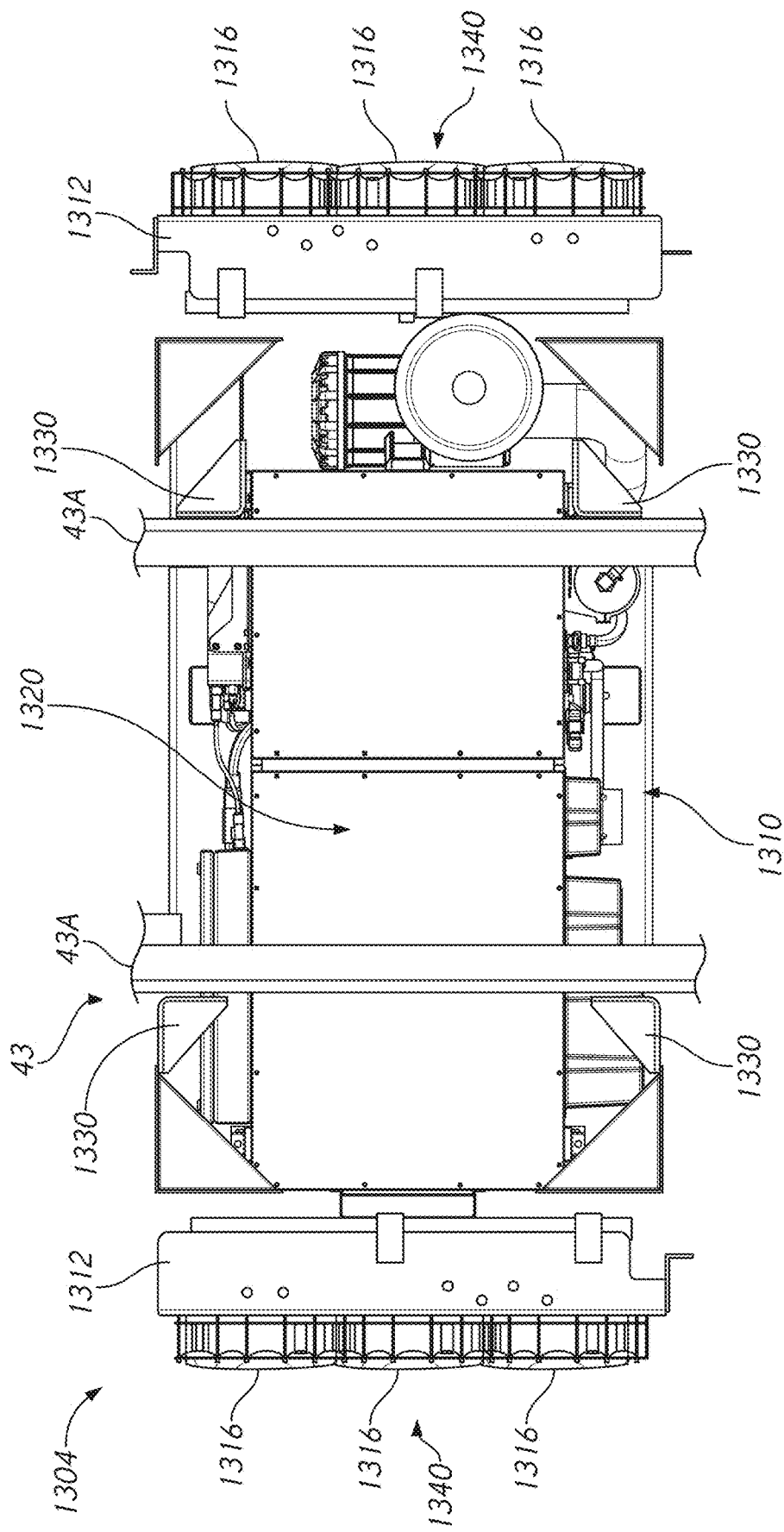
FIG. 25 is a top view of a fuel cell module with integrated cooling system.
Figure 26:
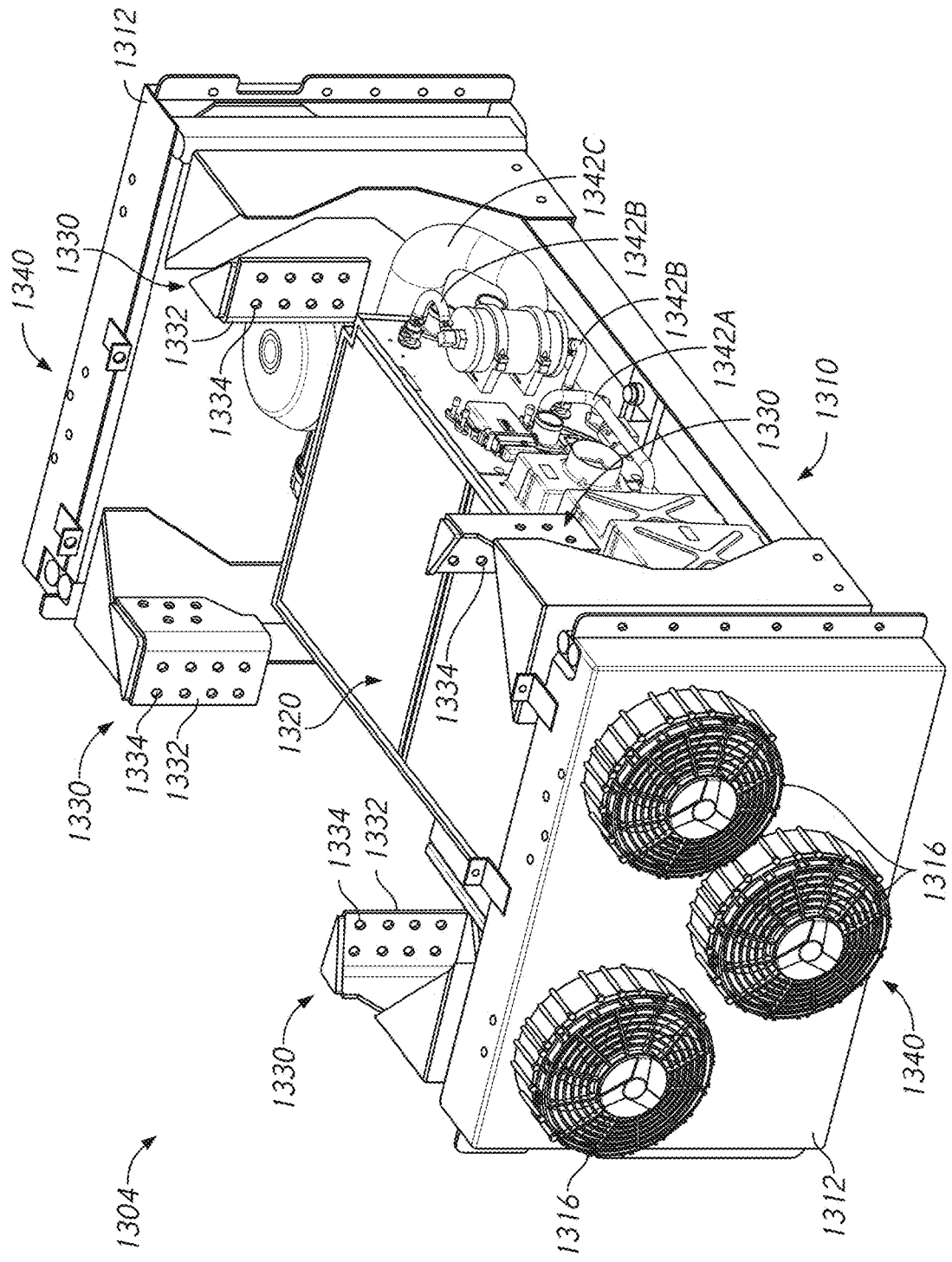
FIG. 26 is a top, rear perspective view of the fuel cell module of FIG. 25.
Figure 27:
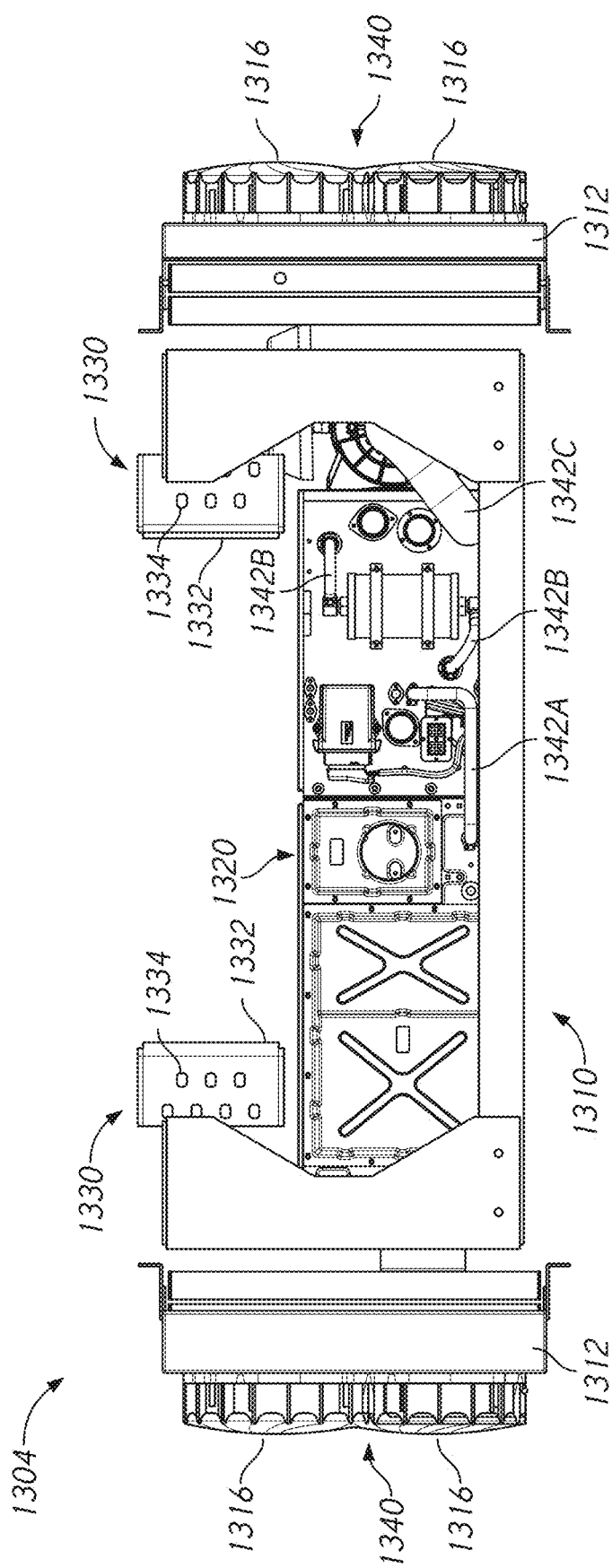
FIG. 27 is a rear view of the fuel cell module of FIG. 25.

FIGS. 25-27 show that the fuel cell module 1304 can include one or more fuel cell(s) 1320 and one or more coolant module(s) 1340. The fuel cell(s) 1320 can be configured to be placed in fluid communication with hydrogen gas disposed in the gas cylinder(s) 1400 of any of the power distribution system modules 1300. The hydrogen gas can be supplied to the fuel cell(s) 1320 to support the generation of current thereby. The fuel cell(s) 1320 can be configured to produce electricity to recharge one or more batteries on the vehicle 40A, e.g., battery modules in the battery assemblies 100, 1004A, 1004B.

The coolant module(s) 1340 can be configured to be operable to remove heat from the fuel cell(s) 1340. The coolant module(s) 1340 can be configured to use radiators and/or fans 1316 to remove heat from the fuel cell(s) 1340. For example, the fuel cell 1320 can be cooled by a liquid coolant that can flow through conduits 1342A, 1342B, 1342C in the fuel cell 1320 and between the fuel cell 1320 and a radiator of the coolant module 1340. The radiator can flow the coolant therethrough and the fans 1316 can remove heat from the radiator by causing airflow thereover.

The fuel cell module 1304 can include a frame assembly 1310. The fuel cell(s) 1320 and coolant module(s) 1340 can be coupled to the frame assembly 1310. The fuel cell(s) 1320 can be disposed towards the middle of the fuel cell module 1304, with a first coolant module 1340 disposed toward a first lateral side of the fuel cell(s) 1320 and a second coolant module 1340 disposed toward a second lateral side of the fuel cell(s) 1320. The coolant module(s) 1340 can include one or more radiators and/or one or more fans 1316. The coolant module(s) 1340 can include a housing 1312. The housing 1312 can be coupled to the chassis adjacent to the fuel cell(s) 1320. A plurality of fans 1316 can be mounted in the housing 1312 and extend laterally beyond an outer surface of the housing 1312. The fuel cell module 1304 can be configured to be mounted to the frame assembly 43 (e.g., to the frame rails 43A) of the vehicle 40A as a unit. The fuel cell module 1304 can be configured to be mounted to the frame assembly 43 using a vibration-isolated mounting structure. The fuel cell module 1304 can include one or more frame rail brackets 1330. For example, as shown in FIG. 26, the fuel cell module 1304 can include four frame rail brackets 1330, two on each side of the fuel cell module 1304. The frame rail brackets 1330 can extend away from the housing 1312, towards the center of the fuel cell module 1304. The frame rail brackets 1330 can include a mounting surface 1332, which can have apertures 1334 configured to receive fasteners to couple the fuel cell module 1304 to the frame rails 43A. The mounting surface 1332 of each frame rail bracket 1330 can be the inner-most surface of the bracket 1330 (e.g., the surface of the bracket 1330 closest to the frame rail 43A when the fuel cell module 1304 is positioned adjacent to the frame rails 43A of the vehicle 40A (as illustrated in FIG. 25). FIGS. 25-26 show that the frame assembly 1310 enables the fuel cell module 1304 to be mounted to outside surfaces of the frame rails 43A and to extend below a bottom side of the frame rails 43A such that the fuel cell(s) 1320 can be mounted below the frame rails 43A. The fuel cell 1320 can be mounted on a first (e.g., a lower) side of the frame rails 43A and the power distribution module 1300 can be mounted on a second (e.g., upper) side of the frame rails 43A.

Further variations are possible. For example, although FIG. 1D shows a fuel cell 1320 located outside the cowling of the power distribution system module 1300 and mounted or mountable to the frame assembly 43, the fuel cell 1320 can be disposed in other locations outside the cowling. For example, in one embodiment the fuel cell 1320 can be located inside a front vehicle compartment, e.g., where an engine may be found in a front engine compartment as discussed above.

Figure 28:
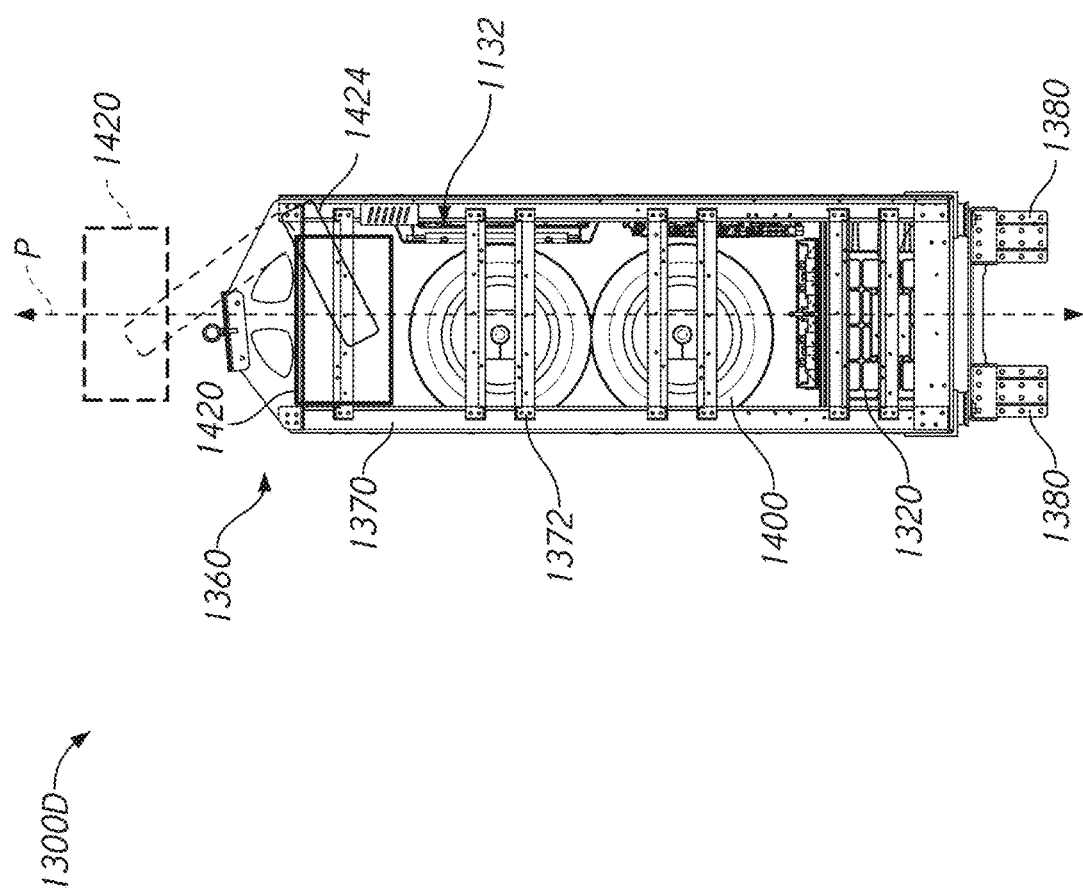
FIG. 28 is a side view of a power distribution system having a means for modulating airflow to or by a heat exchanger.

FIG. 28 illustrates another variation in which a portion of the coolant module 1340 can be disposed above the frame assembly of a vehicle. In one version, a power distribution module 1300D is provided which encloses a radiator 1420 in a top portion of a frame assembly 1360 thereof. The vertical frame members 1370, the neck support members 1372, and the cross members 1376 in part define a volume or space that can be used for one or more gas cylinders 1400. In the illustrated embodiment, the upper-most portion of the space is used to mount a radiator 1420 therein. The radiator 1420 can be placed in fluid communication with ambient air by one or more vents in the cowling 1358. Additionally means for modulating airflow can be provided, e.g., coupled with the frame assembly 1360. The means for modulating airflow can take any suitable form.

For example, air vents in the cowling 1358 can be positioned forward of the radiator 1420 and can focus airflow on the radiator. The air vents in the cowling 1358 can remain open allowing air to flow into the cowling as a vehicle 40 with which the power distribution module 1300C is coupled is moving and can be closed or partially closed as heat transfer needs of the radiator changes. The air vents can be closed by one or more louvers or similar closure members that can be coupled with the cowling 1358 or with the frame assembly 1360. In addition, to air vents that can be opened and closed, one or more scoops can be provided to at least partially open the cowling 1358 to airflow. A scoop can be configured as a small door or flap of the cowling 1358 that can be opened upon movement of an actuator. Movement of a louver or a closure member or of a scoop or flap can be achieved by one or more of a motor and a linkage. In one further variation, the radiator 1420 can be moveably mounted in the frame assembly 1360 to enhance airflow over the radiator 1420. For example, a radiator extender 1424 can be disposed between the radiator 1420 and the frame assembly 1360. The radiator extender 1424 can include a four bar linkage, a linear actuator configured to elevate the radiator 1420 out of an opening in a top portion 1359 of the cowling 1358. The radiator extender 1424 can be moved by an auxiliary motor mounted to or within the frame assembly 1360. The extender 1424 is another example of a means for modulating airflow over the radiator 1420. The motor, actuator, linkage or other device for operating a means for modulating airflow over the radiator 1420 can be operated by a controller incorporated into or mounted adjacent to the power distribution unit 1132. When extended, the radiator 1420 is advanced into the airstream over the vehicle 40 when the vehicle is operating to provide more airflow for removing heat from a heat transfer fluid flowing through the radiator 1420. The radiator 1420 and radiator extender 1424 can be used to in connection with the power distribution module 1300D in which the fuel cell 1320 is disposed within the frame assembly 1*s*360. The radiator 1420 and the radiator extender 1424 can be used to in connection with other embodiments, such as the power distribution module 1300 in which the fuel cell 1320 is mounted separately, e.g., beneath the frame assembly 43 or in a front end engine compartment.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A power distribution system for a vehicle, the system comprising:
    a housing configured to be coupled to frame rails of the vehicle above the frame rails and immediately rearward of a cab of the vehicle;
    a power distribution unit coupled to the housing;
    one or more inverters coupled to the housing, the one or more inverters configured to transform DC current from a power source into AC current to be distributed to a plurality of load components;
    a powertrain control circuit configured to be coupled to and to control an electric motor coupled with a drive axle of the vehicle; and
    a junction box configured to be located between the vehicle frame rails and having a first junction and a second junction, the first junction and the second junction configured to connect the power distribution unit with a power source and a load respectively.

2. The power distribution system of claim 1, wherein the power distribution unit comprises a battery charge module having a first circuit, a second circuit, and a charge interface coupled with at least one of the first circuit and the second circuit, the first circuit and the second circuit configured to be coupled to the first junction to be coupled with a power source, the first circuit and the second circuit configured to charge batteries disposed in the power source at different rates.

3. The power distribution system of claim 1, further comprising a fuel module, the fuel module comprising a cylinder frame assembly coupled to a control module frame assembly and configured to support a gas cylinder configured to store gaseous fuel.

4. The power distribution system of claim 3, wherein the gas cylinder is configured to store compressed natural gas and is configured to be placed in fluid communication with a combustion engine.

5. The power distribution system of claim 3, further comprising a fuel cell configured to be placed in fluid communication with gaseous fuel disposed in the gas cylinder.

6. The power distribution system of claim 5, wherein the fuel cell is disposed in a fuel cell module, wherein the fuel cell module is configured to be mounted to one of the frame rails of the vehicle.

7. The power distribution system of claim 1, further comprising a charge circuit configured to control a process of charging one or more power sources, wherein the charge circuit is disposed within the housing.

8. The power distribution system of claim 7, wherein the charge circuit is configured to provide a high rate of charge to a power source and further comprising an AC charge circuit configured to provide a lower rate of charge to a power source.

9. The power distribution system of claim 1, further comprising an access deck configured to be mounted to one or more of the frame rails and to provide access to one or more components of the power distribution system.

10. The power distribution system of claim 1, further comprising a charge interface disposed on an outside surface of the housing and coupled with a charge circuit disposed within the housing.

11. The power distribution system of claim 1, further comprising a coolant flow conduit disposed within a cowling in a first location adjacent to a forward side of the cowling.

12. The power distribution system of claim 11, further comprising an electrical conveyance between the first junction and the second junction, the electrical conveyance disposed in a location rearward of the first location.

13. The power distribution system of claim 12, wherein the electrical conveyance comprises a first segment and a second segment disposed between the first segment and the second junction, wherein the first segment is located rearward of the coolant flow conduit and the second segment is located rearward of the first segment.

14. The power distribution system of claim 1, wherein a bottom surface of the junction box is located below a top surface of the vehicle frame rails.

15. A vehicle comprising:
a chassis comprising a plurality of frame rails and a cab supported on a forward portion of the frame rails;
a housing coupled to the frame rails above the frame rails and rearward of the cab within a space defined by fairings of the cab;
a power distribution unit coupled to the housing;
one or more inverters coupled to the housing, the one or more inverters configured to transform DC current from a power source into AC current to be distributed to a plurality of load components;
a powertrain control circuit configured to be coupled to and to control an electric motor coupled with a drive axle; and
a junction box configured to be located between the frame rails and having a first junction and a second junction, the first junction and the second junction configured to connect the power distribution unit with a power source and a load respectively.

16. The vehicle of claim 15, further comprising a vibration isolator disposed between a portion of the housing and the chassis.

17. The vehicle of claim 15, further comprising a fuel cell module mounted to the chassis and a coolant module configured to be operable to remove heat from a fuel cell of the fuel cell module.

18. The vehicle of claim 15, wherein the housing comprises a tapered profile having a narrower dimension toward a forward portion thereof.

19. The vehicle of claim 15, wherein a bottom surface of the junction box is located below a top surface of the vehicle frame rails,
wherein the junction box comprises a third junction, and
wherein the vehicle further comprises an auxiliary component module coupled to the third junction.

20. The vehicle of claim 19, wherein the power source comprises a first battery assembly and a second battery assembly and the junction box comprises a fourth junction, the first battery assembly coupled with the first junction and the second battery assembly coupled with the fourth junction.

* * * * *